(12) United States Patent
Hoshiya et al.

(10) Patent No.: US 7,188,717 B2
(45) Date of Patent: Mar. 13, 2007

(54) CONTROL APPARATUS FOR POWER TRAIN INCLUDING CONTINUOUSLY VARIABLE TRANSMISSION

(75) Inventors: Kazumi Hoshiya, Gotenba (JP); Yasunori Nakawaki, Nishikamo-gun (JP); Kunihiro Iwatsuki, Toyota (JP); Yasuhiro Oshiumi, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 52 days.

(21) Appl. No.: 11/115,303

(22) Filed: Apr. 27, 2005

(65) Prior Publication Data

US 2005/0197233 A1 Sep. 8, 2005

Related U.S. Application Data

(62) Division of application No. 10/356,599, filed on Feb. 3, 2003, now Pat. No. 6,974,009.

(30) Foreign Application Priority Data

Feb. 4, 2002 (JP) ............................. 2002-027417
Jul. 5, 2002 (JP) ............................. 2002-198031

(51) Int. Cl.
*F16H 9/00* (2006.01)
*F16H 61/00* (2006.01)

(52) U.S. Cl. ................. 192/3.63; 192/30 V; 192/85 R; 477/39; 477/45

(58) Field of Classification Search .................. None
See application file for complete search history.

(56) References Cited

U.S. PATENT DOCUMENTS

| | | | |
|---|---|---|---|
| 4,582,185 A | 4/1986 | Grimes et al. | |
| 4,606,446 A | 8/1986 | Watanabe | |
| 4,729,461 A | 3/1988 | Nishikawa et al. | |
| 4,771,658 A | 9/1988 | Miyawaki | |
| 4,805,750 A | 2/1989 | Nitz | |
| 4,958,538 A | 9/1990 | Yamashita et al. | |
| 4,982,822 A | 1/1991 | Petzold et al. | |
| 5,004,082 A | 4/1991 | Sakakibara et al. | |
| 5,006,092 A | 4/1991 | Neuman et al. | |
| 5,060,769 A | 10/1991 | Yoshimura et al. | |
| 5,098,345 A * | 3/1992 | Van Vuuren ................ 474/8 |
| 5,211,083 A | 5/1993 | Hattori et al. | |
| 5,400,678 A | 3/1995 | Jain et al. | |
| 5,643,136 A | 7/1997 | Kono et al. | |

(Continued)

FOREIGN PATENT DOCUMENTS

DE        43 24 810        1/1995

(Continued)

*Primary Examiner*—Saul Rodriguez
(74) *Attorney, Agent, or Firm*—Oblon, Spivak, McClelland, Maier & Neustadt, P.C.

(57) ABSTRACT

A control apparatus for a power train including a continuously variable transmission and a clutch arranged in series with the continuously variable transmission is provided in which an engaging pressure of the clutch is first reduced until a slip occurs, and is then increased after detection of the slip so as to re-engage the clutch, and an engaging pressure of the clutch to be established is calculated by giving an excess pressure to the engaging pressure at which the clutch is re-engaged, such that an excess amount of the transmitted torque of the clutch is set smaller than that of the continuously variable transmission. The control apparatus is adapted to determine a learned value as a correction value of the engaging pressure that is set in advance in accordance with an input torque applied to the clutch, based on the engaging pressure calculated by giving the excess pressure to the engaging pressure at which the clutch is re-engaged.

8 Claims, 28 Drawing Sheets

U.S. PATENT DOCUMENTS

| | | |
|---|---|---|
| 5,679,091 A | 10/1997 | Salecker et al. |
| 5,720,692 A | 2/1998 | Kashiwabara |
| 5,935,043 A | 8/1999 | Watanabe et al. |
| 6,053,843 A | 4/2000 | Van Vuuren et al. |
| 6,095,942 A | 8/2000 | Yamaguchi et al. |
| 6,146,294 A | 11/2000 | Bolz |
| 6,155,396 A | 12/2000 | Tsubata et al. |
| 6,168,546 B1 | 1/2001 | Loffler et al. |
| 6,193,630 B1 | 2/2001 | Janasek et al. |
| 6,461,271 B2 | 10/2002 | Nakano et al. |
| 6,945,905 B2 * | 9/2005 | Tamai et al. .......... 477/3 |

FOREIGN PATENT DOCUMENTS

| | | |
|---|---|---|
| DE | 195 04 847 | 9/1995 |
| DE | 195 47 501 | 7/1996 |
| DE | 100 53 110 | 5/2002 |
| EP | 0 446 497 | 9/1991 |
| JP | 60-191822 | 9/1985 |
| JP | 62-52262 | 3/1987 |
| JP | 63-67457 | 3/1988 |
| JP | 64-44349 | 2/1989 |
| JP | 7-301326 | 11/1995 |
| JP | 8-121591 | 5/1996 |
| JP | 8-240264 | 9/1996 |
| JP | 2591007 | 12/1996 |
| JP | 9-500707 | 1/1997 |
| JP | 9-242866 | 9/1997 |
| JP | 10-2390 | 1/1998 |
| JP | 10-299887 | 11/1998 |
| JP | 11-325237 | 11/1999 |

\* cited by examiner

CONTROL APPARATUS FOR POWER TRAIN INCLUDING CONTINUOUSLY VARIABLE TRANSMISSION

This application is based upon and claims the benefit of priority under 35 U.S.C. § 120 for U.S. Ser. No. 10/356,599 filed Feb. 3, 2003 now U.S. Pat. No. 6,974,009 and under 35 U.S.C. § 119 from Japanese Applications No. 2002-027417 filed on Feb. 4, 2002 and No. 2002-198031 Filed on Jul. 5, 2002, the entire contents of each of which are incorporated herein by reference.

INCORPORATION BY REFERENCE

The disclosure of Japanese Patent Applications No. 2002-027417 filed on Feb. 4, 2002 and No. 2002-198031 filed on Jul. 5, 2002, each including the specification, drawings and abstract, is incorporated herein by reference in its entirety.

BACKGROUND OF THE INVENTION

1. Field of the Invention

The invention relates to a control apparatus for a power train including a continuously variable transmission in which a torque transmitting member, such as a belt or a power roller, for transmitting torque is in direct or indirect contact with rotary members, such as pulleys or discs, and which has a variable torque capacity that varies depending upon a contact pressure between the torque transmitting member and the rotary members. In particular, the invention relates to such a control apparatus adapted for controlling an engaging pressure of a clutch that is arranged in series with the continuously variable transmission.

2. Description of Related Art

Known continuously variable transmissions (hereinafter referred to as "CVT" when appropriate) is constructed so as to change the speed ratio (or transmission ratio) continuously or steplessly, by continuously changing contact positions or torque transmitting positions between a torque transmitting member, such as a belt or a power roller, and rotary members, such as a pulleys or a discs. The torque transmission is effected by utilizing frictional force or shearing force of traction oil. The torque capacity of the continuously variable transmission is determined based on a contact pressure between the torque transmitting member and the pulley or disc or a pressure (i.e., clamping pressure) for clamping or pinching the torque transmitting member, and the coefficient of friction or the shearing force of the traction oil. If a torque applied to the CVT exceeds the torque capacity, a slip of the belt or power roller occurs.

If an excessive slip of the belt or power roller occurs, a portion of the pulley or disc that is in contact with the belt or power roller wears. As a result, the worn portion of the pulley or disc will not serve to transmit torque, and the CVT will not be able to perform its intended function of transmitting power at a given speed ratio. In order to prevent a slip of the CVT during running of the vehicle on which the CVT is installed, it has been proposed to increase the clamping or pinching force applied to the torque transmitting member, thereby to increase the torque capacity.

If the clamping pressure is increased, however, the power transmitting efficiency of the CVT is reduced, and a large quantity of power is consumed for driving an oil pump that generates a hydraulic pressure, resulting in deteriorated fuel economy of the vehicle. It is thus preferable to reduce the clamping pressure of the CVT to the minimum within a range in which no slip occurs.

If the vehicle is in a non-steady running state in which the output torque of the engine or the negative torque applied from vehicle wheels changes frequently or largely, the torque applied to the CVT cannot be predicted, and therefore the safety factor or an excess of the torque capacity (i.e., an excess amount of the torque capacity over the minimum or limit torque capacity with which no slip occurs in a steady running state) needs to be increased so as to establish a relatively high clamping pressure. If the vehicle is in a steady or quasi-steady running state, on the other hand, the torque applied to the CVT is stable, and therefore the clamping pressure can be lowered until the CVT is brought into an operating state immediately before a slip occurs.

However, an unexpected or sudden torque may occur even in a steady or quasi-steady running state, which makes it necessary to prevent or avoid a slip of the CVT even in this case. To meet with this requirement, it has been proposed in, for example, Japanese laid-open Patent Publication No. 10-2930 to provide a clutch in series with the CVT, and set an excess of the engaging pressure of the clutch smaller than an excess of the clamping pressure of the CVT. With this arrangement, the engaging pressure of the clutch and the clamping pressure of the CVT are reduced when no slip of the clutch is detected, and the engaging pressure and the clamping pressure are both controlled to be increased when a slip of the clutch is detected. Here, the excess of the engaging pressure or clamping pressure is an excess amount of the engaging pressure or clamping pressure over the minimum or limit level at which no slip occurs in a steady running state of the vehicle.

With the above-described control, when a torque applied to the power train in which the clutch and the CVT are arranged in series increases, the clutch is caused to slip first, namely, before a slip of the CVT occurs, so as to limit the torque applied to the CVT, thereby avoiding in advance slippage of the CVT. In other words, the clutch arranged in series with the CVT functions as a so-called "torque fuse".

In the control device as disclosed in the above-identified publication, the engaging pressure of the clutch and the clamping pressure of the CVT are reduced when no slip of the clutch is detected, and are increased when a slip of the clutch is detected as a result of reduction of the engaging pressure. In this manner, the engaging pressure and the clamping pressure are repeatedly reduced and increased, resulting in repeated slips of the clutch. With the known control device as described above, therefore, the power transmitting efficiency of the power train may be reduced, and the fuel economy may be deteriorated or may not be improved owing to the use of the CVT.

It is also to be noted that control of the engaging pressure of the clutch involves inevitable variations because of differences among individual clutches in terms of characteristics of a hydraulic control device associated with the clutch and/or the coefficient of friction of the clutch. Since the known device as disclosed in the above-identified publication does not take these variations into consideration when increasing the engaging pressure and the clamping pressure after detection of a slip of the clutch, the engaging pressure of the clutch may become excessively large relative to the clamping pressure. In such a case, an excess of the engaging pressure of the clutch may become substantially equal to or larger than that of the clamping pressure of the CVT, which may result in occurrence a slip of the CVT.

SUMMARY OF THE INVENTION

It is therefore an object of the invention to provide a control apparatus which is able to set an excess of transmitted torque of a clutch arranged in series with a continuously variable transmission, to an appropriate value, such that the excess of the transmitted torque of the clutch is constantly or stably lower than that of the continuously variable transmission.

To accomplish the above object, there is provided according to a first aspect of the invention a control apparatus for a power train including a continuously variable transmission (hereinafter referred to as "CVT" when appropriate) and a clutch that is arranged in series with the CVT, which comprises (a) an engaging pressure reducing unit that reduces an engaging pressure of the clutch that is in a fully engaged state until a slip of the clutch occurs, (b) a re-engaging unit that increases the engaging pressure of the clutch after detection of the slip so as to re-engage the clutch, (c) a pressure calculating unit that calculates an engaging pressure of the clutch by giving a predetermined excess pressure to the engaging pressure at which the clutch is re-engaged, such that an excess amount of a transmitted torque of the clutch over a transmitted torque with which a slip occurs in the clutch is set smaller than an excess amount of a transmitted torque of the CVT over a transmitted torque with which a slip occurs in the transmission, and (d) a learned value determining unit that determines a learned value as a correction value of the engaging pressure that is set in advance in accordance with an input torque applied to the clutch, based on the engaging pressure calculated by giving the predetermined excess pressure to the engaging pressure at which the clutch is re-engaged. The learned value may be obtained as a difference between the engaging pressure obtained by giving the excess pressure to the engaging pressure at which the clutch is re-engaged, and a preset engaging pressure.

In the control apparatus constructed as described above, the engaging pressure of the clutch coupled in series with the continuously variable transmission is reduced, and is then increased upon detection of a slip of the clutch during reduction of the engaging pressure, whereby the engaging pressure is obtained by giving a certain excess pressure to the engaging pressure at which the clutch is re-engaged. Thus, repeated engagement and slippage of the clutch can be prevented. Also, the learned value is determined as a correction value for correcting a preset engaging pressure, such as an engaging pressure that has already been obtained. In this manner, the engaging pressure of the clutch can be controlled to an appropriate value that reflects the actual operating state of the power train.

With the above arrangement, the clutch coupled in series with the CVT is prevented from repeating engagement and slippage. Furthermore, since the engaging pressure is corrected with the learned value that reflects the actual operating state of the power train, an excess amount of transmitted torque for accommodating a slip of the clutch can be controlled to an appropriate value, whereby the clamping pressure of the CVT can be reduced to the minimum within a range in which no slip occurs, thus assuring improved fuel economy.

In one embodiment of the invention, the learned value determining unit employs, as the engaging pressure at which the clutch is re-engaged, an engaging pressure obtained at a point of time that is selected so that a torque applied to the clutch does not include an inertia torque caused by a change in a speed of rotation of at least one rotary member upon re-engagement of the clutch.

The above arrangement makes it possible to obtain an engagement pressure of the clutch that corresponds to an operating state that is free from inertia torque as a transitional factor, and therefore the engaging pressure can be controlled to an appropriate value without involving variations in the engaging pressure due to the speed of the engagement.

In another embodiment of the invention, the control apparatus further includes (a) a learned value deviation determining unit that determines whether the learned value deviates from a normal range, and (b) a torque capacity correcting unit that corrects a torque capacity of the CVT when the learned value deviation determining unit determines that the learned value deviates from the normal range.

With the above arrangement, when the learned value as a factor for determining the engaging pressure of the clutch deviates from the normal range, the torque capacity of the CVT is corrected based on the deviation of the learned value, whereby slippage of the CVT can be surely prevented or suppressed. Here, deviation of the learned value may indicate a state in which the learned values that have been sequentially obtained continuously deviate from the normal range in an increasing or decreasing direction. Where the input torque is divided into a plurality of regions, and the clutch engaging pressure and the learned value are set with respect to each of the input torque regions, the learned values in the plural torque regions may deviate to be larger or smaller than the normal range. The deviation of the learned values may be caused by variations in a condition relating to the friction coefficient of, for example, a lubricating oil of the clutch, and thus the torque capacity of the CVT is corrected in view of a possibility of similar variations in the friction coefficient in the CVT.

In a further embodiment of the invention, the torque capacity correcting unit corrects the torque capacity of the CVT only when the learned value deviates in a direction in which the engaging pressure of the clutch increases.

In the embodiment as described above, when the learned value deviates in the direction in which the clutch engaging pressure increases, the torque capacity of the CVT is corrected to be increased. This is because there is a possibility that the coefficient of friction may be reduced. When the learned value deviates in a direction in which the clutch engaging pressure decreases, the torque capacity of the CVT is not corrected to be reduced. This is because a slip may occur to the CVT if the torque capacity of the CVT is reduced when the learned value deviates in the decreasing direction because of some abnormality.

According to a second aspect of the invention, there is provided a control apparatus for a power train including a continuously variable transmission and a clutch that is arranged in series with the continuously variable transmission, which comprises (a) an engaging pressure reducing unit that reduces an engaging pressure of the clutch that is in a fully engaged state until a slip of the clutch occurs, (b) a re-engaging unit that increases the engaging pressure of the clutch after detection of the slip so as to re-engage the clutch, (c) a pressure calculating unit that calculates an engaging pressure of the clutch by giving a predetermined excess pressure to the engaging pressure at which the clutch is re-engaged, such that an excess amount of a transmitted torque of the clutch over a transmitted torque with which a slip occurs in the clutch is set smaller than an excess amount of a transmitted torque of the continuously variable transmission over a transmitted torque with which a slip occurs in the transmission, (d) a termination determining unit that determines whether a control termination condition is satisfied, the control termination condition being provided for terminating control for engaging the clutch with the engaging pressure obtained by giving the predetermined excess pressure to the engaging pressure at which the clutch is re-engaged, and (e) a pressure increasing unit that increases the engaging pressure of the clutch so as to prevent a slip of the clutch after increasing a torque capacity of the continuously variable transmission, when the termination determining unit determines that the control termination condition is satisfied.

When a control termination condition for finishing control for setting the excess amount of the transmitted torque of the clutch smaller than the excess amount of the transmitted torque of the CVT is satisfied, the torque capacity of the CVT is initially increased, and then the torque capacity of the clutch is increased. The termination condition may be, for example, a slip of the clutch due to disturbance torque. Where the torque capacity of the clutch is increased so as to prevent or avoid a slip of the clutch, the torque capacity of the CVT is increased prior to the increase of the torque capacity of the clutch. As a result, when disturbance torque is applied to the clutch in its transitional state, a slip occurs to the clutch, and torque applied to the CVT is restricted, whereby a slip of the CVT is avoided or prevented.

In one embodiment of the second aspect of the invention, the pressure increasing unit gradually increases the engaging pressure of the clutch at a predetermined rate when the clutch is in a slipping state.

With the above arrangement, when the engaging pressure of the clutch is increased while the clutch is in a slipping state, the rate of increase of the clutch engaging pressure is reduced. As a result, the input and output rotational speeds of the clutch are prevented from rapidly changing when the slip stops with the increase of the clutch engaging pressure, and shocks resulting from the changes in the rotational speeds are suppressed or prevented.

According to a third aspect of the invention, there is provided a control apparatus for a power train including a continuously variable transmission and a clutch that is arranged in series with the continuously variable transmission, which comprises (a) an engaging pressure reducing unit that reduces an engaging pressure of the clutch that is in a fully engaged state until a slip of the clutch occurs, (b) a re-engaging unit that increases the engaging pressure of the clutch after detection of the slip so as to re-engage the clutch, (c) a pressure calculating unit that calculates an engaging pressure of the clutch by giving a predetermined excess pressure to the engaging pressure at which the clutch is re-engaged, such that an excess amount of a transmitted torque of the clutch over a transmitted torque with which a slip occurs in the clutch is set smaller than an excess amount of a transmitted torque of the continuously variable transmission over a transmitted torque with which a slip occurs in the transmission, and (d) a clutch engaging pressure setting unit that sets the engaging pressure of the clutch based on a difference between a coefficient of friction of the clutch measured upon re-engagement of the clutch and a coefficient of friction of the clutch measured upon full engagement of the clutch with no slip.

When the clutch is engaged with the engaging pressure obtained by giving a certain excess pressure to the engaging pressure at which the clutch is re-engaged, the clutch engaging pressure is set in view of a difference between the friction coefficient measured upon re-engagement of the clutch and the friction coefficient measured upon full engagement of the clutch with no slip. Consequently, the clutch engaging pressure can be controlled to an appropriate value.

In one embodiment of the third aspect of the invention, the clutch engaging pressure setting unit comprises a unit that sets the engaging pressure of the clutch based on a physical quantity that provides a factor that changes the coefficient of friction of the clutch.

With the above arrangement, the friction coefficient is not directly measured, but a physical quantity, such as an oil temperature or a degree of deterioration (period of use) of the lubricating oil of the clutch, which provides a factor for changing the friction coefficient is employed. Since the clutch engaging pressure is set based on the physical quantity, the engaging pressure can be controlled to an appropriate value, and the transmitted torque to which an excess amount is given can be set to an appropriate value. Consequently, control for using the clutch as "torque fuse" can be favorably performed.

According to a fourth aspect of the invention, there is provided a control apparatus for a power train including a continuously variable transmission and a clutch that is arranged in series with the continuously variable transmission, which comprises (a) an engaging pressure reducing unit that reduces an engaging pressure of the clutch that is in a fully engaged state until a slip of the clutch occurs, (b) a re-engaging unit that increases the engaging pressure of the clutch after detection of the slip so as to re-engage the clutch, (c) a pressure calculating unit that calculates an engaging pressure of the clutch by giving a predetermined excess pressure to the engaging pressure at which the clutch is re-engaged, such that an excess amount of a transmitted torque of the clutch over a transmitted torque with which a slip occurs in the clutch is set smaller than an excess amount of a transmitted torque of the continuously variable transmission over a transmitted torque with which a slip occurs in the transmission, and (d) a start condition setting unit that sets a control start condition associated with an oil temperature, which condition is provided for starting control for setting the engaging pressure of the clutch to a pressure level obtained by giving the predetermined excess pressure to the engaging pressure at which the clutch is re-engaged, such that the control start condition is different between a case where the engaging pressure calculated by giving the predetermined excess pressure to the engaging pressure at which the clutch is re-engaged has already been obtained, and a case where the engaging pressure has not been obtained.

In control of setting the excess amount of the transmitted torque of the clutch smaller than that of the CVT, the control of setting the engaging pressure of the clutch is initiated under different conditions between the case where the engaging pressure provided with the excess pressure has already been obtained and the case where such an engaging pressure has not been obtained. As a result, the control of setting the excess amount of the transmitted torque of the clutch smaller than that of the CVT can be executed with high stability.

In one embodiment of the fourth aspect of the invention, the start condition setting unit sets an oil temperature at which the control is started when the engaging pressure calculated by giving the predetermined excess pressure to the engaging pressure at which the clutch is re-engaged has already been obtained, to be lower than an oil temperature at which the control is started when the engaging pressure has not been obtained.

If the engaging pressure of the clutch to be set has already been obtained, control of setting an excess amount of the transmitted torque of the clutch smaller than that of the CVT is started while the oil temperature is relatively low. To the contrary, if the engaging pressure to be set has not been obtained, the control of setting the excess amount of the transmitted torque of the clutch smaller than that of the CVT is not started until the oil temperature becomes relatively high. The control to be started may include learning control associated with the engaging pressure of the clutch. With this arrangement, the engaging pressure of the clutch can be controlled to an appropriate value, and occurrence of a slip of the clutch, or an excessively large torque capacity of the clutch, can be avoided or prevented. Furthermore, since the oil temperature condition as a control start condition is different between the case where learning of the engaging pressure has been carried out and the case where such learning has not been carried out, chances to perform control of using the clutch as a torque fuse with respect to the CVT are increased, resulting in an improved power transmitting efficiency of the CVT and improved fuel economy.

According to a fifth aspect of the invention, there is provided a control apparatus for a power train including a continuously-variable transmission and a clutch that is arranged in series with the continuously variable transmission, which comprises (a) an engaging pressure reducing unit that reduces an engaging pressure of the clutch that is in a fully engaged state until a slip of the clutch occurs, (b) a re-engaging unit that increases the engaging pressure of the clutch after detection of the slip so as to re-engage the clutch, (c) a pressure calculating unit that calculates an engaging pressure of the clutch by giving a predetermined excess pressure to the engaging pressure at which the clutch is re-engaged, such that an excess amount of a transmitted torque of the clutch over a transmitted torque with which a slip occurs in the clutch is set smaller than an excess amount of a transmitted torque of the continuously variable transmission over a transmitted torque with which a slip occurs in the transmission, (d) a judder history determining unit that determines whether the clutch has experienced judder, and (e) a clutch engaging pressure control inhibiting unit that inhibits control for setting the engaging pressure of the clutch to a pressure level calculated by giving the predetermined excess pressure to the engaging pressure at which the clutch is re-engaged, when the judder history determining unit determines that the clutch has experienced the judder.

In the control apparatus as described above, when it is determined that the clutch has experienced judder before, control for setting the engaging pressure of the clutch to a pressure level calculated by giving a certain excess pressure to the engaging pressure at which the clutch is re-engaged is inhibited. As part of the control to be inhibited, the engaging pressure of the clutch is reduced so as to cause a slip, and is then increased for re-engagement, thus giving rise to a possibility that judder may occur again. Since the control of reducing the engaging pressure of the clutch and causing a slip and subsequent re-engagement is inhibited according to the above-aspect of the invention, judder is surely prevented from occurring again.

According to a sixth aspect of the invention, there is provided a control apparatus for a power train including a continuously variable transmission and a clutch that is arranged in series with the continuously variable transmission, which comprises (a) an engaging pressure reducing unit that reduces an engaging pressure of the clutch that is in a fully engaged state until a slip of the clutch occurs, (b) a re-engaging unit that increases the engaging pressure of the clutch after detection of the slip so as to re-engage the clutch, (c) a pressure calculating unit that calculates an engaging pressure of the clutch by giving a predetermined excess pressure to the engaging pressure at which the clutch is re-engaged, such that an excess amount of a transmitted torque of the clutch over a transmitted torque with which a slip occurs in the clutch is set smaller than an excess amount of a transmitted torque of the continuously variable transmission over a transmitted torque with which a slip occurs in the transmission, (d) a judder history determining unit that determines whether the clutch has experienced judder, and (e) an engaging pressure control unit that inhibits control for calculating the engaging pressure of the clutch by giving the predetermined excess pressure to the engaging pressure at which the clutch is re-engaged when the judder history determining unit determines that the clutch has experienced the judder, wherein when the engaging pressure calculated by giving the predetermined excess pressure to the engaging pressure at which the clutch is re-engaged has already been obtained, the engaging pressure control unit executes control for engaging the clutch with the engaging pressure that has already been obtained.

When it is determined that the clutch has experienced judder, control of engaging the clutch with the already obtained engaging pressure is executed provided that the engaging pressure has already been obtained so that the excess transmitted torque of the clutch is set smaller than that of the CVT, but control of calculating the engaging pressure is inhibited if the engaging pressure has not been obtained. Consequently, the transmitted torque of the CVT is reduced so as to improve the fuel economy when there is a low possibility of occurrence of judder, and judder is avoided or suppressed when there is a possibility of occurrence of judder.

According to a seventh aspect of the invention, there is provided a control apparatus for a power train including a continuously variable transmission and a clutch that is arranged in series with the continuously variable transmission, which comprises (a) an engaging pressure reducing unit that reduces an engaging pressure of the clutch that is in a fully engaged state until a slip of the clutch occurs, (b) a re-engaging unit that increases the engaging pressure of the clutch after detection of the slip so as to re-engage the clutch, (c) a pressure calculating unit that calculates an engaging pressure of the clutch by giving a predetermined excess pressure to the engaging pressure at which the clutch is re-engaged, such that an excess amount of a transmitted torque of the clutch over a transmitted torque with which a slip occurs in the clutch is set smaller than an excess amount of a transmitted torque of the continuously variable transmission over a transmitted torque with which a slip occurs in the transmission, (d) a judder history determining unit that determines whether the clutch has experienced judder, and (e) an engaging pressure change rate setting unit that sets a first rate of change of the engaging pressure of the clutch in a case where the judder history determining unit determines that the clutch has experienced the judder, to be larger than a second rate of change of the engaging pressure in a case where the judder history determining unit determines that the clutch has experienced no judder.

In the control of setting the excess transmitted torque of the clutch smaller than that of the CVT, the rate at which the engaging pressure of the clutch is changed is set to a relatively large value if it is determined that the clutch has experienced judder. With this arrangement, judder is less likely to occur.

According to an eighth aspect of the invention, there is provided a control apparatus for a power train including a continuously variable transmission and a clutch that is arranged in series with the continuously variable transmission in a direction of transmission of a torque, wherein an excess amount of a transmitted torque of the clutch over a transmitted torque with which a slip occurs in the clutch is set smaller than an excess amount of a transmitted torque of the continuously variable transmission over a transmitted torque with which a slip occurs in the transmission, which comprises (a) an engaging pressure reducing unit that reduces an engaging pressure of the clutch that is in an engaged state until a slip of the clutch occurs, (b) a re-engaging unit that increases the engaging pressure of the clutch after detection of the slip so as to re-engage the clutch, and (c) an engaging pressure setting unit that sets the engaging pressure of the clutch to a pressure level obtained by adding a predetermined value that provides the excess amount of the transmitted torque of the clutch, to the engaging pressure at which the clutch is re-engaged.

The excess transmitted torque means an excess amount of the transmitted torque over the minimum transmitted torque within a range in which no slip occurs in a steady running state of the vehicle. To set the excess amount of the transmitted torque of the clutch smaller than the excess amount of the transmitted torque of the CVT means setting the transmitted torque of each of the clutch and the CVT so that the clutch slips before the CVT does when a certain torque is applied to the power train. In the control apparatus constructed as described above, the engaging pressure of the clutch that is in an engaged state is reduced, and is then increased upon detection of a slip of the clutch so as to re-engage the clutch. With the clutch thus re-engaged, a predetermined value corresponding to a predetermined excess transmitted torque is added to the engaging pressure at the time of re-engagement, so that the engaging pressure of the clutch is set to the thus calculated pressure. Once the clutch is provided with the excess transmitted torque that prevents the clutch from slipping, the engaging pressure is not reduced any longer. Consequently, repeated slippage of the clutch can be avoided. In addition, the power transmitting efficiency and durability of the clutch is prevented in advance from being deteriorated or reduced.

In one embodiment of any of the above aspects of the invention, the engaging pressure of the clutch is reduced through a plurality of stages having difference rates of reduction of the engaging pressure, such that the rate of reduction of the engaging pressure decreases as the engaging pressure decreases.

With the above arrangement, when the engaging pressure of the clutch that is in the engaged state is reduced, the rates of reduction of the engaging pressure at the later stages are made smaller than that at the initial stage of pressure reduction. Accordingly, the response of control of reducing the engaging pressure for causing a slip is improved, and undershoot, which would otherwise occur during reduction of the engaging pressure, can be avoided or restricted. Furthermore, the clutch is prevented from excessively slipping, and shocks upon release of the clutch can be prevented or suppressed.

In another embodiment of any of the above aspects of the invention, a first engaging pressure of the clutch to be established before the clutch slips is set based on an input torque of the continuously variable transmission obtained based on a clamping force that determines the transmitted torque of the continuously variable transmission, such that the first engaging pressure does not cause a slip of the clutch.

In the embodiment as described just above, the engaging pressure that is set in the process of reducing the engaging pressure so that a slip occurs in the clutch is obtained based on the input torque of the CVT. When the clamping pressure that determines the transmitted torque of the CVT becomes high for some reason, therefore, the engaging pressure of the clutch is set high in accordance with the increased clamping pressure, and consequently, the intended control of reducing the engaging pressure can be promptly carried out without causing a slip of the clutch during reduction of the engaging pressure.

In a further embodiment of any of the above aspects of the invention, a second engaging pressure of the clutch to be established before the last one of the plurality of stages at which the engaging pressure is reduced until the clutch slips is set to a pressure obtained by correcting an engaging pressure required for transmitting a torque actually applied to the clutch based on an engaging pressure established during normal engagement control under which pressure reduction control is not performed.

In the process of reducing the engaging pressure until the clutch slips, the second engaging pressure to be set immediately before the last stage of pressure reduction control that leads to a clutch slip is corrected with the engaging pressure during normal clutch engagement control under which pressure reduction control is not performed. Accordingly, the second engaging pressure can be made close to the actually required clutch engaging pressure, and thus can be promptly or rapidly reduced without causing a slip.

In a still further embodiment of any of the above aspects of the invention, the engaging pressure at which the clutch is re-engaged is determined as an engaging pressure that provides no excess transmitted torque of the clutch, and the engaging pressure of the clutch is set to a pressure level obtained by adding the predetermined value that provides a predetermined excess amount of the transmitted torque, to the engaging pressure at which the clutch is re-engaged.

In the embodiment as described just above, the engaging pressure that provides not transmitted torque of the clutch is clearly determined, and the clutch is engaged at the engaging pressure obtained by adding a predetermined value (i.e., an excess pressure) to the thus determined engaging pressure. Thus, the excess amount of the transmitted torque of the clutch can be controlled to an appropriate value.

In another embodiment of any of the above aspects of the invention, the control apparatus further includes a learning unit that learns an engaging pressure at which the excess amount of the transmitted torque of the clutch becomes equal to the predetermined value.

In the embodiment as described above, the engaging pressure that provides a predetermined excess transmitted torque of the clutch is determined through learning control. Thus, the determined engaging pressure reflects the actual state of the clutch, such as differences among individual clutches or chronological changes, and the excess amount of the transmitted torque of the clutch can be controlled to an appropriate value.

In a still another embodiment of any of the above aspects of the invention, the control apparatus further includes a smoothing unit that reduces the engaging pressure of the clutch to a pressure level based on a learned value obtained by the learning unit, by subjecting the engaging pressure to smoothing control.

When the engaging pressure of the clutch to be set through pressure reduction is known as a learned value, and the engaging pressure of the clutch that is in an engaged state is reduced to a value based on the learned value obtained by learning, the pressure is not suddenly or rapidly reduced, but is gradually reduced through smoothing control. Thus, undershoot of the engaging pressure or a release of the clutch due to the undershoot can be avoided.

In a further embodiment of any of the above aspects of the invention, the learning unit learns the engaging pressure for each operating state, and, when the operating state changes between a first operating state for which learning of the engaging pressure is completed and a second operating state for which learning of the engaging pressure has not been finished, the content of control of the engaging pressure to be performed next is determined depending upon a current state of control of the engaging pressure.

In the control apparatus as described above, the content of control of the engaging pressure to be performed next is determined depending upon the current state of control of the engaging pressure, when the operating state of the power train changes between a state for which the learned value has been obtained and a state for which the learned value has not been obtained, in the process of reducing the engaging pressure of the clutch that is in the engaged state and causing a slip, or in the process of increasing the engaging pressure of the clutch after a slip, or in the state in which the clutch is re-engaged. When the operating state is changed into the state for which the learned value has been obtained, therefore, the engaging pressure can be controlled using the learned value, and unnecessary control is omitted. When the operating state is changed into the state for which the learned value has not been obtained, on the other hand, the learned value can be obtained.

In a still further embodiment of any of the above aspects of the invention, the re-engaging unit increases the engaging pressure so as to re-engage the clutch and inhibits learning of the engaging pressure by the learning unit when a slip of the clutch is detected while the engaging pressure of the clutch is being reduced by the engaging pressure reducing unit or while the clutch is maintained at the engaging pressure at which the clutch is re-engaged.

When a slip of the clutch occurs in the process of controlling the engaging pressure of the clutch to a pressure level that provides a certain excess transmitted torque, the engaging pressure is increased so as to re-engage the clutch, and learning of the engaging pressure is inhibited. Thus, an excessively large slip of the clutch can be avoided, and at the same time erroneous learning of the engaging pressure can be avoided.

BRIEF DESCRIPTION OF THE DRAWINGS

The foregoing and/or further objects, features and advantages of the invention will become more apparent from the following description of preferred embodiments with reference to the accompanying drawings in which like numerals are used to represent like element and wherein:

FIG. 9 is executed;

DETAILED DESCRIPTION OF EXEMPLARY EMBODIMENTS

Figure 23:
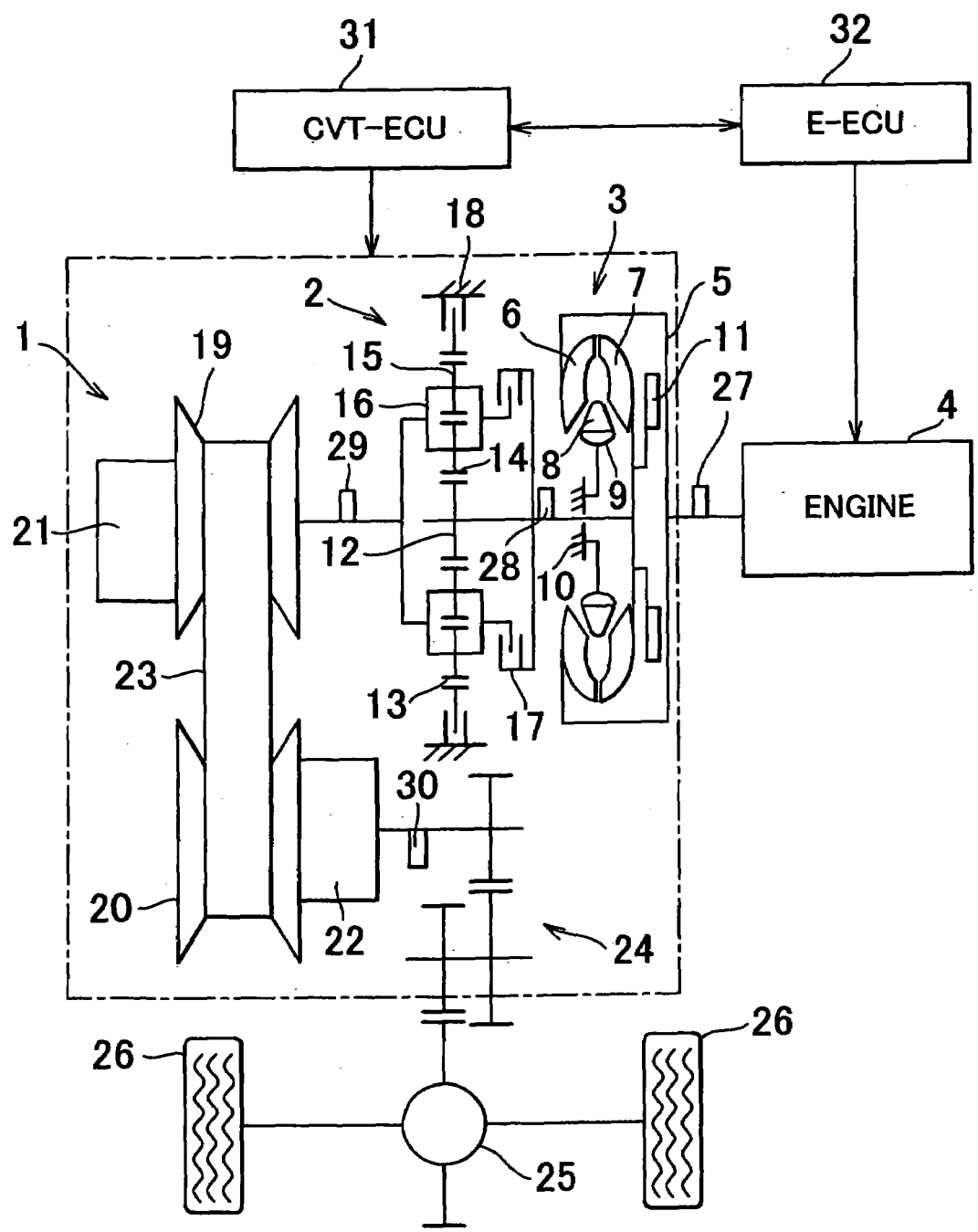
FIG. 23 is a view schematically showing a power train including a continuously variable transmission, which power train is controlled by the control apparatus according to the invention.

Some exemplary embodiments of the invention will be described in detail. Initially, a power train including a continuously variable transmission, which employs a control apparatus according to the invention, will be explained. The continuously variable transmission of the power train installed on a vehicle may be a belt-and-pulley type continuously variable transmission using a belt as a torque transmitting member, or may be a toroidal-type (or traction-type) continuously variable transmission using a power roller as a torque transmitting member and utilizing shearing force of oil (traction oil) for transmitting torque. FIG. 23 schematically shows one example of a vehicle power train including a belt-and-pulley type continuously variable transmission 1 (which will be referred to as "CVT" when appropriate). As shown in FIG. 23, the CVT 1 is operatively connected to a driving power source 4 via a forward/reverse drive switching mechanism 2 and a torque converter 3.

The driving power source 4 may be selected from various types of power sources generally installed on vehicles. More specifically, the driving power source 4 may be an internal combustion engine, such as a gasoline engine, diesel engine, or a natural gas engine, or an electric motor, or a mechanism as a combination of an internal combustion engine and an electric motor. In this embodiment, an engine 4 is employed as the driving power source.

The torque converter 3 coupled to an output shaft of the engine 4 has a structure similar to that of a torque converter employed in a conventional vehicle. More specifically, the torque converter 3 includes a front cover 5 coupled to the output shaft of the engine 4, a pump impeller 6 formed integrally with the front cover 5, and a turbine runner 7 that is opposed to the pump impeller 6 and is disposed adjacent to the inner surface of the front cover 5. A large number of blades or vanes (not shown) are formed on the pump impeller 6 and the turbine runner 7. In operation, rotation of the pump impeller 6 sets up a spiral flow of fluid, which is in turn directed into the turbine runner 7, so that torque developed by the pump impeller 6 is transmitted to the turbine runner 7 to rotate the same.

On the radially inner side of the pump impeller 6 and the turbine runner 7, a stator 8 is provided for selectively changing the direction of flow of the fluid from the turbine runner 7 and directing the flow of the fluid toward the pump impeller 6. The stator 8 is coupled to a certain stationary portion 10 via a one-way clutch 9.

The torque converter 3 includes a lockup clutch (L/U clutch) 11 corresponding to a clutch according to the invention. The lockup clutch 11 is arranged in parallel with the substantial torque converter consisting of the pump impeller 6, turbine runner 7 and the stator 8, and is held by the turbine runner 7 so as to face the inner surface of the front cover 5. When the lockup clutch 11 is pressed by a hydraulic pressure against the inner surface of the front cover 5, torque is directly transmitted from the front cover 5 as an input member of the torque converter to the turbine runner 7 as an output member thereof. The torque capacity of the lockup clutch 11 can be controlled by controlling the hydraulic pressure applied thereto.

The forward/reverse drive switching mechanism 2 is employed in view of the fact that the engine 4 rotates only in one direction. This mechanism 2 is arranged to output torque in the same direction as the engine 4 or in the reverse direction. In the example shown in FIG. 23, a double-pinion type planetary gear set is used as the forward/reverse drive switching mechanism 2.

In the forward/reverse drive switching mechanism 2, a ring gear 13 is disposed concentrically with a sun gear 12, and a pinion gear 14 that meshes with the sun gear 12 and another pinion gear 15 that meshes with the pinion gear 14 and the ring gear 13 are disposed between the sun gear 12 and the ring gear 13. The pinion gears 14, 15 are supported by a carrier 16 such that the gears 14, 15 are rotatable about their own axes and about the axis of the planetary gear unit. In addition, a forward drive clutch 17 is provided for coupling two rotary elements (i.e., the sun gear 12 and the carrier 16) to rotate as a unit, and a reverse drive brake 18 is provided for selectively fixing the ring gear 13 so as to reverse the direction of torque output from the switching mechanism 2.

The CVT 1 has a structure similar to those of conventional belt-and-pulley type continuously variable transmissions. In the CVT 1, each of a drive pulley 19 and a driven pulley 20 that are arranged in parallel with each other consists of a stationary sheave and a movable sheave that is adapted to move forward and backward in the axial direction by a corresponding hydraulic actuator 21, 22. A belt 23 is wound around the drive pulley 19 and the driven pulley 20 for torque transmission. With this arrangement, the groove width of each pulley 19, 20 changes as the movable sheave moves in the axial direction, whereby the positions of the belt 23 on the pulleys 19, 20 (the effective diameters of the pulleys 19, 20) are continuously changed, and the speed ratio is steplessly or continuously changed. The drive pulley 19 is coupled to the carrier 16 as an output element of the forward/reverse drive switching mechanism 2.

A hydraulic pressure (a line pressure or its corrected pressure) that varies with the torque received by the CVT 1 is supplied to the hydraulic actuator 22 associated with the driven pulley 20, via a hydraulic pump (not shown) and a hydraulic control device. With the belt 23 pinched or clamped by the sheaves of the driven pulley 20, tension force is applied to the belt 23 to ensure a clamping or pinching pressure (or contact pressure) between each of the pulleys 19, 20 and the belt 23. In other words, the torque capacity that depends upon the clamping pressure is set. On the other hand, a hydraulic pressure that depends upon the speed ratio to be established is supplied to the hydraulic actuator 21 associated with the drive pulley 19, so that a groove width (effective diameter) of the drive pulley 19 is set to a value that varies with the target speed ratio.

The driven pulley 20 serving as an output member of the CVT 1 is coupled to a pair of gears 24 and a differential gear set 25, and the differential gear set 25 is coupled to right and left drive wheels 26.

Various sensors are provided for sensing operating conditions of the vehicle on which the CVT 1 and the engine 4 are installed. The sensors include an engine speed sensor 27 that outputs a signal indicative of the speed of revolution of the engine 4 (i.e., the input rotational speed of the lockup clutch 11), a turbine speed sensor 28 that outputs a signal indicative of the speed of rotation of the turbine runner 7 (i.e., the output rotational speed of the lockup clutch 11), an input rotational speed sensor 29 that outputs a signal indicative of the speed of rotation of the drive pulley 19, and an output rotational speed sensor 30 that outputs a signal indicative of the speed of rotation of the driven pulley 20.

An electronic control unit (CVT-ECU) 31 for transmission is provided for controlling engagement and disengagement of the forward drive clutch 17 and the reverse drive brake 18, the clamping pressure applied to the belt 23, the torque capacity of the lockup clutch 11 (including engagement and disengagement of the clutch 11), and the speed ratio. For example, the electronic control unit 31 includes a microcomputer as a main component, and is arranged to perform arithmetic operations according to certain programs based on input data and preliminarily stored data, and execute controls, such as setting of various operating states, such as forward-drive, reverse-drive and neutral states. setting of a required clamping pressure, and setting of the speed ratio. Furthermore, an electronic control unit (E-ECU) 32 for engine is provided for controlling the engine 4, and is arranged to transmit data between the electronic control units 31, 32.

The control apparatus of this embodiment for controlling the power train including the CVT 1 is constructed such that the lockup clutch 11 functions as "torque fuse" with respect to the CVT 1. More specifically, when the vehicle is in a steady running state or a quasi-steady running state in which torque variations are small, the torque capacity of the CVT 1 and the torque capacity of the lockup clutch 11 are set such that no slippage is caused by the torque applied to the CVT 1 or the lockup clutch 11 in the current running state, and such that an excess of the torque capacity (or transmitted torque) of the lockup clutch 11 is set smaller than that of the CVT 1. The excess of the torque capacity means an excess torque capacity that is added or given, for the sake of safety, to the minimum torque capacity in the range in which no slip of the belt 23 or clutch 11 takes place. This control is intended for preventing slippage of the belt 23 in the CVT 1 by causing the lockup clutch 11 to slip before the CVT 1 slips, when the torque applied to the power train increases (i.e., increases in the positive direction) or decreases (i.e., increases in the negative direction).

The control apparatus according to the present embodiment of the invention implements the following control operation so that the above type of clutch (i.e., lockup clutch 11) functions as "torque fuse" with respect to the CVT 1. FIG. 1 through FIG. 6 show a flowchart that represents an example of the control operation, and FIG. 7 is a time chart showing changes in the engine speed, the engaging pressure (hydraulic pressure) of the lockup clutch 11, and the belt clamping force that determines the transmitted torque of the CVT 1, when the control routine of FIGS. 1–6 is executed.

Figure 1:
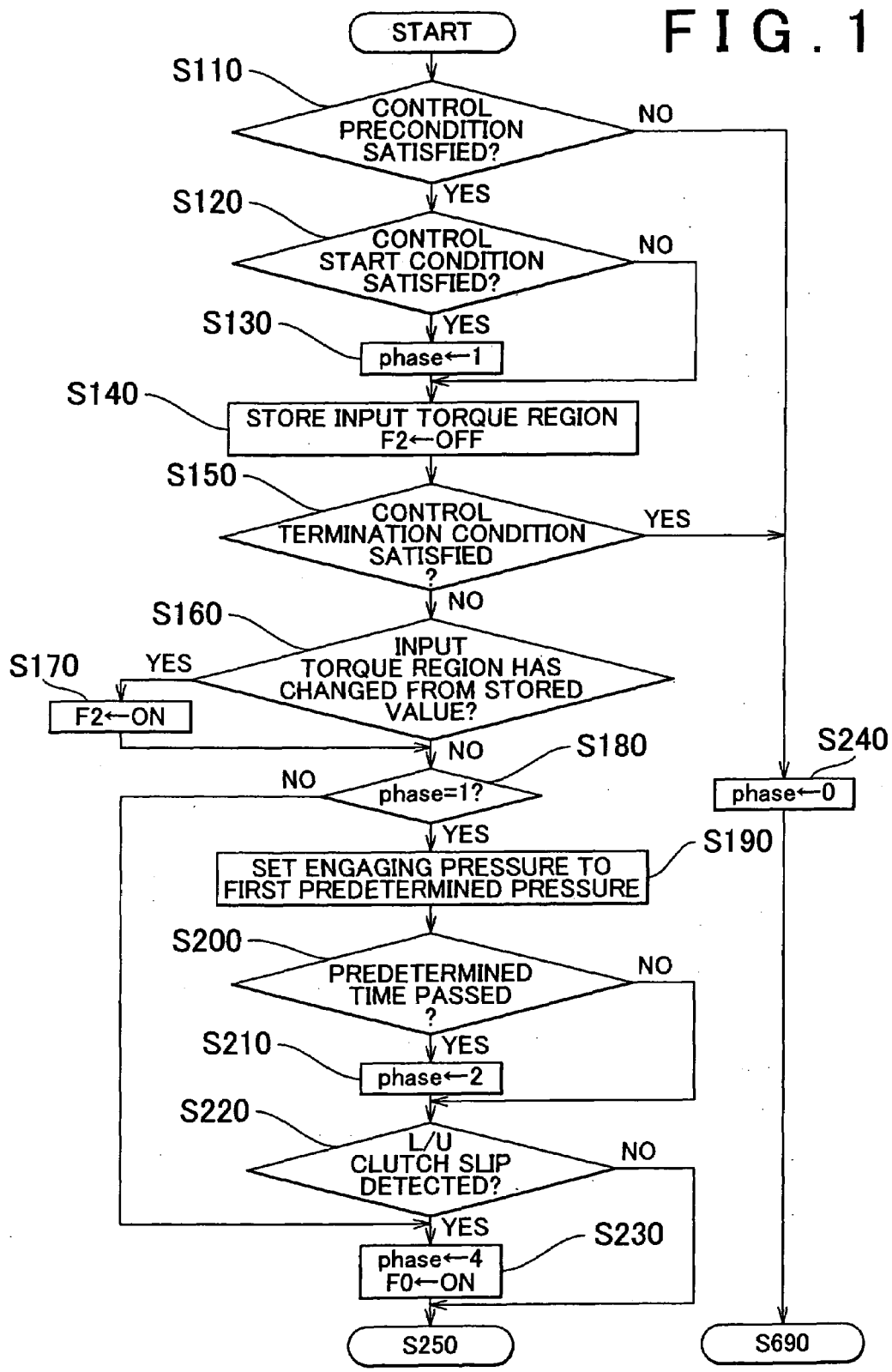
FIG. 1 is a view showing a part of a flowchart useful for explaining one example of control executed by a control apparatus according to one exemplary embodiment of the invention.

In order to set the engaging pressure (hydraulic pressure) of the lockup clutch 11 so as to provide an excess transmitted torque of the lockup clutch 11, control is initiated under a condition that the lockup clutch 11 is stably held in the ON state. This is a precondition for the control as described above. As shown in FIG. 1, step S110 is initially executed to determine whether the precondition is satisfied.

The precondition that the lockup clutch 11 is stably held ON is satisfied when an engaging pressure is established which keeps the lockup clutch 11 in the engaged state without causing a slip in the current normal running state, and the engaging pressure thus established is not a transitional one but is maintained with high stability. This precondition needs to be satisfied because control is performed to reduce the engaging pressure down to a level at which the lockup clutch 11 is about to slip or starts slipping, namely, until the clutch 11 shifts from the engaged state to a state immediately before a slip occurs or a state in which the clutch 11 starts slipping, as described later.

Figure 6:
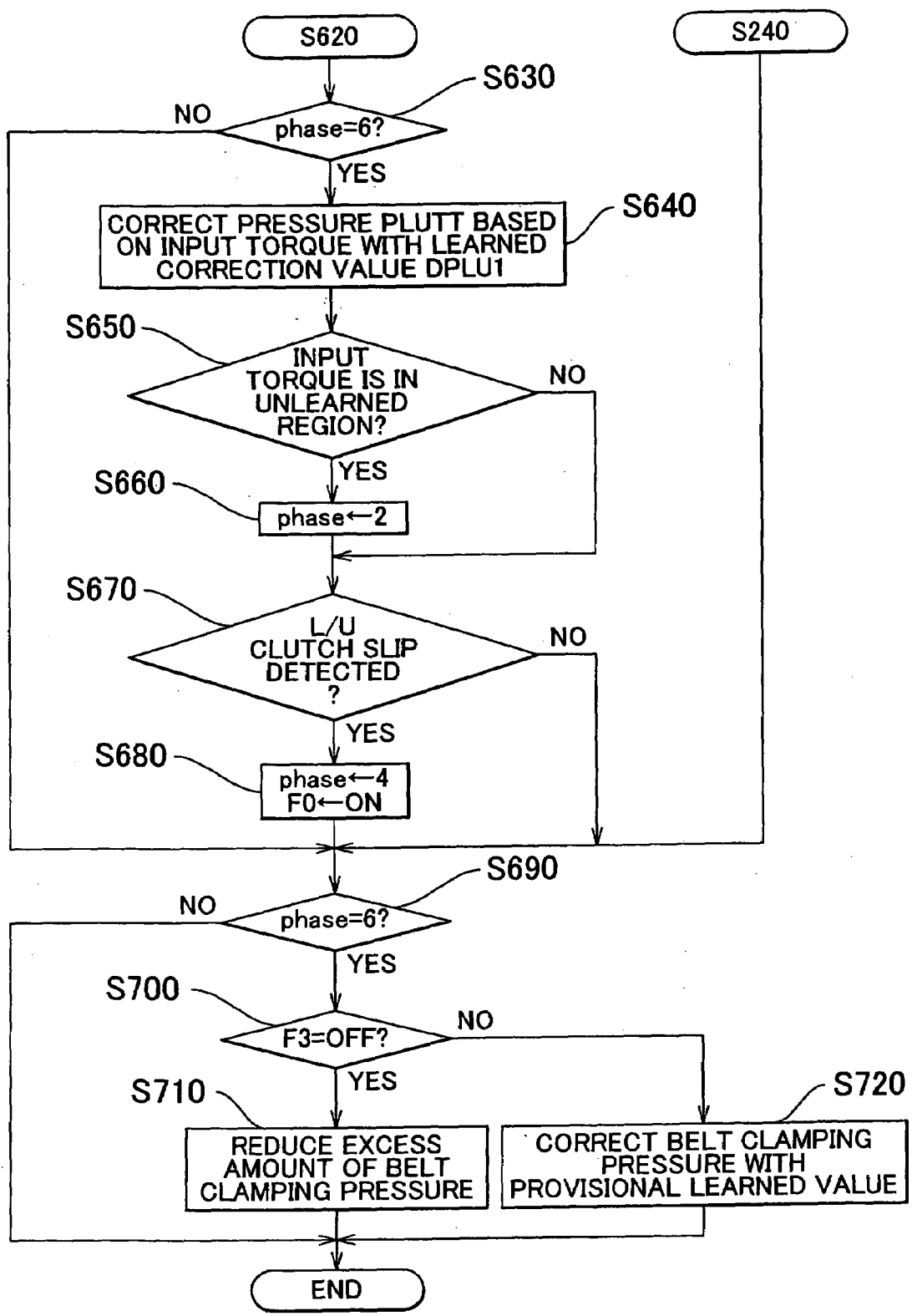
FIG. 6 is a view showing a part of the flowchart following that of FIG. 5, for explaining the example of control executed by the control apparatus.
Figure 7:
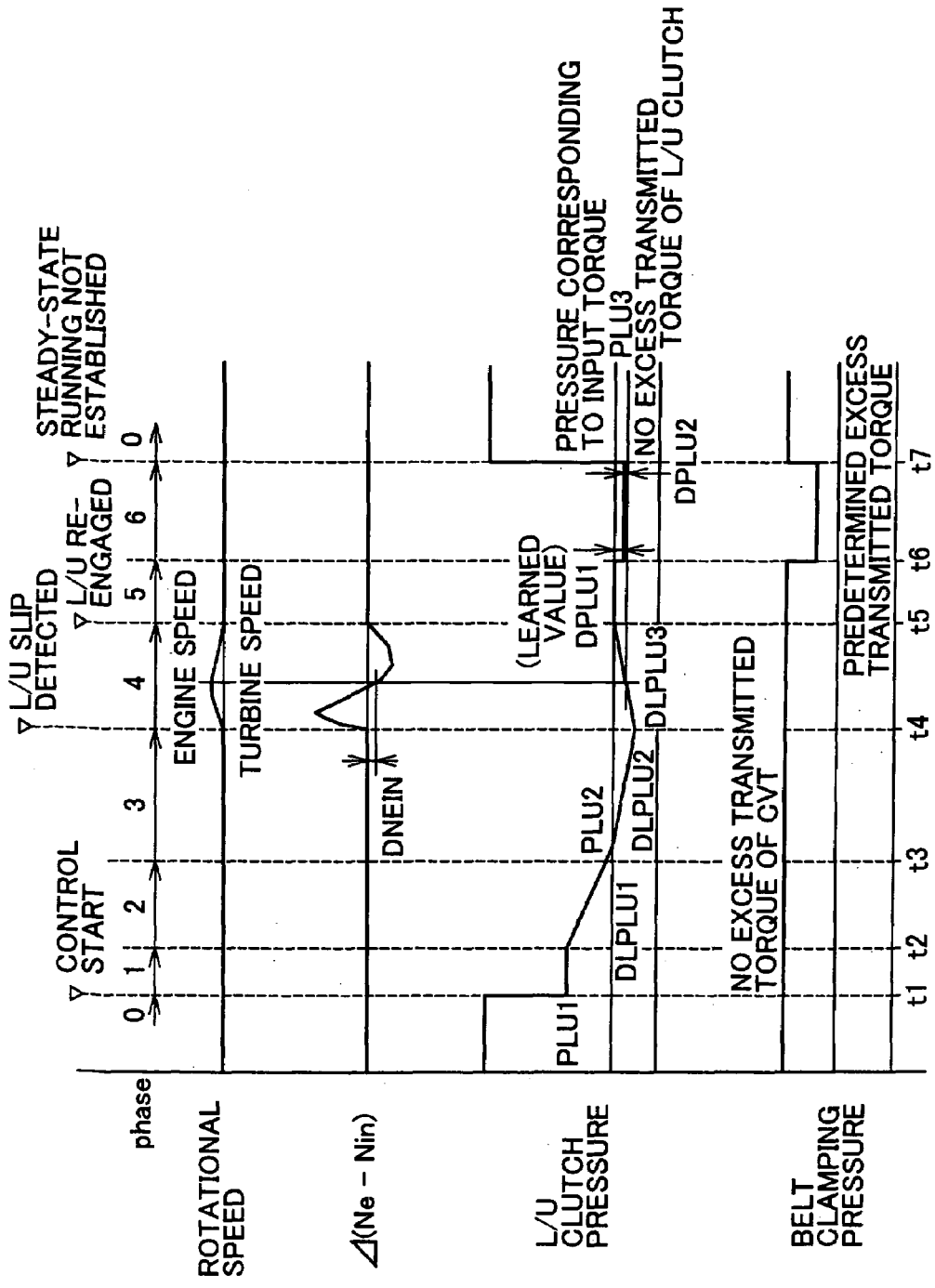
FIG. 7 is a time chart showing changes in the input and output rotational speeds of a lockup clutch, changes in the engaging pressure of the lockup clutch, and changes in the belt clamping pressure, when the control according to the flowchart of FIG. 1 through FIG. 6 is executed.

Referring to FIG. 7, the precondition for the control is satisfied if the power train including the engine 4, torque converter 3 and the CVT 1 is in an operating state prior to a point of time t1. Up to this point t1, the engine speed Ne and the turbine speed Nt are held substantially constant with high stability, and the hydraulic pressure of the lockup clutch (L/U clutch) 11 is held at a sufficiently high level at which no slip occurs. Furthermore, the belt clamping pressure is held at a sufficiently high level at which no slip occurs. The power train is controlled in this manner in the normal running state. In FIG. 7, the period of the control up to point t1 is denoted by "phase 0". The "phase" in FIG. 7 is a symbol assigned to each content of control to be executed, and also serves to indicate the flow of control steps in the flowchart of FIG. 1 through FIG. 6.

When an affirmative determination is made in step S110, it is determined in step S120 whether a control start condition is satisfied. If it is determined that the control start condition is established, the phase is set to 1, namely, "phase 1" is established in step S130. If the control start condition has already been established, a negative determination is made in step S120, and the control skips step S130 and proceeds to step S140.

The control for causing the lockup clutch 11 to function as a torque fuse can be implemented when a driving torque (or positive torque) applied from the engine 4 or a negative torque applied from the drive wheels 26 is stable. Thus, the control is performed under a condition that the vehicle is in a steady or quasi-steady running state. This is the above-indicated control start condition. The steady or quasi-steady running state is established when variations in the accelerator position (i.e., the amount of depression of an accelerator pedal that is not illustrated) or the torque on the output side of the CVT 1 (e.g., the axial torque of the driven pulley 20) in a predetermined period of time are within a predetermined range. The predetermined range may vary with the vehicle speed.

In step S140, a region of the input torque at the current point of time is stored in a memory, and flag F2 is set to "OFF" to be initialized. The input torque region mentioned here is one of a plurality of regions or ranges into which the input torque is divided so that various kinds of controls can be performed with respect to each input torque region. Thus, the operating state of the vehicle is considered as being changed when the input torque shifts from one region to another region.

After the input torque region is stored, it is determined in step S150 whether a control termination condition is established. The control termination condition is satisfied when any of operating states that constitute the above-indicated control start condition ceases to be established. For example, the control termination condition is satisfied when the vehicle ceases to be in a steady or quasi-steady running state, or when the lockup clutch 11 slips and ceases to be in an engaged state.

If the control termination condition is not satisfied, and a negative determination is made in step S150, it is determined in step S160 whether the input torque region has changed from the stored value. Since various kinds of controls, including learning of the engaging pressure of the lockup clutch 11, are performed with respect to each input torque region, the controls need to be performed in accordance with the updated input torque if it was changed. For this reason, the determination of step S160 is made. When an affirmative determination is made in step S160, flag F2 is set to "ON" in step S170.

A change of the input torque may be caused by, for example, a change in the air/fuel ratio of an air-fuel mixture burned in the engine 5 if it is capable of lean-burn, or may be caused by ON/OFF switching of accessories, such as an air conditioner if the engine load changes depending upon the ON/OFF state of the accessories. Accordingly, step S160 may be replaced by a step for determining a change of the air/fuel ratio or determining switching of the ON/OFF state of the accessories.

If an affirmative determination is made in step S160 and flag F2 is set to "ON", or if a negative determination is made in step S160, it is determined in step S180 whether the "phase 1" has been established. Since the "phase 1" is established when the control start condition is satisfied as described above, an affirmative determination is made in step S180. In the following step S190, the engaging pressure (hydraulic pressure) of the lockup clutch 11 is set to a first predetermined pressure PLU1 at point t1 in FIG. 7.

The above control for reducing the engaging pressure of the lockup clutch 11 is intended for improving the response of control for causing slippage of the lockup clutch 11. In this control, the rate of reduction of the engaging pressure is not particularly restricted, namely, the engaging pressure is controlled to be immediately lowered. In other words, the slope of reduction of the engaging pressure is controlled to the maximum.

The first predetermined pressure PLU1 is an engaging pressure which does not cause slippage even in the presence of variations in the characteristics of the lockup clutch 11. The predetermined pressure PLU1 may be determined in view of the coefficient of friction µ obtained based on the input torque to the lockup clutch 11 and/or variations in characteristics in terms of the mechanism of the clutch 11. Alternatively, the predetermined pressure PLU1 may be calculated based on the input torque of the CVT 1, which is determined from the target belt clamping pressure of the CVT 1.

Subsequently, it is determined in step S200 whether a predetermined period of time has passed. The predetermined time is set to a time required for the engaging pressure to be stably held at the first predetermined pressure PLU1 as measured from the time when a command signal for reducing the engaging pressure to the first predetermined pressure PLU1 is generated. The predetermined time may be a fixed value or a map value set in accordance with the vehicle conditions. In FIG. 7, the predetermined period of time is between point t1 and point t2.

If an affirmative determination is made in step S200, the control of "phase 1" is finished, and the phase is set to 2, namely, "phase 2" is established in step S210. This step S210 starts at point t2 in FIG. 7. It is then determined in step S220 whether a slip of the lockup clutch 11 has occurred. If the predetermined period of time has not passed and a negative determination is made in step S200, the control skips step S210 and proceeds to step S220.

Step S220 is executed in order to check the current state of the lockup clutch 11. This step is provided because the control for setting a certain excess transmitted torque of the lockup clutch 11 cannot be normally executed if an unintended or unexpected slip occurs to the lockup clutch 11 in the process of the control. A slip of the lockup clutch 11 can be detected by comparing the speed of rotation of the input side of the lockup clutch 11 (e.g., the engine speed Ne) with the speed of rotation of the output side of the lockup clutch 11 (e.g., the turbine speed Nt). More specifically, a slip of the lockup clutch 11 can be detected when it is determined that the difference between these input and output speeds exceeds a threshold value.

If the control proceeds as expected, no slip of the lockup clutch 11 occurs, and therefore a negative determination is made in step S220. If an unintended slip occurs to the lockup clutch 11 for some reason, an affirmative determination is made in step S220. In this case, "phase 4" is established, and flag F0 is set to "ON" in step S230. The control then proceeds to step S250. If no slip occurs to the lockup clutch 11, and a negative determination is made in step S220, the control skips step S230 and proceeds to step S250.

Figure 2:
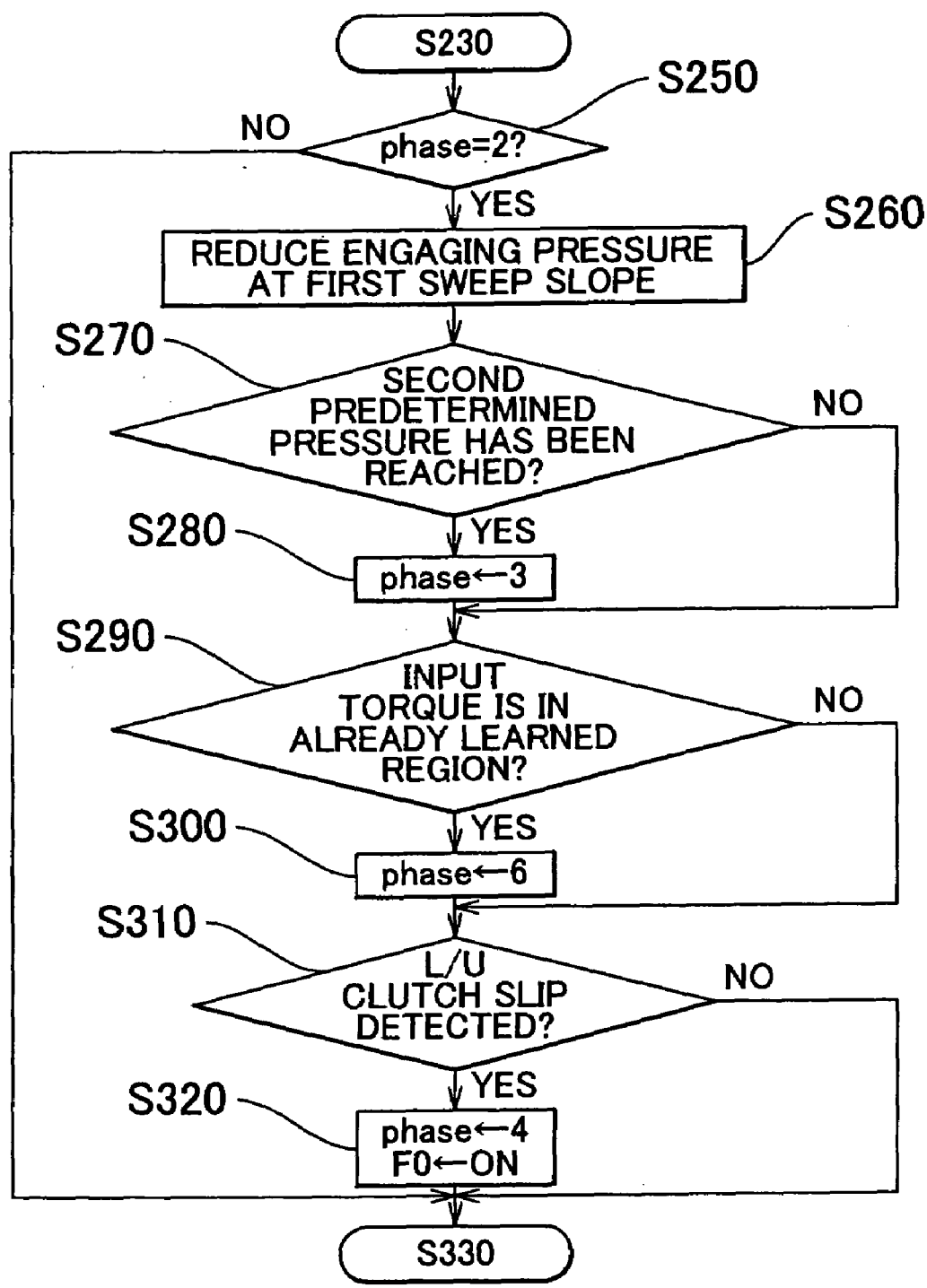
FIG. 2 is a view showing a part of the flowchart following that of FIG. 1, for explaining the example of control executed by the control apparatus.

Referring next to FIG. 2, it is determined in step S250 whether "phase 2" has been established. As described above, "phase 2" is established when the control for reducing the engaging pressure of the lockup clutch 11 to the first predetermined hydraulic pressure PLU1 is executed. Namely, where the control proceeds to step S250 skipping step S230 when the phase is set to 2 upon a lapse of the predetermined time and no unintended slip occurs to the lockup clutch 11, "phase 2" is established in step S250, and an affirmative determination is made in step S250. In this case, the engaging pressure (hydraulic pressure) of the lockup clutch 11 is reduced toward a second predetermined pressure PLU2 at a certain rate of reduction (which will be called "first sweep slope") DLPLU1 in step S260. This control is performed between point t2 and point t3 in FIG. 7.

The first sweep slope DLPLU1 is a rate of reduction that is smaller than the rate of reduction at which the engaging pressure of the lockup clutch 11 is reduced to the first predetermined pressure PLU1, but is set to a value that allows the engaging pressure of the lockup clutch 11 to be reduced rather quickly from the first predetermined pressure PLU1. In this connection, if the engaging pressure is suddenly reduced to a level at which a slip occurs to the lockup clutch 11, in the same manner in which the engaging pressure is set to the first predetermined pressure PLU1, the lockup clutch 11 undergoes an excessive slip due to undershoot, which may result in release of the lockup clutch 11. If the engaging pressure is gradually reduced from the stable engaged state so as to avoid this situation, on the other hand, the response of the control may deteriorate. In view of these situations, the engaging pressure is initially reduced to the first predetermined pressure PLU1 in one step, and is then reduced to the second predetermined pressure PLU2 at a relatively large rate or slope.

Subsequently, it is determined in step S270 whether the engaging pressure has reached the second predetermined pressure PLU2. This determination may be made by determining whether a predetermined time has passed, or may be made based on a measurement value of a hydraulic pressure sensor that is not illustrated.

The second predetermined pressure PLU2 is higher by a predetermined value than the engaging pressure at which no excess is given to the transmitted torque of the lockup clutch 11. With the engaging pressure set to the second predetermined pressure PLU2, no slip occurs in the lockup clutch 11. For example, the second predetermined pressure PLU2 may be set to a pressure level to which the engaging pressure is set when the lockup clutch 11 switches from the released (OFF) state to the engaged (ON) state during normal running of the vehicle such as when "phase 0" is established. This pressure may be obtained by adding a pressure associated with the inertia torque of the engine 4 as well as a pressure associated with an excess transmitted torque, to the engaging pressure that provides no excess transmitted torque. Thus, the above-indicated predetermined value may be set to the sum of the pressures associated with the inertia torque and the excess transmitted torque. Alternatively, the second predetermined pressure PLU2 may be obtained by adding a difference between a lockup pressure produced for switching the lockup clutch 11 from the OFF state to the ON state and a required engaging pressure determined based on the input torque at the time of switching, to a required engaging pressure determined based on the input torque at the current point of time.

If the engaging pressure of the lockup clutch 1 reaches the second predetermined pressure PLU2, and an affirmative determination is made in step S270, "phase 3" is established in step S280 so that the control proceeds to the next stage. It is then determined in step S290 whether the input torque received by the lockup clutch 11 at this point of time belongs to a region for which a learned value as described later has been obtained. If the engaging pressure has not reached the second predetermined pressure PLU2, and a negative determination is made in step S270, the control skips step S280 and proceeds to step S290 so that the control does not proceed to the next stage.

In the control explained herein, the engaging pressure of the lockup clutch 11 is controlled to a hydraulic pressure that gives a certain excess to the transmitted torque (i.e., provides a certain excess torque capacity), and thus there is a need to determine a state of the lockup clutch 11 having no excess transmitted torque. It is, however, to be noted that the engaging pressure corresponding to the state with no excess transmitted torque differs depending upon the input torque applied to the lockup clutch 11. When the engaging pressure which gives a certain excess to the transmitted torque is obtained, therefore, the obtained engaging pressure is stored in a memory in association with the input torque at that point of time, so that learning of the engaging pressure is accomplished. The learning will be described in more detail later. If the learned value with respect to the current input torque has been obtained, unnecessary control can be dispensed with by using the learned value. For this reason, it is determined in step S290 whether the input torque at this point of time belongs to a torque region for which the learned value has been obtained.

If the input torque at the current time is within a torque region for which the learned value has been obtained, and an affirmative determination is made in step S290, "phase 6" is established in step S300 so that the control proceeds to an appropriate stage, i.e., proceeds to step S310. If the input torque at the current time does not belong to a torque region for which the learned value has been obtained, and a negative determination is made in step S290, the control cannot proceeds to a stage using the learned value, and therefore skips step S290 and proceeds to step S310.

Step S310 and subsequent step S320 are similar to step S220 and subsequent step S230 (FIG. 1) as described above. Namely, a slip may occur to the lockup clutch 11 because of the reduction of the engaging pressure of the lockup clutch 11 or a change in the input torque in the process up to the above-described step S290 or step S300. It is therefore determined in step S310 whether a slip occurs to the lockup clutch 11.

Figure 3:
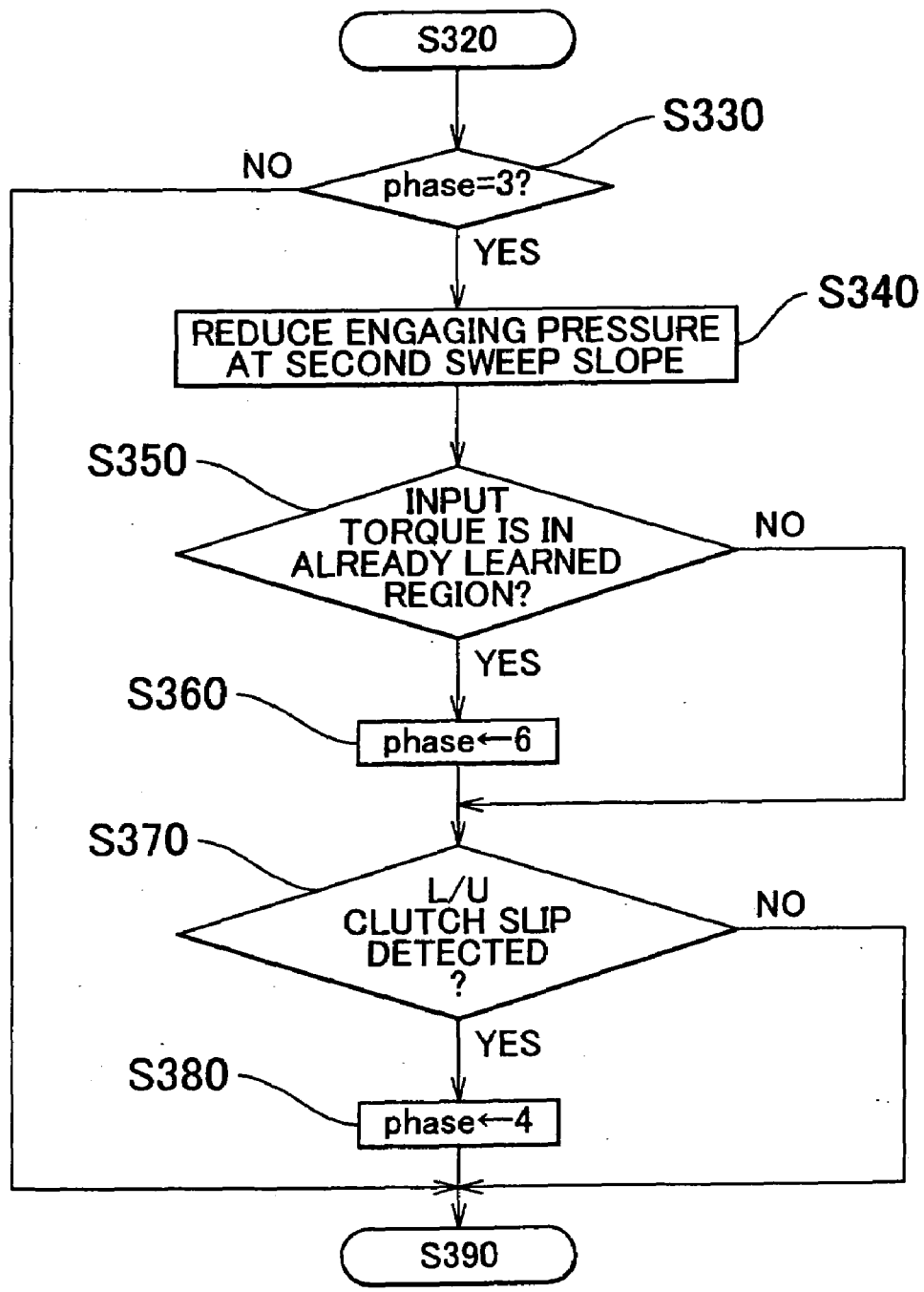
FIG. 3 is a view showing a part of the flowchart following that of FIG. 2, for explaining the example of control executed by the control apparatus.

If a slip, which is an unintended or unexpected slip, occurs to the lockup clutch 11, and an affirmative determination is made in step S310, "phase 4" is established so as to perform control in response to the slip, and flag F0 is set to "ON" in step S320. Subsequently, the control proceeds to step S330 (FIG. 3). If no slip occurs to the lockup clutch 11 and a negative determination is made in step S310, the control skips step S320 and proceeds to step S330.

It is then determined in step S330 whether "phase 3" has been established. As described above, the phase is set to "3" when the control for reducing the engaging pressure of the lockup clutch 11 to the second predetermined pressure PLU2 is completed. In this condition, if the input torque is within a region for which a learned value is not obtained, the change of the phase to "phase 6", which would otherwise occur in step S300, does not take place, and "phase 3" is maintained. Also, if no unintended slip occurs, the change of the phase to "phase 4", which would otherwise occur in step S320, does not take place, and "phase 3" is maintained. With "phase 3" thus maintained, an affirmative determination is obtained in step S330. In this case, the engaging pressure (hydraulic pressure) of the lockup clutch 11 is reduced at a certain rate of reduction (which will be called "second sweep slope") DLPLU2 in step S340, during a period between point t3 and point t4 in FIG. 7.

The second sweep slope DLPLU2 is a rate of reduction that is smaller than the first sweep slope DLPLU1 as described above. Since the engaging pressure of the lockup clutch 11 has been reduced to a relatively low level (at point t3 in FIG. 7), a slip is likely to occur to the lockup clutch 11 in response to a slight change to the hydraulic pressure. Therefore, the rate of reduction of the engaging pressure is set to a small value so as to avoid an excessively large slip of the lockup clutch 11, in other words, to avoid undershoot of the hydraulic pressure and excessively large slip or release of the lockup clutch 11 resulting from the undershoot.

It is determined in step S350 whether the input torque to the lockup clutch 11 at this point of time is within a range for which the learned value as described later has been obtained. This step S350, which is similar to the above-described step S290, is intended for utilizing the learned value associated with the engaging pressure if it has already been obtained in the previous control.

If an affirmative determination is made in step S350, "phase 6" is established in step S360 so that the control proceeds to the stage where the learned value is utilized. The step S360 is followed by step S370. To the contrary, if the input torque to the lockup clutch 11 is within a range for which the learned value has not been obtained, the phase remains the same, and the control proceeds to step S370.

The hydraulic pressure reduction control in the above step S340 is the last stage of the pressure reduction control for causing a slip in the lockup clutch 11 held in the engaged state. It is thus determined in step S370 whether a slip of the lockup clutch 11 is detected. As in the above-described step S220 or step S310, this determination can be made by comparing the input rotational speed with the output rotational speed, or comparing a difference between the input and output rotational speeds with a threshold value. More specifically, a slip of the lockup clutch 11 to be detected in step S370 is a slight slip that would occur while the engaging pressure is being reduced little by little. Such a slip of the lockup clutch 11 can be detected when a difference between the input rotational speed and the output rotational speed of the lockup clutch is kept equal to or larger than a predetermined value (for example, 50 rpm) for a predetermined period of tome (for example, 50 ms).

Figure 4:
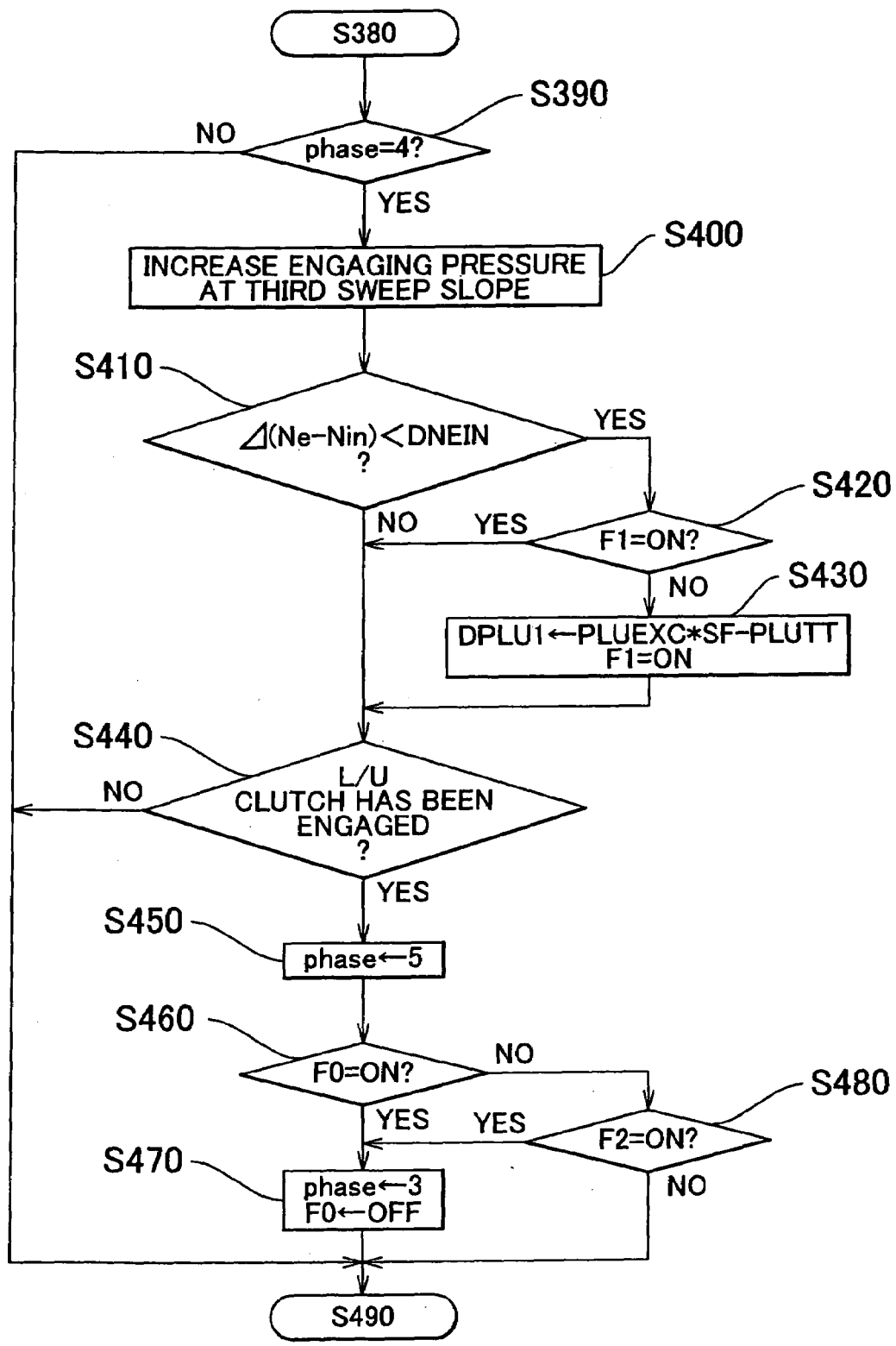
FIG. 4 is a view showing a part of the flowchart following that of FIG. 3, for explaining the example of control executed by the control apparatus.

If a slight slip occurs to the lockup clutch 11 and an affirmative determination is made in step S370, "phase 4" is established in step S380 so that the control proceeds to the next stage. Step S380 is followed by step S390 (FIG. 4). To the contrary, if no slip occurs to the lockup clutch 11 and a negative determination is made in step S370, the control cannot proceed to the next stage, and therefore the phase remains the same, and the control slips step S380 and proceeds to step S390.

In step S390, it is determined whether "phase 4" has been established. In the case where the engaging pressure of the lockup clutch 11 is reduced at the second sweep slope DLPLU2, and a slip occurs to the lockup clutch 11 as expected, the "phase 4" is established in step S380, and an affirmative determination is made in step S390.

In this condition, the engaging pressure of the lockup clutch 11 is slightly lower than the engaging pressure that provides no excess transmitted torque. After the slip of the lockup clutch 11 is detected, therefore, the engaging pressure is increased at a third sweep slope (a rate of increase of the hydraulic pressure) DLPLU3 in step S400. This control is intended for re-engaging the lockup clutch 11 which is currently in a slightly slipping state, and the third sweep slope DLPLU3 is set to the minimum so that the lockup clutch 11 is re-engaged with no excess given to the transmitted torque. With this control, the hydraulic pressure for engaging the lockup clutch 11 is increased at a considerably small rate between point t4 and point t5 in FIG. 7.

Subsequently, it is determined in step S410 whether the torque capacity of the lockup clutch 11 starts being increased. This determination is made by determining whether a rate of change Δ(Ne−Nin) of a difference between the engine speed Ne as an input rotational speed of the lockup clutch 11 and the input rotational speed of the CVT 1 as an output rotational speed of the clutch 11 is smaller than a predetermined reference value DNEIN. Namely, if the lockup clutch 11 has a small torque capacity with respect to the torque applied to the lockup clutch 11, a slip occurs in the lockup clutch 11, and the difference between the input rotational speed and the output rotational speed increases. If the lockup clutch 11 has a sufficiently large torque capacity with respect to the torque applied to the clutch 11, the slipping speed is reduced so that the lockup clutch 1 is fully engaged.

If the above-indicated reference value DNEIN is set to, for example, zero or a negative value, and an affirmative determination is made in step S410, the slip of the lockup clutch 11 is determined as being reduced or settled down to zero. The reduction of the slip to zero is caused based on the fact that the torque capacity (namely, the engaging pressure) is equal to a sufficiently large value with respect to the torque applied to the lockup clutch 11, and therefore the torque capacity or engaging pressure at this point of time is regarded as a pressure for re-engaging the lockup clutch 11 without causing a slip.

At the point of time when an affirmative determination is made in step S410, the slip of the lockup clutch 11 is being reduced down to zero but is not finished. Since a large inertia torque does not arise from changes in the rotational speeds, the engaging pressure of the lockup clutch 11 at this point of time corresponds to a torque that does not substantially include transient inertia torque. In other words, the engaging pressure at this point of time corresponds to the minimum engaging pressure required for re-engaging the lockup clutch 11. Thus, the engaging pressure at this point of time corresponds to "engaging pressure for re-engaging the clutch" as mentioned above in the Summary of the Invention.

If an affirmative determination is made in step S410, it is determined in step S420 whether the flag F1 is "ON". If the flag F1 is set at "OFF" and a negative determination is made in step S420, a learned value DPLU1 is obtained in step S430 by subtracting a command value PLUTT of the engaging pressure of the lockup clutch 11 that is generated at this point of time, from an engaging pressure obtained by giving a certain excess pressure to the engaging pressure PLUEXC of the lockup clutch 11 at this point of time. At the same time, flag F1 is set to "ON" in step S430. Subsequently, the control process proceeds to step S440. Here, "giving an excess pressure to the engaging pressure" may be achieved by multiplying the engaging pressure measured at the time when an affirmative determination is made in step S410 by a certain coefficient SF (>1), or by adding a predetermined excess pressure to the engaging pressure.

The flag F1 is set to "ON" when the learned value DPLU1 is calculated. Therefore, if the learned value DPLU1 has already been calculated, an affirmative determination is made in the above step S420. In this case, the control proceeds to step S440 without calculating the learned value DPLU1 again (namely, skipping step S430). If the rate of change Δ(Ne−Nin) of the difference between the input and output rotational speeds of the lockup clutch 11 is equal to or greater than the reference value DNEIN, and a negative determination is made in step S410, the control proceeds to step S440.

In step S440, it is determined whether a determination as to engagement of the lockup clutch 11 has been made affirmative, namely, whether the lockup clutch 11 has been engaged. While a difference between the input rotational speed and the output rotational speed is eliminated if an excess of the transmitted torque is equal to zero, this phenomenon also occurs when the excess of the transmitted torque is excessively large. Thus, re-engagement of the lockup clutch 11 in the state with no excess transmitted torque cannot be necessarily accurately detected. Accordingly, re-engagement of the lockup clutch 11 is determined to be established when the difference between the input rotational speed and the output rotational speed of the lockup clutch 11 is kept smaller than a predetermined value (for example, 50 rpm) for a predetermined time (for example, 10 ms) while the engaging pressure is being increased at the third sweep slope DLPL3. In FIG. 7, this determination is made at point t5. It is to be noted that the engaging pressure of the lockup clutch 11 at this point of time is set according to the input torque.

The "phase 4" is finished at point t5, and "phase 5" is established in step S450 so that the control proceeds to the next stage. Following step S450, it is determined in step S460 whether flag F0 is set at "ON". As described above, flag F0 is set to "ON" (in step S230 or step S320) when an unintended or unexpected slip of the lockup clutch 11 is detected in the process of control of the engaging pressure. Thus, step S460 is provided for determining whether the lockup clutch 11 was re-engaged after the unintentional slip.

If an affirmative decision is made in step S460, "phase 3" is established so that the control of "phase 3" with respect to the unintended slip of the lockup clutch 11 is performed, and flag F0 is set to "OFF" in step S470. Subsequently, the control proceeds to step S490.

Figure 5:
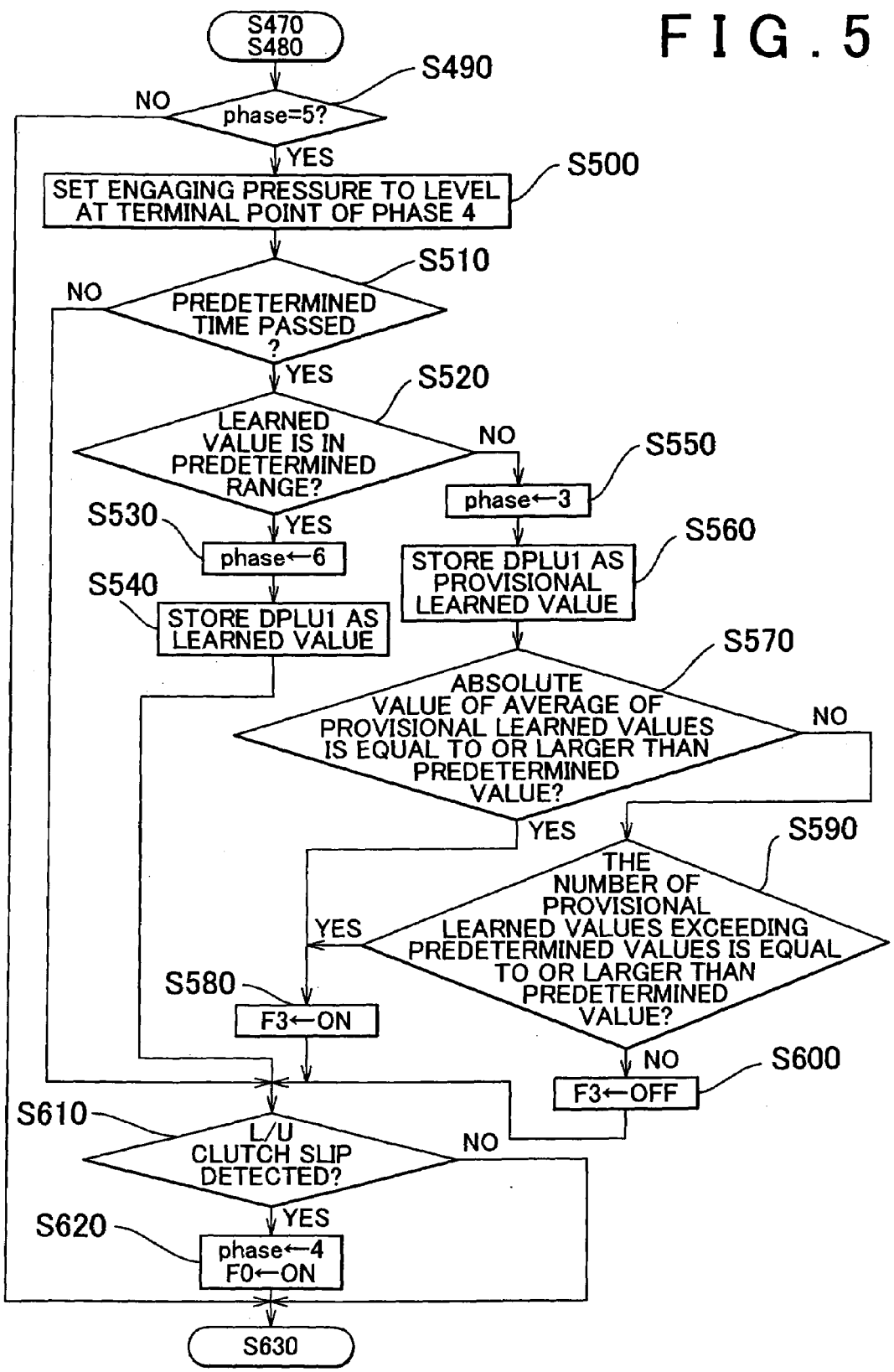
FIG. 5 is a view showing a part of the flowchart following that of FIG. 4, for explaining the example of control executed by the control apparatus.

If the lockup clutch 11 is re-engaged after an intended or expected slip occurs, and a negative determination is made in step S460, it is determined in step S480 to determine whether the flag F2 is set at "ON". Namely, it is determined whether the input torque has changed into a different region. An affirmative determination is made in step S480 when the input torque changes thereby to change a precondition for learning of the engaging pressure. In this case, the control proceeds to step S470 to establish "phase 3" so that the control of "phase 3" is performed, and set the flag F0 to "OFF". Namely, the lockup clutch 11 is released and then re-engaged, for the purpose of effecting learning of the engaging pressure again. To the contrary, if a negative determination is made in step S480, namely, when no change occurs in the input torque, the control proceeds to step S490 (FIG. 5).

In step S490, it is determined whether "phase 5" has been established. Where the engaging pressure is slowly reduced until a slight slip occurs in the lockup clutch 11, and thereafter the engaging pressure is increased at the minimum slope until re-engagement of the lockup clutch 11 is determined, "phase 5" is established and an affirmative determination is made in step S490. Namely, if the behavior of the lockup clutch 11 changes as expected or plotted in accordance with changes in the engaging pressure, the control proceeds to "phase 5".

If an affirmative determination is made in step S490, step S500 is executed to set the engaging pressure of the lockup clutch 11 to a pressure level achieved at the terminal point (t5 in FIG. 7) of "phase 4", namely, a hydraulic pressure (corresponding to the input torque) established at the time when re-engagement of the lockup clutch 11 is determined. In the following step S510, it is determined whether a predetermined period of time has passed. This period of time, which ranges from point t5 to point t6 in FIG. 7, is a predetermined time required for the engaging pressure of the lockup clutch 11 to be stably held at the pressure level achieved at point t5.

If the predetermined time has passed, and an affirmative determination is made in step S510, it is determined in step S520 whether the above-described learned value DPLU1 is within a predetermined range. This determination can be made by comparing the calculated learned value DPLU1 with a predetermined reference value, or by determining whether the learned value is larger or smaller than the average of learned values in a certain number of torque regions, and determining that the learned value is out of the predetermined range when the difference between the learned value and the average is large. It is also possible to make this determination based on the average value of the learned values DPLU1 that were sequentially obtained.

In the absence of an abnormality in the hydraulic control system or an abnormality in friction devices of the lockup clutch 11 or a change in the fluid of the torque converter 3, the learned value DPLU1 is held within the predetermined range. In the presence of any abnormality or change, however, the learned value may become considerably large due to its influence. Thus, it is determined in step S520 whether the learning was normally carried out.

If the learned value DPLU1 is within the predetermined range, and an affirmative determination is made in step S520, "phase 6" is established in step S530 so that the control proceeds to the next stage. In the following step S540, the above-described learned value DPLU1 is stored in the memory.

More specifically, the learned value DPLU1 represents a difference between the engaging pressure obtained by giving a certain excess pressure to the engaging pressure at which the lockup clutch 11 is re-engaged after a slip occurs to the lockup clutch 11, and an engaging pressure that is preset or stored as an engaging pressure corresponding to the current input torque. Thus, the learned value DPLU1 is stored as a value for correcting the engaging pressure of the lockup clutch 11.

It is to be understood that the learned value DPLU1 is stored for each of the plurality of regions into which the input torque is divided, and the relationship between the thus obtained learned values and respective torque regions is stored in the form of a map. The determinations in the above-described step S290 and step S350 are made based on the presence or absence of the thus obtained learned value with respect to the input torque at the point of time when step S290 or step S350 is executed.

If the learned value DPLU1 exceeds the predetermined range, and a negative determination is made in step S520, "phase 3" is established in step S550 so as to effect learning again. Also, the learned value DPLU1 obtained in step S430 is stored as a provisional learned value in step S560 so that the control of the belt clamping pressure of the CVT 1 reflects the learned value DPLU1 even though it exceeds the predetermined range. It is then determined in step S570 whether an absolute value of the average of provisional learned values DPLU1 is equal to or larger than a predetermined value. If an affirmative determination is made in step S570, the provisional learned values DPLU1 greatly deviate from the nominal range, and flag F3 is set to "ON" in step S580.

If a negative determination is made in step S570, it is determined in step S590 whether the number of provisional learned values DPLU1 that exceed the predetermined value is equal to or larger than a predetermined value. Namely, it is determined whether a large number of learned values DPLU1 are excessively large or excessively small even though the absolute value of the average of these values is smaller than the predetermined value. If an affirmative determination is made in step S590, the control proceeds to step S580 to set flag F3 to "ON". If a negative determination is made in step S590, on the other hand, flag F3 is set to "OFF" in step S600. In this case, the learned value DPLU1 is not reflected by the belt clamping pressure of the CVT 1.

After the above-described step S540 or step S580 or step S600 is executed, the control proceeds to step S610. If the predetermined time has not passed, and a negative determination is made in step S510, the control immediately proceeds to step S610. In this case, "phase 5" is maintained without proceeding to "phase 6".

In step S610, it is determined whether an unintended slip occurs to the lockup clutch 11 at this point. This step S610 is similar to step S220 or step S310. If an affirmative determination is made in step S610, "phase 4" is established in step S620 so as to carry out control in response to the slip, and flag F0 is set to "ON" in step S620. Subsequently, the control proceeds to step S630 (FIG. 6). If no slip occurs to the lockup clutch 11, and a negative determination is made in step S610, the control skips step S620 and proceeds to step S630.

In step S630, it is determined whether "phase 6" is established. As described above, the difference between the engaging pressure obtained by giving a certain excess pressure to the engaging pressure at which the lockup clutch 11 is re-engaged and the engaging pressure commanded or set in accordance with the input torque is stored as the learned value DPLU1. Since "phase 6" is established if no abnormality is observed in the learned value DPLU1, an affirmative determination is made in step S630 unless an unintentional slip of the lockup clutch 11 is detected.

In this case, step S640 is executed to determine the engaging pressure of the lockup clutch 11 by adding the above-indicated learned value DPLU1 as a correction value, to the engaging pressure PLUTT determined based on the input torque. Where the learned value DPLU1 is a negative value, the engaging pressure of the lockup clutch 11 is obtained by subtracting the absolute value of the learned value DPLU1 from the engaging pressure PLUTT. Thus, the engaging pressure that has been obtained based on the input torque is corrected by using the above-indicated learned value DPLU1. Consequently, the engaging pressure of the lockup clutch 11 is set to a pressure level obtained by adding a predetermined excess pressure DPLU2 to an engaging pressure that provides no excess transmitted torque with respect to the input torque at the current point of time (namely, a hydraulic pressure having no excess pressure). The thus obtained pressure reflects the actual state of the CVT 1 or the power train. This control is performed at point t6 in FIG. 7. The excess extra pressure DPLU2 is determined such that the resulting pressure (i.e., sum of the pressure with no excess and the excess pressure) does not cause a slip in the lockup clutch 11 in a steady or quasi-steady running state, but causes a slip in the lockup clutch 11 when a torque that exceeds the torque applied in the steady or quasi-steady running state is applied to the clutch 11.

The input torque applied to the lockup clutch 11 may change while the engaging pressure of the lockup clutch 11 is being set as described above. In view of this situation, it is determined in step S650 following step S640 whether the input torque has entered a non-learned region, namely, whether the input torque has changed into a different region for which the learned value has not been obtained. At this time, the lockup clutch 11 is engaged without slipping, and the engaging pressure of the clutch 11 is set to a pressure level having only a small excess.

If an affirmative determination is made in step S650, the control of "phase 2" is executed so as to effect learning by causing a slight slip again. Namely, "phase 2" is established in step S660, which is followed by step S670. If the input torque is within a region for which the learned value has been obtained, and a negative determination is made in step S650, the control immediately proceeds to step S670 without changing the phase.

At this time, too, it is determined in step S670 whether an unintentional slip has occurred to the lockup clutch 11. This step S670 is similar to the above-described step S220, step S310 or step S610. If an affirmative determination is made in step S670, "phase 4" is established so as to perform control in response to the slip, and flag F0 is set to "ON" in step S680. Subsequently, the control proceeds to step S690. If no slip occurs to the lockup clutch 11, and a negative determination is made in step S670, the control skips step S680 and proceeds to step S690.

In step S690, it is determined whether "phase 6" is established. If a negative determination is made in step S690, the control routine of FIG. 1 through FIG. 6 is terminated. If an affirmative determination is made in step S690, on the other hand, it is determined in step S700 whether the above-described provisional learned value DPLU1 should be reflected by the belt clamping pressure of the CVT 1. More specifically, it is determined whether the above-indicated flag F3 is set at "OFF". As described above, flag F3 is set to "OFF" in step S600 if the absolute value of the average of the learned values DPLU1 is smaller than the predetermined value and the number of the learned values whose absolute values exceed the predetermined value is small even if the learned value DPLU1 is not within the predetermined range. Namely, flag F3 is set to "OFF" if no substantial abnormality is determined. Thus, if an affirmative determination is made in step S700, the provisional learned value DPLU1 need not be reflected by the control of the belt clamping pressure of the CVT 1, and therefore the belt clamping pressure of the CVT is reduced to a pressure level that provides a certain excess transmitted torque in step S710. As shown in FIG. 7, the belt clamping pressure thus established is a pressure obtained by adding a predetermined value to the pressure that provides no excess transmitted torque. The excess amount of the transmitted torque of the CVT 1 thus set is larger than the excess amount of the transmitted torque of the lockup clutch 11. Upon a change of a drive torque or a negative torque, therefore, the lockup clutch 11 slips before the CVT 1 does.

If flag F3 is set at "ON", and a negative determination is made in step S700, the belt clamping pressure of the CVT 1 is corrected in step S720, based on the above-described provisional learned value DPLU1. This correction may be effected by increasing the above-indicated predetermined value corresponding to the pressure that provides a certain excess transmitted torque of the CVT 1, or by inhibiting the control for reducing the belt clamping pressure to the pressure level that provides an excess transmitted torque of the CVT 1. The correction of step S720 may be effected only when the correction of the belt clamping pressure based on the provisional learned value DPLU1 results in an increase of the belt clamping pressure. This arrangement aims at preventing a slip of the CVT 1 by avoiding correction to reduce the pressure based on any abnormality.

Referring back to FIG. 1, if a negative determination is made in step S110 as shown in FIG. 1, or an affirmative determination is made in step S150, namely, when the control precondition is not satisfied or the control termination condition is satisfied, "phase 0" is established in step S240. In this case, the control immediately proceeds to step S690, and a negative determination is made in step S690, whereby the control routine of FIG. 1 through FIG. 6 is finished. In this case, torque fuse control for reducing the engaging pressure (transmitted torque) of the lockup clutch 11 or reducing the belt clamping pressure (transmitted torque) of the CVT 1 is terminated or inhibited, and the engaging pressure and belt clamping pressure are increased to respective levels to be established during normal operations, as indicated at point t7 in FIG. 7.

With the control apparatus of the present embodiment of the invention that performs the above-described control, an engaging pressure is calculated by giving a certain extra pressure to the engaging pressure for re-engaging a clutch, such as the lockup clutch 11, which is coupled in series with the CVT 1, and a difference between the calculated engaging pressure and the preset or given engaging pressure is calculated. In this manner, a correction value of the engaging pressure of the clutch is learned based on the engaging pressure to which the excess pressure is added. Thus, the clutch can be engaged at the engaging pressure that reflects the actual operating state of the CVT 1 or the power train including the CVT 1. Namely, when the clutch is used as a so-called torque fuse with respect to the CVT 1, the engaging pressure of the clutch can be controlled to an appropriate level. This control is able to avoid in advance a situation in which the clutch, such as the lockup clutch 11, slips repeatedly, causing deterioration in the power transmitting efficiency of the power train and the fuel economy.

Furthermore, when the control apparatus is arranged to implement the control as shown in FIG. 1 through FIG. 6, an engaging pressure corresponding to a torque that does not substantially include inertia torque is obtained as an engaging pressure for re-engaging the lockup clutch 11, and therefore the clutch engaging pressure can be controlled to an appropriate level in this respect, too.

In addition, when the learned value greatly deviates from the predetermined range, the deviation of the learned value is reflected by a controlled variable, such as the belt clamping pressure of the CVT 1, for setting the transmitted torque of the CVT 1. Thus, the excess amount of the transmitted torque over the transmitted torque that causes a slip of the CVT 1 can be always set larger than the excess amount of the transmitted torque of the clutch that is arranged in series with the CVT 1. Consequently, the clutch can surely functions as a torque fuse. In particular, if the correction of the transmitted torque of the CVT 1 is limited to a correction to increase the transmitted torque, the transmitted torque of the CVT 1 is prevented from being reduced even in the case where a command to reduce the transmitted torque of the CVT 1 is generated because of erroneous learning or learning that involves an abnormality. In this manner, slippage of the CVT 1 can be prevented or suppressed in advance.

Moreover, since the lockup clutch 11 slips before the CVT 1 does when the engine torque or the negative torque applied from the drive wheels suddenly changes in a steady or quasi-steady running state, slippage of the CVT 1 can be prevented with improved reliability. It is thus possible to reduce the belt clamping pressure of the CVT 1 to the minimum while preventing slippage of the CVT 1, thus assuring improved power transmitting efficiency of the CVT 1 and improved fuel economy.

The control routine of FIG. 1 through FIG. 6 as described above is repeatedly executed at predetermined short time intervals. In this process, the input torque at the time of execution of the routine may be within a region for which the learned value has already been obtained. In this case, the following control is performed.

If the input torque is within a region for which the learned value has already been obtained, an affirmative determination is obtained in step S290 shown in FIG. 2, and "phase 6" is established in step S300. This determination is made while the engaging pressure is being reduced at the first sweep slope DLPLU1 after the engaging pressure is reduced down to the first predetermined pressure PLU1 in one step.

Since "phase 6" is established in step S300, negative determinations are made in all of steps S330, S390 and S490 for determining the phase. As a result, the control immediately proceeds to step S630 where an affirmative determination is made. The control following step S630 has been described above.

When the learned value for the current input torque has been obtained, the engaging pressure is reduced in step S640 to the pressure level corrected with the learned value DPLU1 immediately after the control of "phase 1" for setting the first predetermined pressure PLU1 based on the input torque is executed. In this case, since the engaging pressure to be set is close to an engaging pressure at which a slip of the lockup clutch 11 occurs, smoothing control is preferably employed in the control of reducing the engaging pressure, so as to prevent release or excessive slippage of the lockup clutch 11 due to undershoot of the hydraulic pressure.

When the learned value has already been obtained as described above, the engaging pressure of the lockup clutch 11 can be reduced by utilizing the learned value, thus permitting quick control by eliminating a need to execute controls of "phase 2" through "phase 5" as described above.

In the case where input torque changes in the process of the series of control steps as described above, the input torque may shift from a region for which the learned value has been obtained to a region for which the learned value has not been obtained, or may shift from a region for which the learned value has not been obtained to a region for which the learned value has been obtained. In the former case, control using the learned value cannot be performed, and therefore learning needs to be performed. In the latter case, control for obtaining a learned value is not needed, and control using the learned value can be performed.

More specifically described, when the input torque of the lockup clutch 11 changes from a torque region for which the learned value has been obtained to a torque region for which the learned value has not been obtained, a negative determination is made in step S290 or step S350 as described above. Thus, when the input torque is changed into a torque region for which the learned value has not been obtained before setting the engaging pressure by adding a certain excess pressure to the engaging pressure that provides no excess transmitted torque, the series of controls from the "phase 1" through "phase 6" are executed in the order as described above.

If the input torque is changed into a torque region for which the learned value has not been obtained after setting of the engaging pressure that provides a certain excess transmitted torque of the lockup clutch 11, an affirmative determination is made in step S650 as described above. As a result, "phase 2" is established, and the control of "phase 2" is executed, as in the case where an affirmative determination is made in step S250 shown in FIG. 2. More specifically, the engaging pressure is reduced at the first sweep slope DSPLU1, and is then reduced at the second sweep slope DSPLU2 after reaching the second predetermined pressure PLU2 so that a slight slip occurs to the lockup clutch 11. After a slight slip of the lockup clutch 11 is detected, the engaging pressure is increased at the third sweep slope DSPLU3 until the lockup clutch 11 is re-engaged. After detection of re-engagement, an engaging pressure obtained by adding a certain pressure to the pressure at the time of re-engagement is established. This control is performed in step S250 and the following control steps.

An example of the case where the input torque changes from a torque region for which the learned value has not been obtained to a torque region for which the learned value has been obtained will be described. If the input torque of the lockup clutch 11 enters a torque region for which the learned value has been obtained after the engaging pressure is stepped down to the first predetermined pressure PLU1 (i.e., after the control of the "phase 1" is completed), an affirmative determination is made in the above-described step S290 shown in FIG. 1. The control in this case is similar to that in the case where the learned value has already been obtained. Namely, the control immediately proceeds to step S630, and the engaging pressure of the lockup clutch 11 is set in step S640 based on the learned value so that a certain excess is given to the transmitted torque of the lockup clutch 11.

If the input torque changes into a torque region for which the learned value has been obtained after the engaging pressure is reduced down to the second predetermined pressure PLU2, an affirmative determination is made in step S350 shown in FIG. 3. As a result, "phase 6" is established, and the control immediately proceeds to step S630 so that the engaging pressure that provides an excess transmitted torque is set based on the learned value.

After a slight slip of the lockup clutch 1 is detected, each control step is executed in the order of the series of controls as described above. Namely, there is no difference from the series of controls as described above even when the input torque changes into a different torque region.

Thus, in the control apparatus as described above, when the input torque shifts between a learned region for which the learned value has already been obtained and an unlearned region for which the learned value has not been obtained, the subsequent control is selected depending upon how far the control of the engaging pressure proceeds (i.e., depending upon the current stage of the control of the engaging pressure). Accordingly, learning of the engaging pressure can be performed as described above, and at the same time unnecessary, wasteful control can be omitted.

In the process of the above-described series of controls for controlling the engaging pressure of the lockup clutch 11 so as to provide a certain excess transmitted torque, a slip of the lockup clutch 11 may occur due to a reduction of the engaging pressure or a change in the input torque. Such a slip of the lockup clutch 11 is detected in, for example, step S220, step S310, step S370, step S610 and step S670.

If a slip occurs to the lockup clutch 11 in the course of reducing the engaging pressure to the second predetermined pressure PLU2 or when the engaging pressure is equal to the second predetermined pressure PLU2, an affirmative determination is made in step S220 or step S310. In either of the cases, "phase 4" is established and flag F0 is set to "ON" in step S230 or step S320. As a result, the control proceeds to step S390, and the following steps are sequentially executed, so that the engaging pressure is slowly increased.

With the engaging pressure thus increased, the lockup clutch 11, which has once slipped, is re-engaged in step S450. In this case, however, flag F0 is set to "ON", and therefore "phase 3" is established (in step S460 and step S470), and the control returns to "phase 3". Thus, the control does not proceed straight to step S530 shown in FIG. 5, and learning is not effected. This operation corresponds to inhibition of learning.

As described above, when an unintentional slip of the lockup clutch 11 occurs in the process of control, the lockup clutch 11 is brought back into an engaged state, and the above-described series of controls, including reduction of the engaging pressure, detection of a slip, and increase of the pressure, are carried out. At the same time, learning of the engaging pressure that provides no excess transmitted torque, and learning of the engaging pressure that gives an excess torque to the transmitted torque are inhibited upon detection of an unintentional slip.

When a slip of the lockup clutch 11 occurs while the engaging pressure is being reduced from the second predetermined pressure PLU2, an affirmative determination is made in step S370 shown in FIG. 3. Since this is an intended or expected slip, "phase 4" is established in step S380. Subsequently, the series of controls as described above are executed. Thus, there is no difference from the above-described series of controls upon occurrence of a slip at this stage.

If an unintended slip occurs after the lockup clutch 11 is re-engaged, an affirmative determination is made in step S610. In this case, "phase 4" is established, and flag F0 is set to "ON" in step S620. Then, the control returns to step S390 shown in FIG. 4, and the subsequent steps are sequentially executed, so that the engaging pressure is slowly increased. This is similar to the example as described above.

In the control as described above, when an unintended or unexpected slip occurs to the lockup clutch 11, control to be executed next is selected depending upon the present stage or state of control at the time of detection of the slip. It is thus possible to prevent the lockup clutch 11 from excessively slipping, or avoid problems, such as repetition of unnecessary controls.

In the flowchart of FIG. 1 through FIG. 6, when negative determinations are made in steps S180, S250, S330, S390, S490 and S630 for determining the phase, the control proceeds to the next phase determination step that follows the step in which the negative determination was made. When a negative determination is made in step S690, which is the last step for determining the phase, the control goes out of (i.e., finishes) the control routine as shown in FIG. 1 through FIG. 6.

The control of using the lockup clutch 11 as described above as a torque fuse with respect to the CVT 1 is intended for reducing the belt clamping pressure of the CVT 1 to the minimum for improvement of its power transmitting efficiency, and for preventing the CVT 1 from slipping even in the event of sudden disturbance. Accordingly, the conditions for starting the control may include, for example, a condition that the vehicle is in a steady running state or a quasi-steady running state in which the vehicle is running on a flat road at a substantially constant speed with the engine load being equal to or smaller than a predetermined value, and a condition that neither the lockup clutch 11 nor the CVT 1 slips. When any of the control start conditions ceases to be satisfied, namely, when a control termination condition is established, control for reducing the engaging pressure of the lockup clutch 11 and the belt clamping pressure of the CVT 1 are finished, and these pressures are increased.

Figure 8:
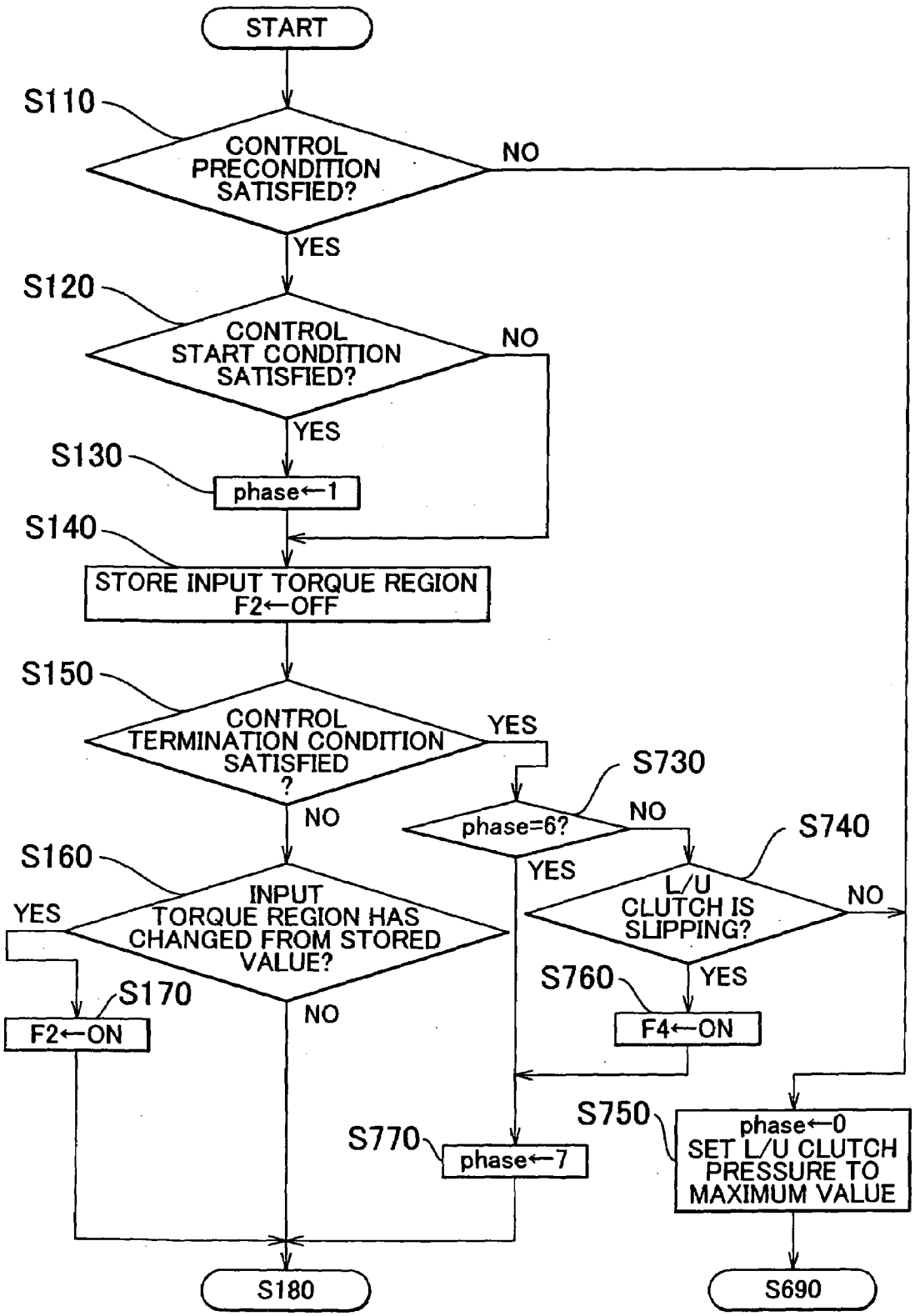
FIG. 8 is a view showing a flowchart provided by modifying a part of FIG. 1, for explaining another example of control to be executed by a control apparatus according to another embodiment of the invention.
Figure 9:
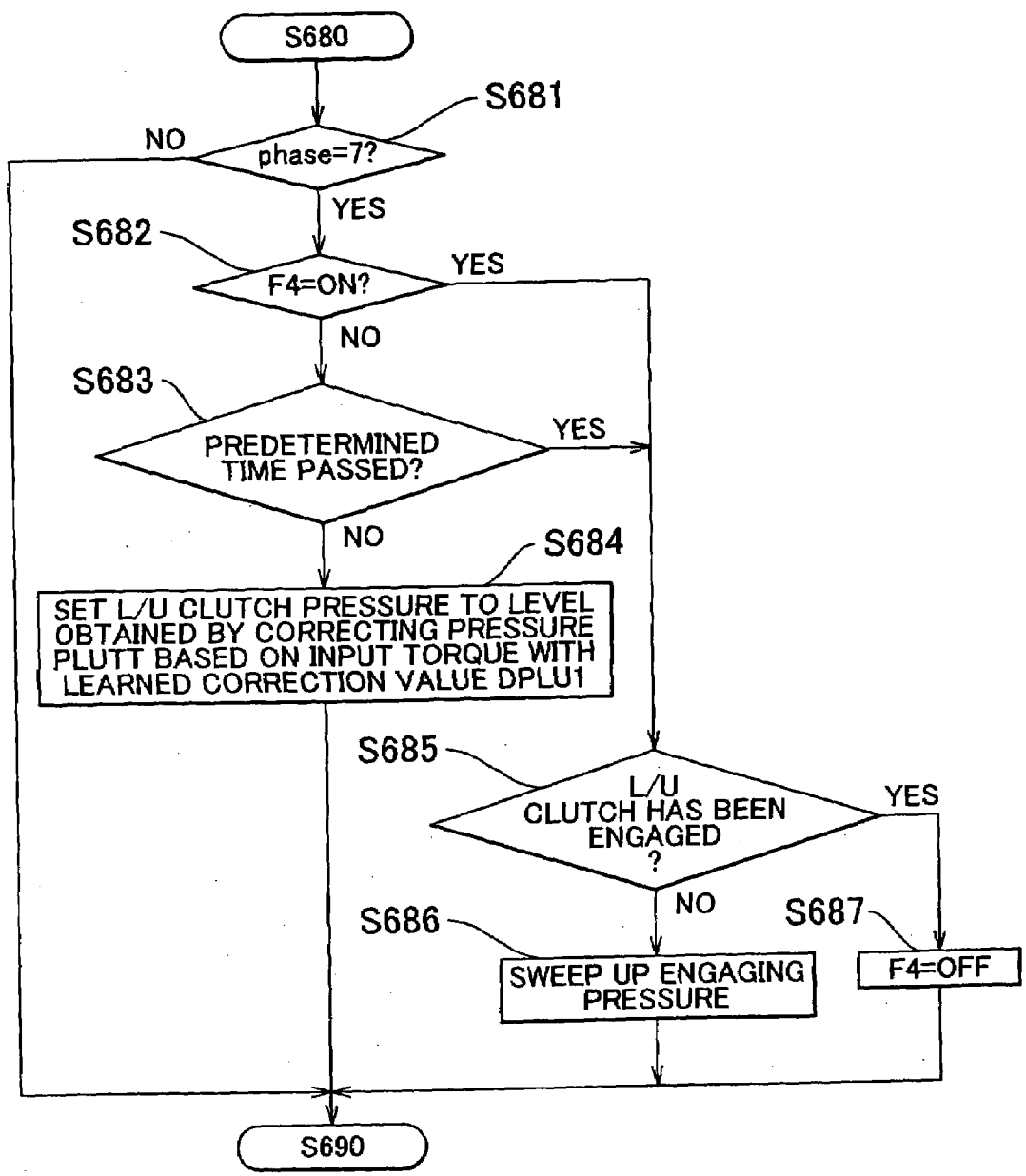
FIG. 9 is a view showing a flowchart provided by modifying a part of FIG. 6, for explaining another example of control to be executed by the control apparatus.

The control for increasing the engaging pressure of the lockup clutch 11 upon termination of the pressure reducing control is performed in the manner as follows. FIG. 8 and FIG. 9 are flowcharts useful for explaining the pressure increasing control. The flowcharts of FIGS. 8 and 9 are provided by modifying relevant parts of the flowchart shown in FIG. 1 through FIG. 6, or providing additional steps to the flowchart. More specifically described with reference to FIG. 8, when a control termination condition is satisfied, an affirmative determination is made in step S150, and it is determined in step S730 whether "phase 6" is established. Namely, it is determined whether the lockup clutch 11 is engaged with an engaging pressure obtained by giving a certain excess pressure to the engaging pressure at which the lockup clutch 11 is re-engaged, or the learned value DPLU1 for this purpose is being learned.

If a negative determination is made in step S730, which means that the above-described control for obtaining the learned value is being executed, the presence of a slip of the lockup clutch 11 is determined in step S740 so as to detect a slip of the lockup clutch 11 during learning control. If no slip occurs to the lockup clutch 11, and a negative determination is made in step S740, the engaging pressure of the lockup clutch 11 is set to the maximum level, and "phase 0"

is established in step S750. This step S750 is a replacement of step S240 shown in FIG. 1. Subsequently, the control proceeds to the above-described step S690 shown in FIG. 6.

If no slip of the lockup clutch 11 occurs when the control termination condition is satisfied, the engaging pressure of the lockup clutch 11 is increased to the line pressure as an original pressure of the control apparatus or its corrected pressure, so that the lockup clutch 11 is brought into a fully engaged state. In this case, no change in the rotational speeds occurs in the lockup clutch 11 that is being brought into the fully engaged state, and therefore no inertial force or no shock due to inertial force occurs.

When a slip occurs to the lockup clutch 11, and an affirmative determination is made in step S740, flag F4 is set to "ON" in step S760, and "phase 7" is then established in step S770. Subsequently, the control proceeds to step S180 shown in FIG. 1.

The content of control of "phase 7" is shown in the flowchart of FIG. 9, which is to be inserted between step S680 and step S690 shown in FIG. 6. Initially, it is determined in step S681 whether "phase 7" is established. If a negative determination is made in step S681, the control immediately proceeds to step S690, and control of the currently established phase is performed. If an affirmative determination is made in step S681, on the other hand, it is determined in step S682 whether flag F4 is set at "ON".

Figure 10:
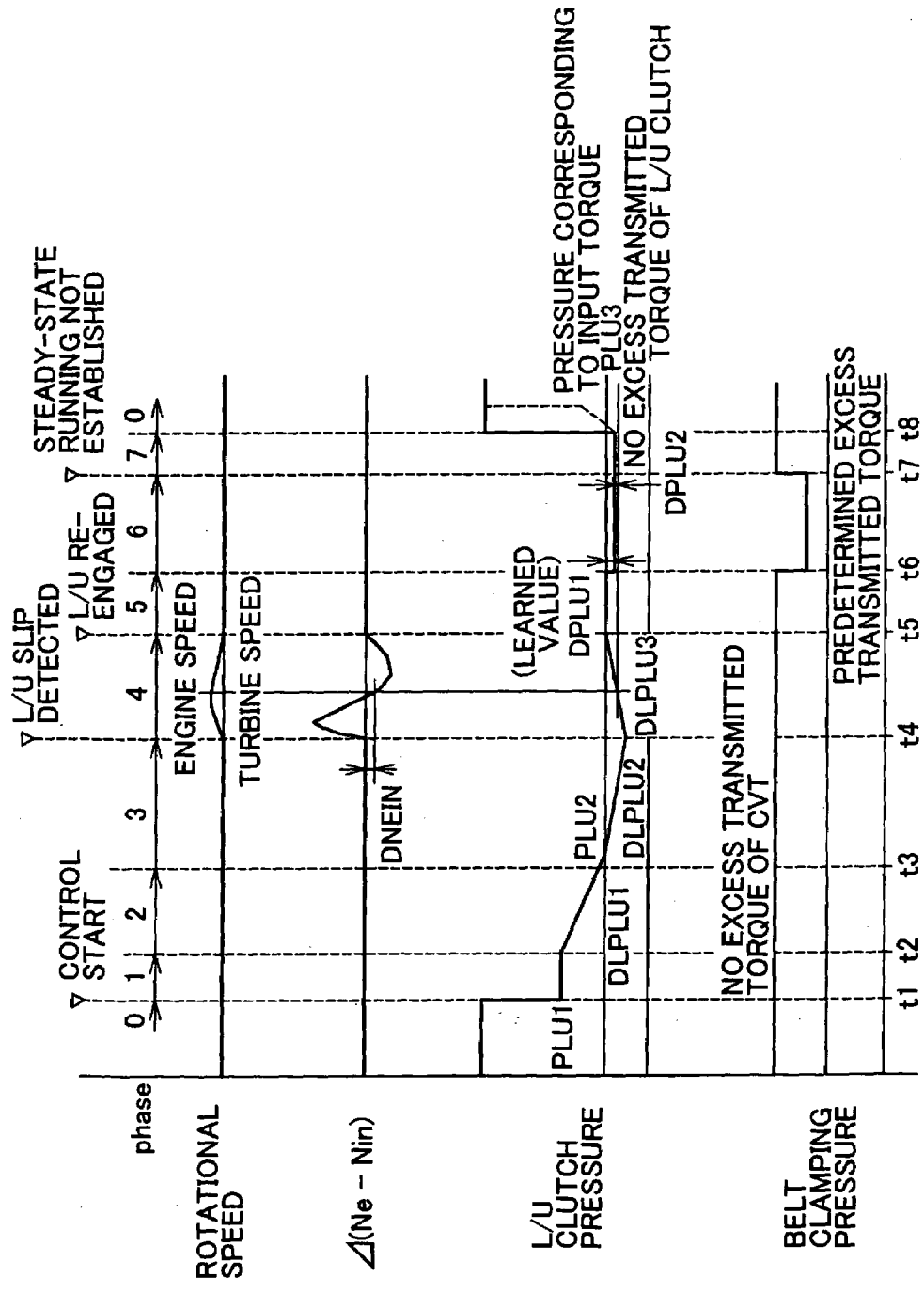
FIG. 10 is a time chart showing changes in the input and output rotational speeds of the lockup clutch and other parameters when the control routine including the flowcharts shown in FIG. 8

As described above, flag F4 is set to "ON" when a slip of the lockup clutch 11 is detected after the control termination condition is established. If a negative determination is made in step S682, it is determined in step S683 whether a predetermined period of time has passed. While the belt clamping pressure of the CVT is increased to a pressure level (the maximum pressure) to be set during normal operations when it is determined in step S150 that the control termination condition is satisfied, the predetermined time is set as the time required to complete the pressure increasing control, namely, the time required for the belt clamping pressure to be stably held at the maximum pressure. The predetermined time is between point t7 and point t8 in the time chart of FIG. 10. Thus, the engaging pressure of the lockup clutch 11 is not increased at point time t7, but the belt clamping pressure of the CVT 1 is initially increased, which is followed by an increase of the engaging pressure of the lockup clutch 11.

When a negative determination is made in step S683, the control for engaging the lockup clutch 11 with the engaging pressure obtained by correcting the engaging pressure PLUTT set in accordance with the input torque with the learned value DPLU1 is continued in step S684. Then, the control proceeds to step S690. In this case, the determinations and control of step S730, step S740 and step S750 shown in FIG. 8 are executed in this order, and the engaging pressure of the lockup clutch 11 is increased to the maximum level, whereby the lockup clutch 11 is brought into the fully engaged state. Since no slip is present in this situation, no shock arises from the lockup clutch 11 when it is brought into the fully engaged state.

If a slip occurs to the lockup clutch 11 and an affirmative determination is made in step S682, or the predetermined time has passed and an affirmative determination is made in step S683, it is determined in step S685 whether a determination as to engagement of the lockup clutch 11 has been made. Namely, it is determined whether no slip occurs in the lockup clutch 11 that is engaged at the engaging pressure obtained by giving a certain excess pressure to the hydraulic pressure for re-engaging the lockup clutch 11.

If a slip occurs to the lockup clutch 11 and a negative determination is made in step S685, the engaging pressure of the lockup clutch 11 is gradually increased in step S686. Namely, the engaging pressure sweeps up. Subsequently, the control proceeds to step S690. In this case, an affirmative determination is made in step S740, and sweep-up of the engaging pressure of the lockup clutch 11 is continued.

If the lockup clutch 11 is engaged as a result of the gradual increases of the engaging pressure of the lockup clutch 11, an affirmative determination is made in step S685. In this case, flag F4 is set to "OFF" in step S687, and the control proceeds to step S690. In this case, a negative determination is made in step S740 as described above, and the engaging pressure of the lockup clutch 11 is increased to the maximum level in step S750. Since the lockup clutch 11 is thus set in the fully engaged state without causing a slip, variations in the rotational speeds or shocks due to such variations do not arise from the engaging action. The rest of the control is similar to the control shown in FIG. 1 through FIG. 6.

When the engaging pressure of the lockup clutch 11 is increased to the maximum level upon completion of control for causing the lockup clutch 11 to function as a torque fuse, the belt clamping pressure of the CVT 1 is increased before the engaging pressure of the lockup clutch 11 is increased. Therefore, even in a transitional state upon completion of the control, the excess amount of the transmitted torque of the lockup clutch 11 can be kept smaller than the excess amount of the transmitted torque of the CVT 1. With this arrangement, even when the input torque changes in the transitional state upon completion of the control, the lockup clutch 11 is caused to slip first, so as to prevent excessively large torque from being applied to the CVT 1 or suppress such torque applied to the CVT 1, thereby avoiding slippage of the CVT 1.

When the engaging pressure of the lockup clutch 11 is controlled to the maximum value, the engaging pressure is caused to sweep up (i.e., gradually increase) in the case where a slip of the clutch 11 is present. Therefore, abrupt or sudden engagement of the lockup clutch 11 and shocks resulting from the abrupt engagement can be avoided in advance.

In the control apparatus constructed so as to implement the control as described above, when the engaging pressure of the clutch, such as the lockup clutch 11, which functions as a torque fuse is once reduced, and is then gradually increased until the clutch is re-engaged, the pressure in the state where a difference between the input rotational speed and the output rotational speed of the clutch is gradually decreasing is employed as the engaging pressure that provides no excess transmitted torque (i.e., the minimum engaging pressure in a range in which no slip occurs). Namely, the engaging pressure with no excess transmitted torque is determined while a slip of the lockup clutch 11 is still present. On the other hand, the transmitted torque having an excess transmitted torque is established in the state where no slip occurs to the lockup clutch 11, and is equivalent to the torque capacity established at the engaging pressure obtained by giving a certain excess pressure to the engaging pressure at which the lockup clutch 11 is re-engaged.

In the meantime, the coefficient of friction of a friction-type clutch, such as the lockup clutch 11, is generally different depending upon a difference (slip ratio) between the input and output rotational speeds. Accordingly, the engaging pressure with no excess pressure in the state where a difference appears between the input and output rotational speeds and the engaging pressure with no excess pressure in the state where no difference appears between the input and output rotational speeds are different from each other because of a difference in the coefficient of friction.

Figure 11:
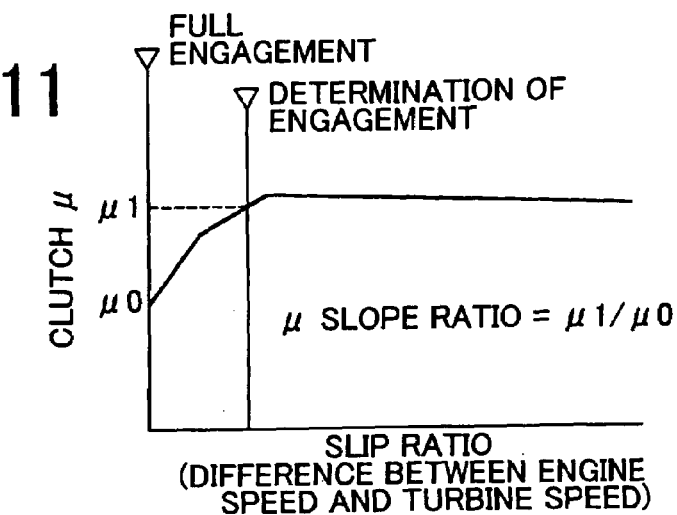
FIG. 11 is a graph schematically showing a characteristic of the coefficient of friction of the clutch.

FIG. 11 shows a generally known relationship between the coefficient of friction and the slip ratio. The coefficient of friction $\mu 0$ at the time of full engagement of the lockup clutch 11 where no difference exists between the input and output rotational speeds assumes a smaller value, compared to the coefficient of friction $\mu 1$ at the time of determination of engagement where a difference exists between the input and output rotational speeds. Accordingly, if the engaging pressure at the time of determination of engagement is employed as the engaging pressure involving no excess pressure at the time of full engagement, the engaging pressure tends to be short of the required level. In other words, the excess amount of the transmitted torque at the time of full engagement of the clutch tends to be insufficient. Assuming that the ratio ($\mu 1/\mu 0$) of the friction coefficient $\mu 1$, $\mu 0$ is defined as "$\mu$ slope ratio", the engaging pressure at the time of determination of engagement is corrected with the $\mu$ slope ratio, so as to provide an accurate engaging pressure with no excess pressure for accommodating a slip at the time of full engagement of the clutch. Consequently, it is possible to accurately set the engaging pressure to which a certain excess pressure is given, so that the resulting pressure does not exceed nor becomes short of an appropriate level.

Figure 12:
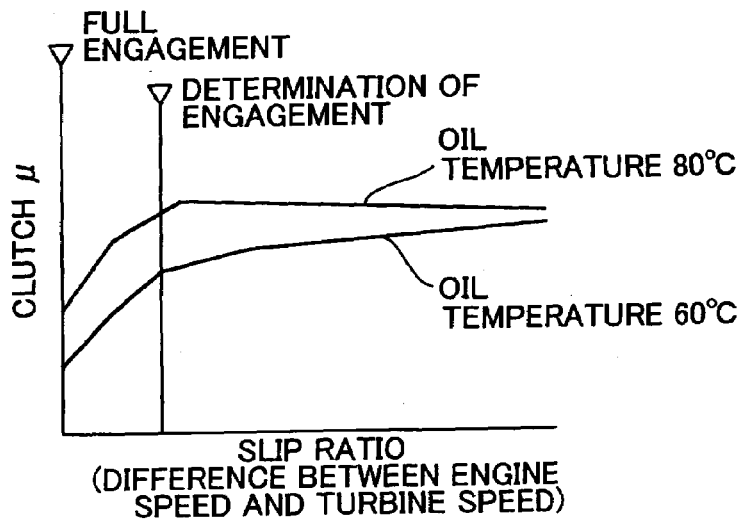
FIG. 12 is a graph schematically showing a characteristic of the friction coefficient of the clutch in relation to the oil temperature.
Figure 13:
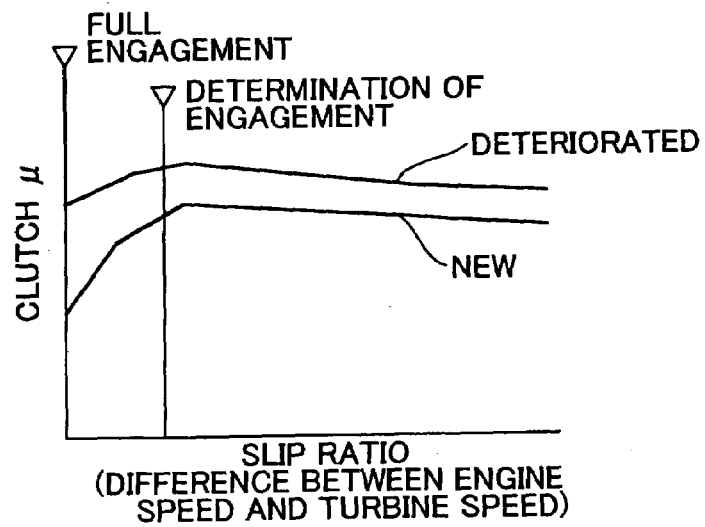
FIG. 13 is a graph schematically showing a characteristic of the friction coefficient of the clutch in relation to deterioration thereof.

The coefficient of friction of the lockup clutch 11 is influenced by a wide variety of factors (i.e., factors for changing the friction coefficient). Namely, the coefficient of friction of the lockup clutch 11 changes depending upon the temperature, degree of deterioration and composition of a lubrication oil (fluid), and so forth. As an example, FIG. 12 shows a relationship between the coefficient of friction and the oil temperature. As shown in FIG. 12, the coefficient of friction $\mu$ increases as the oil temperature increases. Also, as shown in FIG. 13 indicating the relationship with the degree of deterioration of the fluid, when a deteriorated fluid is used, the coefficient of friction $\mu$ increases, and the $\mu$ slope ratio decreases.

Figure 14:
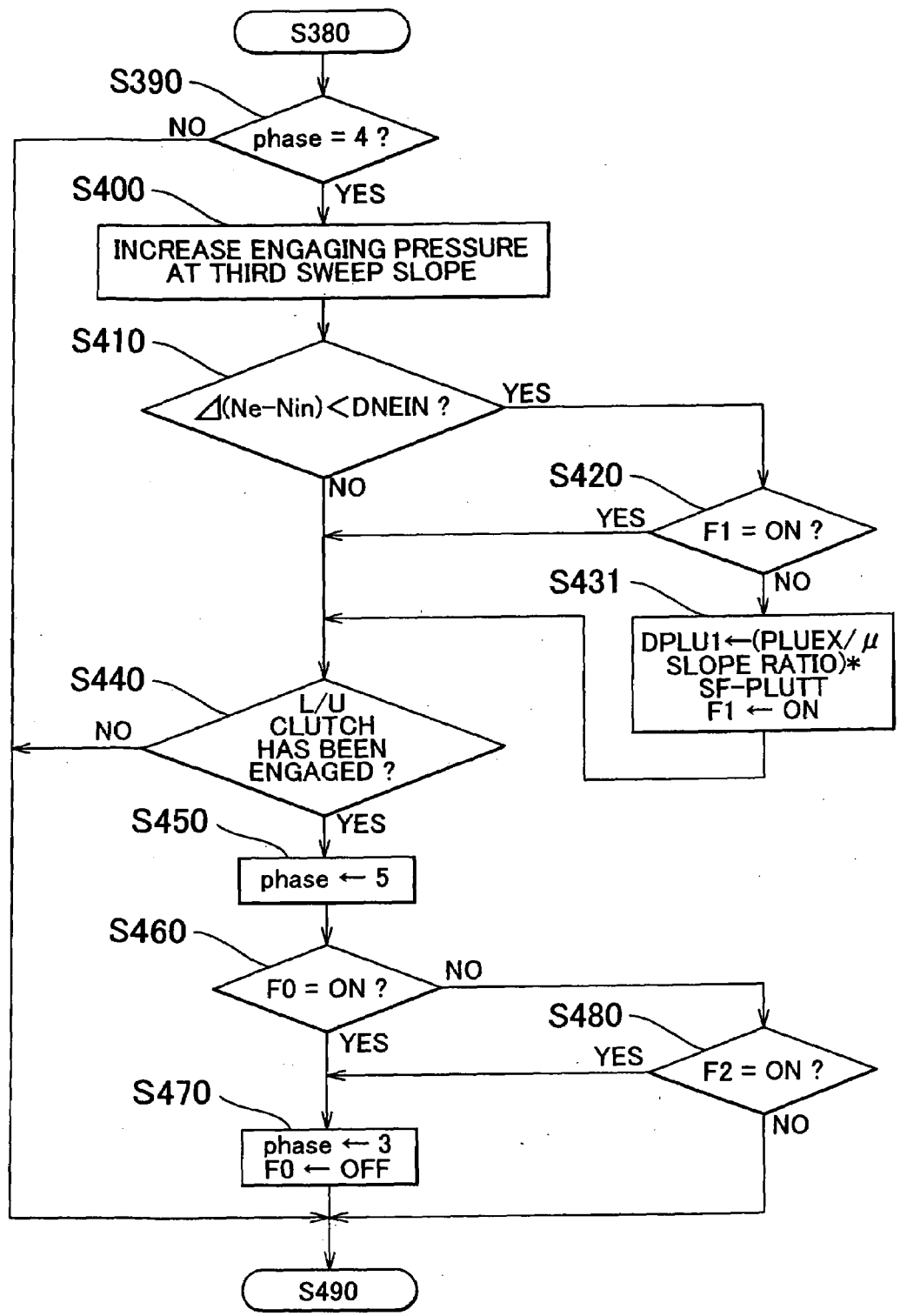
FIG. 14 is a view showing a flowchart provided by modifying a part of FIG. 4, for explaining another example of control to be executed by a control apparatus according to a further embodiment of the invention.

In the control apparatus of another embodiment of the invention, learning of the correction value of the engaging pressure can be effected in the following manner, so as to set transmitted torque having a certain excess transmitted torque for accommodating a slip, in view of a difference between the friction coefficient of the lockup clutch 11 at the time of determination of engagement and that at the time of full engagement. In each of the control examples as described above, a certain extra pressure is given to the engaging pressure PLUEXC at the time of determination of engagement in step S430 (more specifically, by multiplying the engaging pressure PLUEXC by the safe factor SF), and the learned value DPLU1 is obtained by subtracting the engagement pressure command value PLUTT from the engaging pressure provided with the excess pressure. In a control example as shown in FIG. 14, the engaging pressure PLUEXC at the time of determination of engagement is divided by the $\mu$ slope factor, so that the engaging pressure PLUEXC is adjusted in accordance with the coefficient of friction at the time of full engagement. Then, a certain excess pressure is given to the resultant value (PLUEXC/$\mu$ slope factor) by multiplying this value by the safe factor SF, and the learned value DPLU1 is obtained by subtracting the engagement pressure command value PLUTT from the engaging pressure provided with the excess pressure. These calculations are effected in step S431 of FIG. 14. At the same time, flag F1 is set to "ON", and then the control proceeds to step S440.

The $\mu$ slope factor employed in step S431 is suitably determined depending upon certain physical quantities, such as the current temperature and the degree of deterioration of the fluid used. The $\mu$ slope factor may be a value read from a map prepared in advance. The rest of the control is similar to the control as shown in FIG. 1 through FIG. 6, or to the control of FIG. 1–FIG. 6 which is modified by adding or replacing control steps in accordance with the control as shown in FIG. 8 and FIG. 9.

When the control apparatus is arranged such that the control of step S431 shown in FIG. 14 replaces the control of step S430 shown in FIG. 4, the actual coefficient of friction can be reflected by the engaging pressure of the lockup clutch 11, whereby the engaging pressure of the lockup clutch 11 can be more accurately controlled to an appropriate or optimum level. With the engaging pressure thus controlled, control for causing the lockup clutch 11 to function as a torque fuse can be stably performed in a favorable manner.

The control apparatus to which the invention can be applied is adapted to control, by using a hydraulic pressure, the engaging pressure of the clutch coupled in series with the CVT 1 in the direction of transmission of torque. In this type of hydraulic control apparatus, the viscosity of oil may influence the controllability of the hydraulic pressure. The hydraulic control apparatus has a general tendency that as the oil temperature decreases, the viscosity increases and the accuracy of hydraulic control deteriorates.

Figure 15:
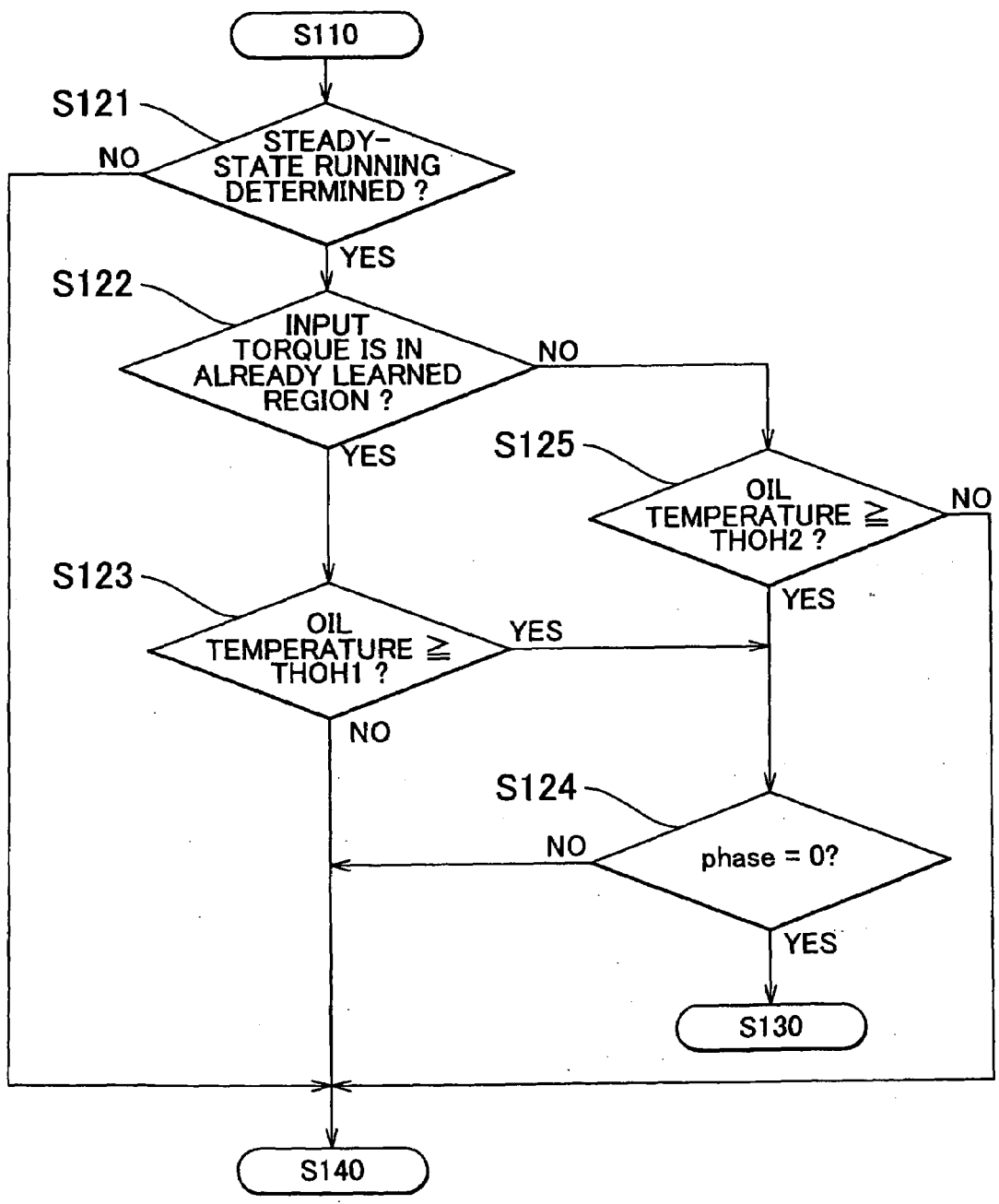
FIG. 15 is a flowchart showing one example of a routine for determining whether a control start condition associated with an oil temperature is satisfied.
Figure 16:
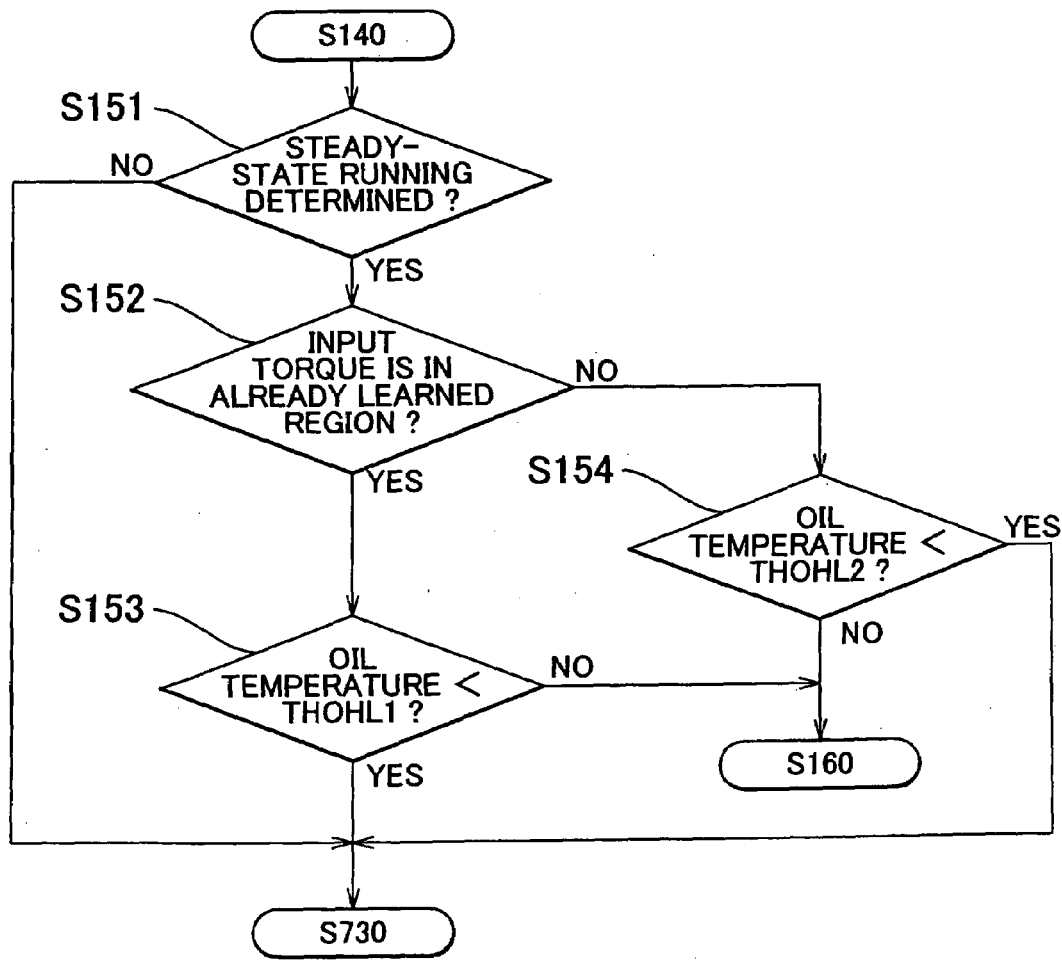
FIG. 16 is a flowchart showing one example of a routine for determining whether a control termination condition associated with the oil temperature is satisfied.

In the control apparatus of this embodiment, the oil temperature may be used a control start condition or a control termination condition. An example of the control is shown in FIG. 15 and FIG. 16. FIG. 15 shows the content of the control of step S120 (FIG. 1) as described above. When the control precondition is satisfied, and an affirmative determination is made in step S110, it is determined in step S121 whether a steady-state running of the vehicle is being judged, namely, whether determination of the steady running state has been made. The determination of the steady running state can be made by, for example, determining that the axial torque of the driven pulley 20 calculated from the input torque and the speed ratio of the CVT 1 is held within a predetermined range.

If a negative determination is made in step S121, the control start condition is not satisfied, and the control proceeds to step S140 without setting the phase to 1 (i.e., without establishing "phase 1") as in the case where a negative determination is made in step S120. Namely, the control for setting the engaging pressure of the lockup clutch 11 is not started.

If an affirmative determination is made in step S121, it is determined in step S122 whether the input torque at this point of time is within a range for which the learned value has already been obtained. If an affirmative determination is made in step S122, it is determined in step S123 whether the oil pressure is equal to or higher than a first reference value THOH1. The first reference value THOH1 is a relatively low temperature. If an affirmative determination is made in step S123, the control start condition is satisfied, and the control for setting the engaging pressure of the lockup clutch 11 is started. Namely, if the learned value has already been obtained, control of the engaging pressure that reflects the actual operating states of the CVT 1 and the power train can be performed. In this case, therefore, control of causing the lockup clutch 11 to function as a torque fuse can be executed even if the oil temperature is relatively low and the hydraulic control accuracy is not particularly high.

If an affirmative determination is made in step S123, it is determined in step S124 whether the "phase 0" is established. If a negative determination is made in step S124, the control proceeds to step S140 so as to perform control in accordance with the currently established phase. To the contrary, if "phase 0" is established, and an affirmative determination is made in step S124, the control proceeds to step S130 in which the "phase 1" is established, so as to execute control steps corresponding to the respective phases in the predetermined order.

If a negative determination is made in step S122, namely, if the input torque at this point of time is within a region for which the learned value has not been obtained, on the other hand, it is determined in step S125 whether the oil temperature is equal to or higher than a second reference value THOH2. The second reference value THOH2 is a temperature that is higher than the first reference value THOH1.

If an affirmative determination is made in step S125, the control start condition is satisfied, and the control for setting the engaging pressure of the lockup clutch 11 is started. Namely, if the learned value has not been obtained, it is difficult to accurately set the engaging pressure of the lockup clutch 11 to provide a certain excess transmitted torque for accommodating a slip. Since the oil temperature is relatively high in this case, the control is started in a state in which the hydraulic pressure can be controlled with high stability.

If an affirmative determination is made in step S125, the control proceeds to step S124. If a negative determination is made in step S125, on the other hand, the control start condition is not satisfied, and the control proceeds to step S140 without executing control for setting the phase. Namely, the control for setting the engaging pressure of the lockup clutch 11 is not started.

With the control start condition determined as shown in FIG. 15, when the learned value has already been obtained with respect to the current torque, the engaging pressure of the lockup clutch 11 can be reduced and the belt clamping pressure of the CVT 1 can also be reduced even if the oil temperature is relatively low, so as to permit efficient running of the vehicle. In other words, the vehicle can operate at a high power transmitting efficiency owing to the torque fuse control of the lockup clutch 11 for a prolonged period of time, thus assuring improved fuel economy. Also, if the learned value has not been obtained, the control is started in a condition that the oil temperature is sufficiently high. Thus, learning control of the engaging pressure and subsequent control for setting the engaging pressure of the lockup clutch 11 can be stably performed with improved accuracy.

Next, control for determining a control termination condition as shown in FIG. 16 will be described. FIG. 6 specifically illustrates the content of control of step S150 (FIG. 1) as described above. After the region of the input torque is stored in the memory in step S140, it is determined in step S151 whether steady-state running of the vehicle is being determined, namely, determination of steady running state has been made. This determination is similar to that of step S121 as described above.

If a negative determination is made in step S151, the control termination condition is satisfied, and the control proceeds to step S730 as in the case where an affirmative determination is made in step S150 shown in FIG. 8 as described above, so that termination control is performed.

If an affirmative determination is made in step S151, it is determined in step S152 whether the input torque at this point of time is within a region for which the learned value has already been obtained. If an affirmative determination is made in step S152, it is determined in step S153 whether the oil temperature is lower than a third reference value THOL1. The third reference value THOL1 is a relatively low temperature (which is even lower than the first reference value THOH1). If an affirmative determination is made in step S153, the control termination condition is satisfied, and the control proceeds to step S730 so that termination control is performed.

Namely, if the learned value has already been obtained, control of the engaging pressure that reflects the actual operating states of the CVT 1 and the power train can be performed. Therefore, even if the oil temperature is relatively low, and the hydraulic pressure control accuracy is not particularly high, control for causing the lockup clutch 11 to function as a torque fuse can be performed. Thus, the control is continued until the oil temperature becomes considerably low.

If the oil temperature is relatively high, and a negative determination is made in step S153, the control termination condition is not satisfied, and the control proceeds to step S160 as described above so that the lockup clutch 11 continues to be controlled to function as a torque fuse.

If a negative determination is made in step S152, namely, if the input torque at this point of time is within a region for which the learned value has not been obtained, it is determined in step S154 whether the oil temperature is lower than a fourth reference value THOL2. The fourth reference value THOL2 is higher than the third reference value THOL1 (but smaller than the second reference value THOH2).

If an affirmative determination is made in step S154, the control termination condition is satisfied, and the control proceeds to step S730 to execute control termination control. Namely, if the learned value has not been obtained, it is difficult to accurately set the engaging pressure of the lockup clutch 11 so as to provide a certain excess transmitted torque for accommodating a slip, and there is a possibility that the control of the engaging pressure becomes unstable even if the oil temperature is relatively high. For this reason, the control is terminated.

If a negative determination is made in step S154, on the other hand, the control termination condition is not satisfied, and the control proceeds to step S160, and the lockup clutch 11 continues to be controlled to function as a torque fuse.

With the control apparatus constructed so as to implement the control as shown in FIG. 16, when the learned value has already been obtained, the lockup clutch 11 is caused to function as a torque fuse and the belt clamping pressure of the CVT 1 is reduced for a prolonged period of time, namely, even during a period in which the oil temperature is relatively low. Consequently, the fuel economy can be improved. If the learned value has not been obtained, the control is finished even if the oil temperature is relatively high, thus avoiding or suppressing a situation that the control for using the lockup clutch 11 as a torque fuse becomes unstable, which may result in a slip of the lockup clutch 11 or the CVT 1.

In the meantime, judder is known as a problem encountered in friction-type clutches. Judder is a phenomenon that engagement and slippage of a clutch take place in a repeated manner, which results in large variations in the output-side torque and vibration in the vehicle body. This phenomenon may be caused by the fact that the coefficient of friction at the time of full engagement differs from the friction coefficient at the time of occurrence of a slip. Accordingly, judder is likely to occur during a transition between the slipping state and the fully engaged state of the clutch.

Figure 17:
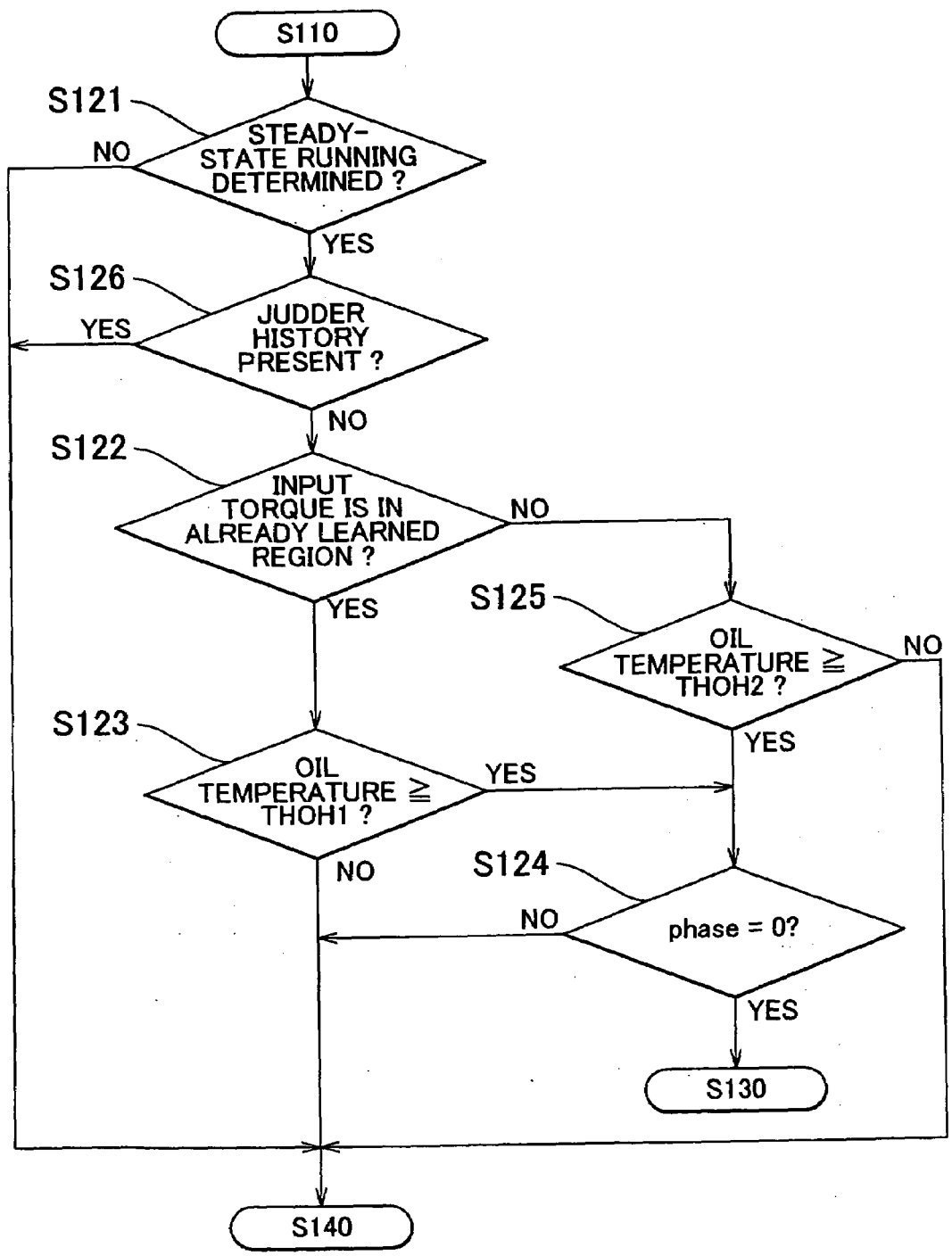
FIG. 17 is a flowchart showing one example of a routine for determining whether control start conditions associated with the history of occurrence of judder and the oil temperature are satisfied.
Figure 18:
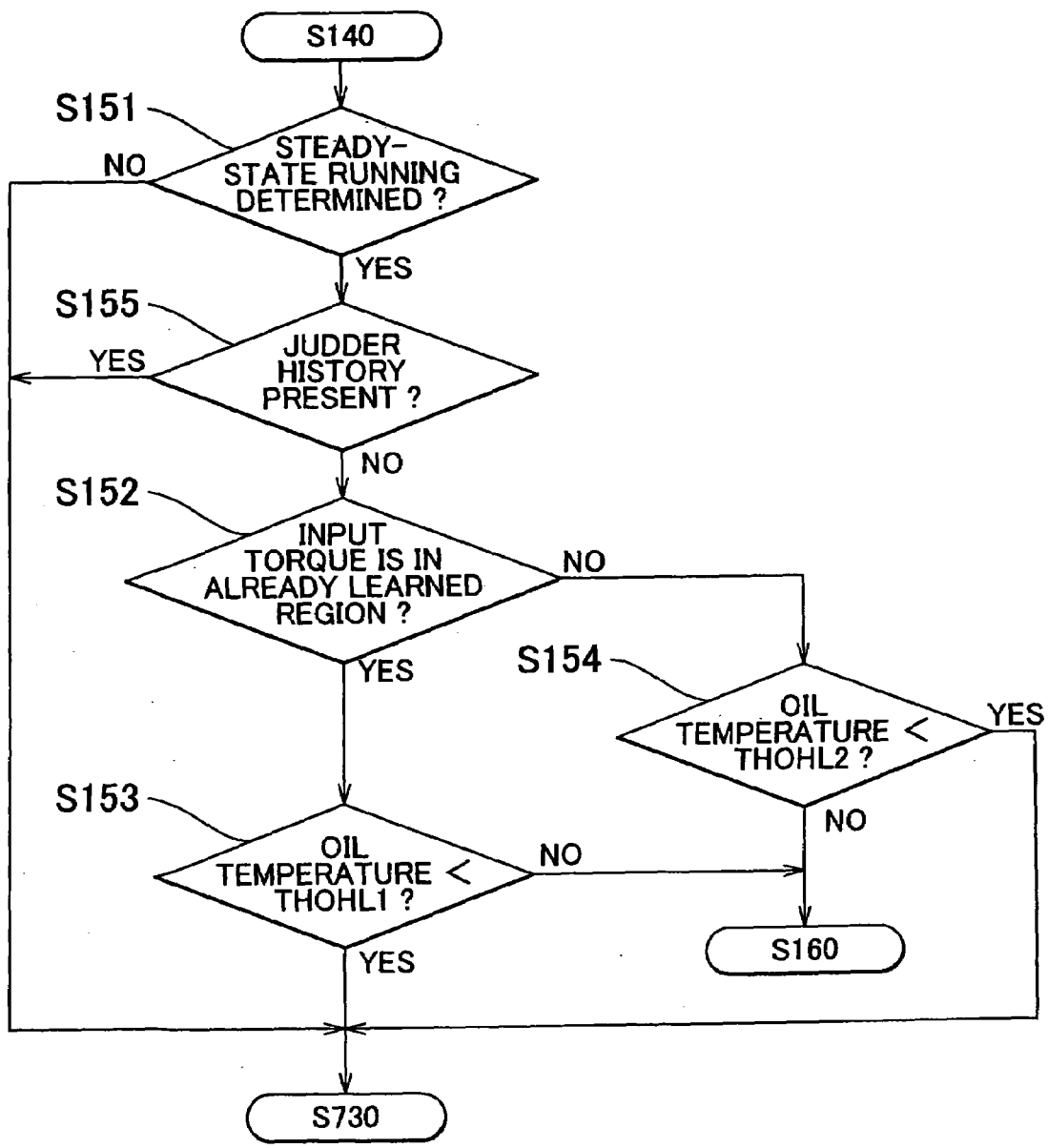
FIG. 18 is a flowchart showing one example of a routine for determining whether control termination conditions associated with the history of occurrence of judder and the oil temperature are satisfied.

In the control performed according to the invention, the clutch that functions as a torque fuse with respect to the CVT 1 is once brought into a slipping state from an engaged state, and is then re-engaged with the engaging pressure increased, so that the clutch functions as a torque fuse by giving a certain excess pressure to the engaging pressure required for re-engagement of the clutch. This control involves control for learning the engaging pressure of the clutch. In the process of learning, judder may occur in the clutch since the clutch shifts from the engaged state to the slipping state and then shifts from the slipping state back to the engaged state. In the control apparatus of the invention, therefore, it is preferable to use the history of occurrence of judder as a control start condition or a control termination condition. FIG. 17 and FIG. 18 show examples of the control using the history of judder.

FIG. 17 is a flowchart for determining whether the control start condition is satisfied, in which a step of determining the presence of past occurrence of judder is added to the flowchart of FIG. 15 as described above. More specifically, when the vehicle is determined to be in a steady running state and an affirmative determination is made in step S121, it is determined in step S126 whether the lockup clutch 11 has ever experienced judder in the past. The history of judder may be determined with respect to each region of the input torque. If the lockup clutch 11 has experienced judder, and an affirmative determination is made in step S126, the control proceeds to step S140 without particularly setting the phase. Namely, the control does not proceed to any of the phases as described above, and thus the control of setting the engaging pressure of the lockup clutch 11 is not initiated.

If no judder occurred in the lockup clutch 11 in the past, and a negative determination is made in step S126, the control proceeds to the above-described step S122, and the control of step S122 through step S125 is executed in the manner as described above with reference to FIG. 15.

With the control apparatus constructed so as to execute the control as shown in FIG. 17, if the lockup clutch 11 has experienced judder before, the history of occurrence of judder provides a control inhibition condition. In this case, the control for setting the engaging pressure to a pressure level obtained by giving a certain excess pressure to the pressure having no excess pressure for a slip, or learning control for this purpose, is not executed, and therefore judder of the lockup clutch 11 can be prevented.

FIG. 18 is a flowchart for determining whether the control termination condition is satisfied, in which a step of determining the presence of past occurrence of judder is added to the flowchart of FIG. 16 as described above. More specifically, when the vehicle is determined to be in a steady running state and an affirmative determination is made in step S151, it is determined in step S155 whether the lockup clutch 11 has experienced judder in the past. The history of judder may be determined with respect to each region of the input torque. If the lockup clutch 11 has experienced judder, and an affirmative determination is made in step S155, the control immediately proceeds to step S730, and the termination control is executed. Namely, the history of occurrence of judder provides a control termination condition. With the termination control thus executed, learning control for re-engaging the lockup clutch 11 after causing a slip is not executed, and therefore judder of the lockup clutch 11 can be prevented.

If no judder occurred in the lockup clutch 11 in the past, and a negative determination is made in step S155, the control proceeds to step S152 as explained above with reference to FIG. 16. In this case, it is determined in step S152 through step S154 whether the control termination condition in terms of the oil temperature is satisfied, and control in accordance with this determination is executed.

Figure 19:
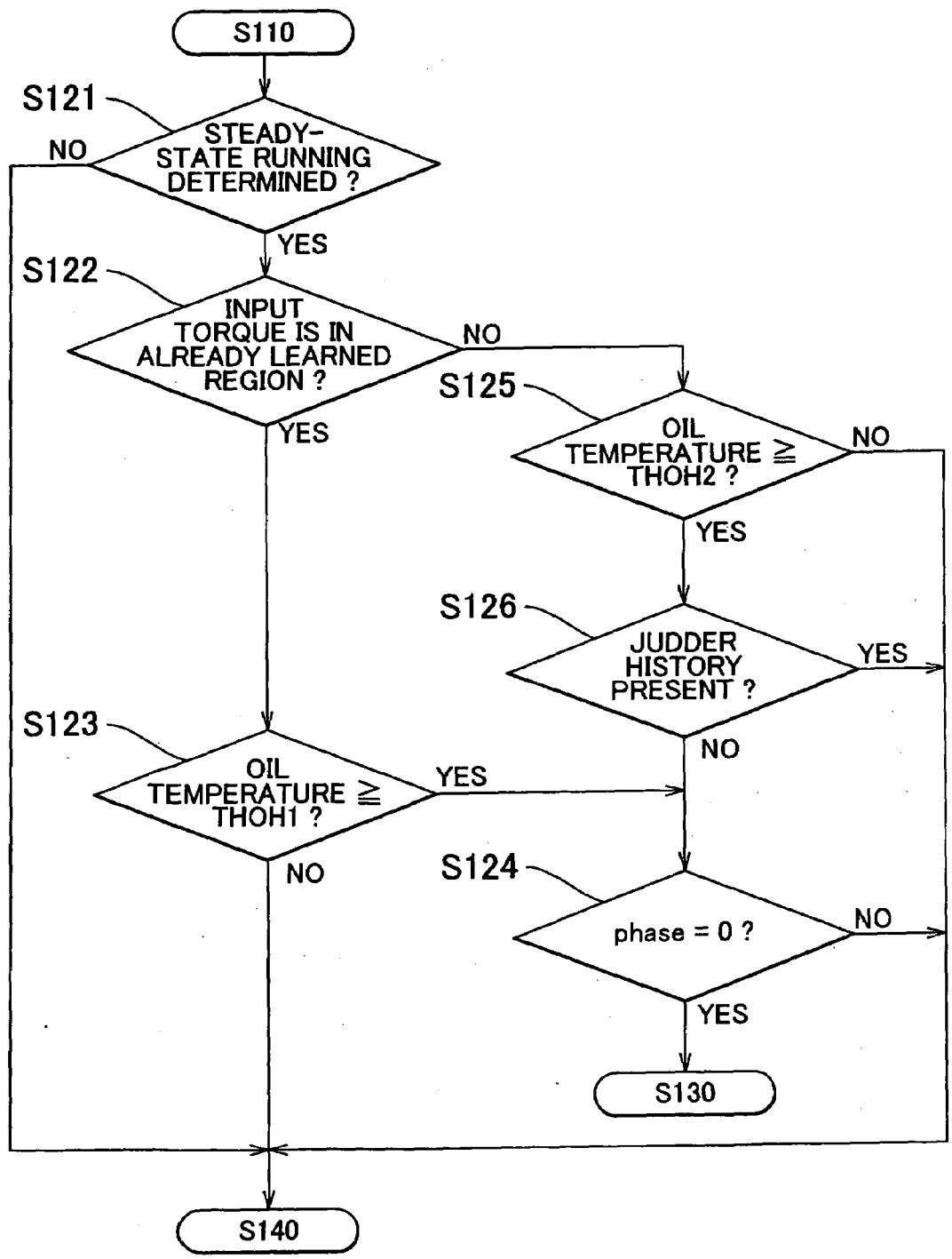
FIG. 19 is a flowchart showing another example of a routine for determining whether control start conditions associated with the history of occurrence of judder and the oil temperature are satisfied.

When the input torque at the current time is within a region for which the above-described learned value DPLU1 has been obtained, the lockup clutch 11 may be used as a torque fuse since the learned value DPLU1 is available. In this case, the control for setting the engaging pressure of the lockup clutch 11 may be performed without determining whether judder has occurred. One example of such control is illustrated in FIG. 19, in which a step (step S126) of determining the history of occurrence of judder is provided after step S125 of comparing the oil temperature with the second reference value THOH2 in the case where the input torque is not within a learned region (namely, where the learned value has not been obtained with respect to the current input torque). It makes no difference even if step S126 is provided before step S125.

In the control example shown in FIG. 19, when the learned value DPLU1 has already been obtained, learning control with respect to the engaging pressure of the lockup clutch 11 is executed under a condition that the oil pressure is equal to or higher than the first reference value THOH1. If the learned value DPLU1 has not been obtained, on the other hand, an affirmative determination is made in step S126 if the lockup clutch 11 has experienced judder (i.e., the history of occurrence of judder is present). In this case, the control proceeds to step S140 without particularly setting the phase, and the control of setting the engaging pressure of the lockup clutch 11 is not initiated even if a condition associated with the oil temperature is satisfied (in step S125). With the arrangement that executes the control shown in FIG. 19, control for causing the lockup clutch 11 to function as a torque fuse, and learning control associated with the torque fuse control, are executed provided that the learned value has already been obtained. If the learning value has not been obtained, on the other hand, the history of occurrence of judder provides a control inhibition condition, and control for using the lockup clutch 11 as a torque fuse is inhibited when the inhibition condition is satisfied.

Figure 20:
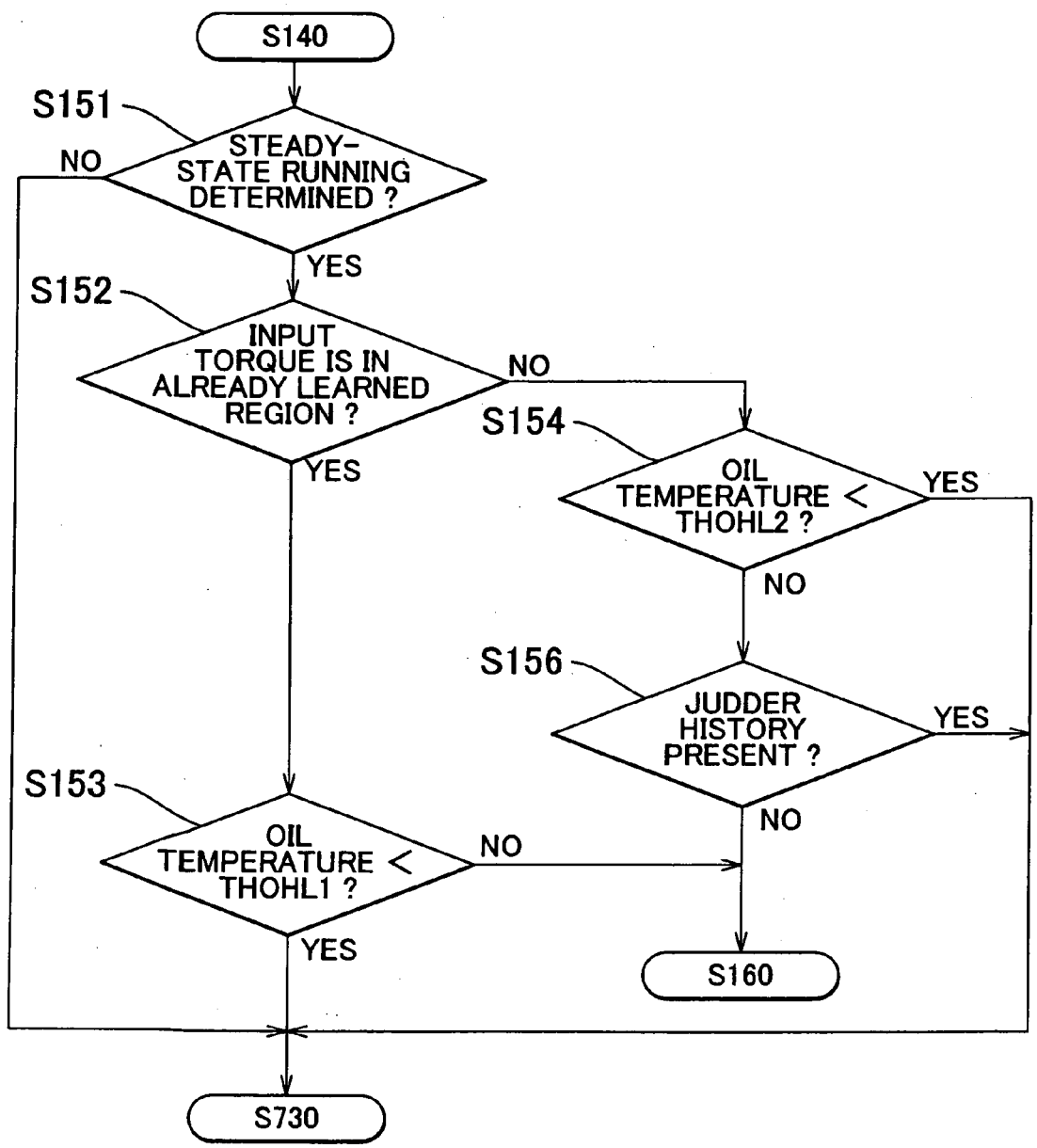
FIG. 20 is a flowchart showing another example of a routine for determining whether control termination conditions associated with the history of judder and the oil temperature are satisfied.

FIG. 20 shows an example in which the history of occurrence of judder provides a control termination condition, in which the determination of step S155 in the control example shown in FIG. 18 is made when the learned value has not been obtained and the oil temperature is equal to or higher than the fourth reference value THOL2. Namely, even if the oil temperature is at such a high level that no problem arises in the control of the hydraulic pressure, the control immediately proceeds to step S730 for termination of control if the lockup clutch 11 has experienced judder (i.e., if an affirmative determination is made in step S155), so that control for finishing the hydraulic pressure control is initiated. As a result, the control for causing a slip and then re-engaging the lockup clutch 11 is not carried out, and thus occurrence of judder in the lockup clutch 11 can be prevented or suppressed.

If the learned value has been obtained, the above-described step S155 is not executed, and therefore the history of occurrence of judder does not provide a control termination condition. This leads to an increased possibility that the lockup clutch 11 functions as a torque fuse, which allows the belt clamping pressure of the CVT 1 to be reduced, resulting in improved power transmitting efficiency and improved fuel economy.

In the control examples as described above, when the history of occurrence of judder is present, the control is inhibited or finished with no exception. If judder can be avoided, however, the above-described control including learning with regard to the engaging pressure of the lockup clutch 11 may be permitted or continued without being finished even in the presence of past occurrence of judder. It is to be noted that judder that appears in a friction-type clutch tends to occur when the engaging pressure is in the neighborhood of the lowest engaging pressure within a range in which no slip occurs, and, once judder occurs, it is unlikely to settle down with a slight change in the engaging pressure. To the contrary, judder is not likely to occur if the engaging pressure immediately changes, i.e., immediately increases or decreases, without being kept slightly above or below the minimum pressure as described above. In control examples of FIG. 21 and FIG. 22, if the lockup clutch 11 has experienced judder in the past, the engaging pressure of the lockup clutch 11 is rapidly changed so that judder is less likely to occur. If judder occurs even in this case, the control is inhibited from starting, or is finished.

Figure 21:
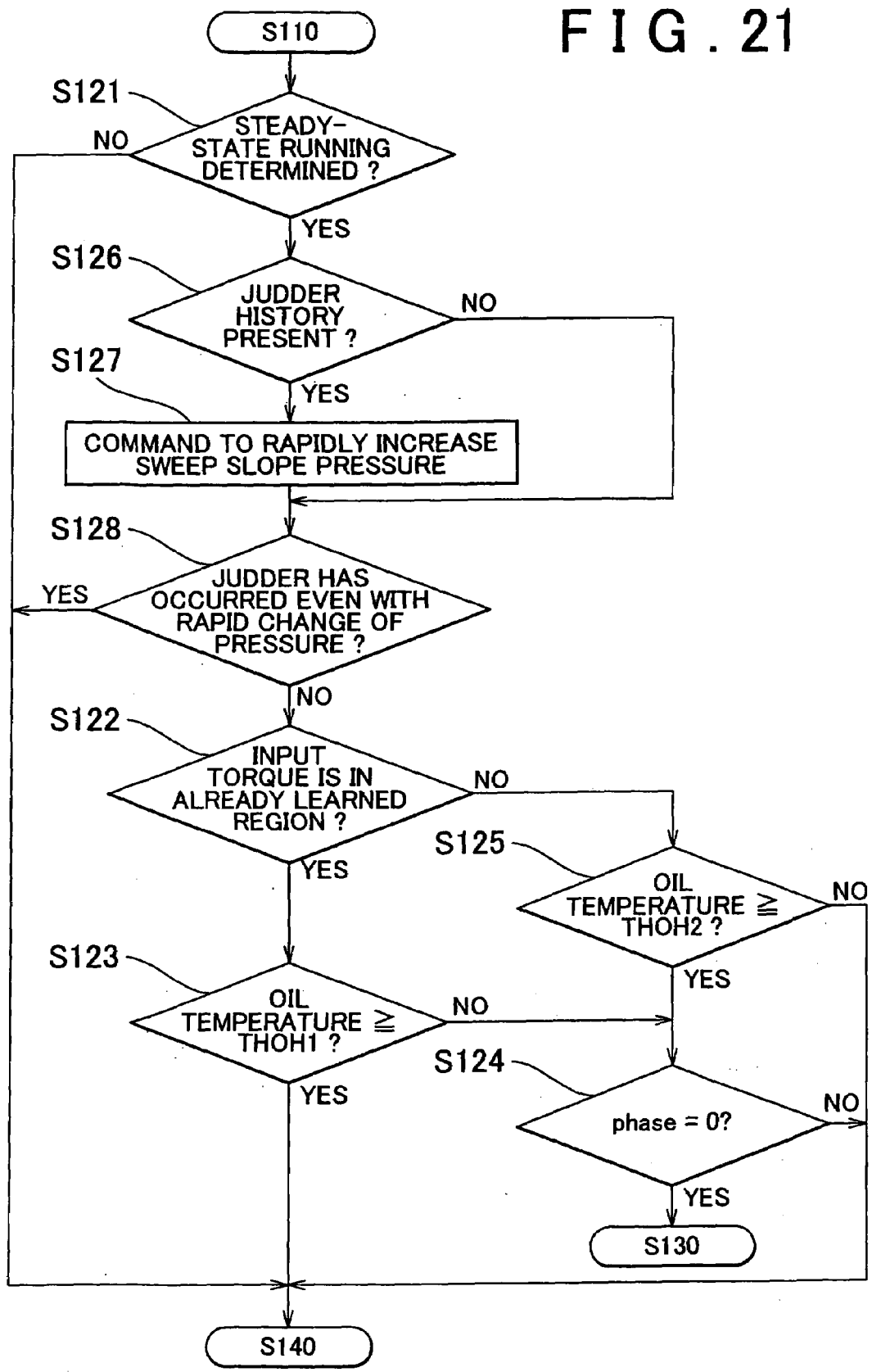
FIG. 21 is a flowchart showing a further example of a routine for determining whether control start conditions associated with the history of occurrence of judder and the oil temperature are satisfied.

The example shown in FIG. 21 is provided by modifying a part of the flowchart shown in FIG. 17 as described above. When it is determined that the lockup clutch 11 has experienced judder in the past while the vehicle is determined to be in a steady running state (i.e., when an affirmative determination is made in step S126), step S127 is executed to generate a command to significantly increase the rate (sweep slope) of change of the hydraulic pressure for setting the engaging pressure of the lockup clutch 11. Namely, a steep sweep slope is established. The sweep slope mentioned herein refers to the sweep slopes DLPLU1, DLPLU2 and DLPLU3 in "phase 2" through "phase 4" as described above. In step S127, a command is generated to increase these values DLPLU1, DLPLU2 and DLPLU3.

Subsequently, it is determined in step S128 whether judder has occurred even if the rate of change of the hydraulic pressure is increased. If an affirmative determination is made in step S128, which means that judder occurs in the process of changing the engaging pressure of the lockup clutch 11, subsequent control of the engaging pressure including learning cannot be performed. In this case, the control start condition is not satisfied, and the control immediately proceeds to step S140 without effecting a process to set the phase, for example. Namely, the control for setting the engaging pressure of the lockup clutch 11 is not initiated.

If a negative determination is made in step S128, on the other hand, judder can be avoided by making the sweep slope of the engaging pressure steep (i.e., increasing the rate of change of the engaging pressure), even in the presence of past occurrence of judder. The negative determination may be made in step S128, for example, in the case where the past occurrence of judder was detected by mistake, or the case where the fluid was replaced by a new one. In this case, therefore, the history of occurrence of judder does not provide a factor that impedes start of the control. Thus, the control proceeds to step S122 as described above, and the following steps S123 through step S125 are executed in the manner as explained above with reference to FIG. 15 or FIG. 19.

With the control apparatus arranged to execute the control shown in FIG. 21, the control of the engaging pressure of the lockup clutch 11 including learning is started when judder can be avoided, even in the presence of the history of occurrence of judder. This arrangement leads to increased chances to execute control for setting an excess transmitted torque of the lockup clutch 11 for accommodating a slip thereof to be smaller than an excess transmitted torque of the CVT 1 for accommodating a slip thereof, resulting in enhanced power transmitting efficiency of the CVT 1 and improved fuel economy.

Figure 22:
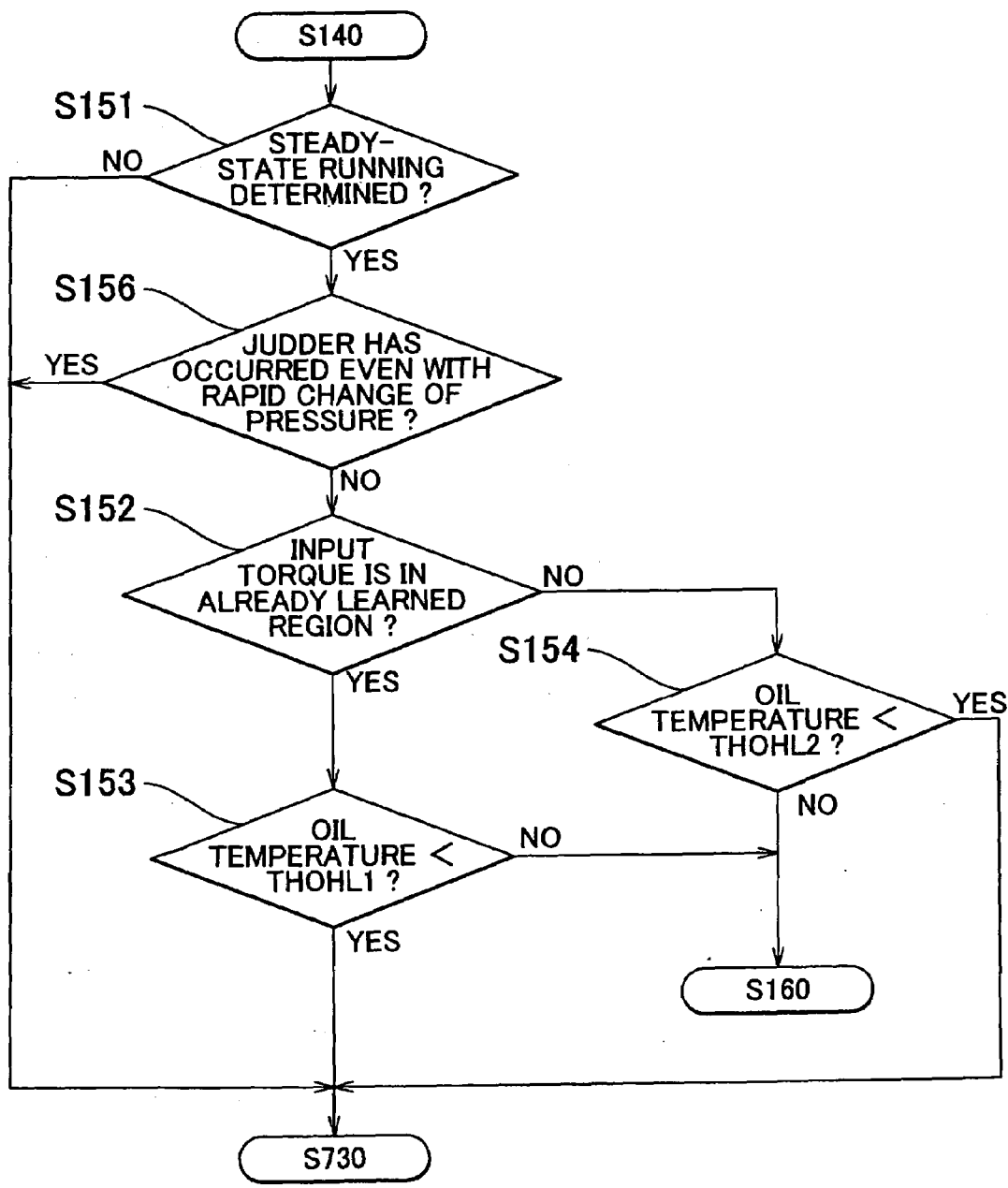
FIG. 22 is a flowchart showing a further example of a routine for determining whether control termination conditions associated with the history of occurrence of judder and the oil temperature are satisfied.

As a control termination condition, it is determined whether judder occurs even if the sweep slope of the hydraulic pressure is made steep (i.e., even if the rate of change of the hydraulic pressure is considerably increased). An example of this control is shown in FIG. 22. When it is determined in step S151 that the vehicle is in a steady running state, it is determined in step S156 whether judder has occurred even if the sweep slope of the hydraulic pressure is made steep (i.e., the rate of change of the hydraulic pressure is considerably increased) based on the control of step S127 as described above. If an affirmative determination is made in step S156, the lockup clutch 11 has experienced judder in the past, and occurrence of judder cannot be avoided. In this case, the control termination condition is established, and the control immediately proceeds to step S730 so as to execute a process to finish the control.

If a negative determination is made in step S156, judder can be avoided. In this case, the control proceeds to step S152, and the following control of step S153 through step S154 is executed in the manner as described above with reference to FIG. 16 or FIG. 20. The negative determination may be made, for example, in the case where the past occurrence of judder was recorded by mistake, or in the case where the fluid was replaced by a new one.

Thus, mere presence of the history of judder does not result in establishment of the control termination condition. Rather, when the judder can be avoided, the control of the engaging pressure of the lockup clutch 11 including learning is continued. This arrangement leads to increased chances to execute control for setting an excess transmitted torque of the lockup clutch 11 for accommodating a slip thereof smaller than an excess transmitted torque of the CVT 1 for accommodating a slip thereof, thus assuring improved power transmitting efficiency of the CVT 1 and improved fuel economy.

Here, the relationship between the above-described examples and the invention will be briefly explained. The functional means of steps S410 through step S430 corresponds to the learned value determining unit, and the functional means of step S520, step S570 and step S590 corresponds to the learned value deviation determining unit, while the functional means of step S720 corresponds to the torque capacity correcting unit. Also, the functional means of step S150 corresponds to the termination determining unit, and the functional means of step S683, step S684, step S686 and step S750 corresponds to the pressure increasing unit. Furthermore, the functional means of step S431 and step S640 corresponds to the clutch engaging pressure setting unit, and the functional means of step S122, step S123 and step S125 corresponds to the start condition setting unit. The functional means of step S126 and step S155 corresponds to the judder history determining unit and clutch engaging pressure control inhibiting unit, and the functional means of step S122 and step S152 corresponds to the engaging pressure control unit. Also, the functional means of step S127, step S128 and step S156 corresponds to the engaging pressure change rate setting unit.

While the clutch to be controlled by the control apparatus of the invention takes the form of a lockup clutch that is arranged in series with the continuously variable transmission on the input side thereof, the clutch may be any clutch arranged in series with the continuously variable transmission in the direction of transmission of torque. For example, the clutch may be disposed on the output side of the continuously variable transmission, or may be of any type other than the lockup clutch. Also, the continuously variable transmission is not limited to the belt-and-pulley type continuously variable transmission but may be a traction type (or toroidal type) continuously variable transmission.

In the illustrated examples, the oil pressure and the degree of deterioration (period of use) of the oil are used as factors that change the coefficient of friction of the clutch, appropriate ones of the other parameters may be employed as physical quantities relating to the coefficient of friction used according to the invention. Furthermore, in the illustrated examples, the learned value is calculated as a difference between the engaging pressure obtained by giving a certain excess pressure to the engaging pressure that causes no slip, and the engaging pressure generated based on the input torque at the time of control. However, the learned value associated with the engaging pressure may be an engaging pressure reached at the time of re-engagement of the clutch, or may be an engaging pressure obtained by giving a certain excess pressure to the engaging pressure at the time of re-engagement. Also, in the illustrated examples, the belt clamping pressure of the continuously variable transmission is corrected to be increased when the learned value deviates from the average range. In this connection, the control apparatus of the invention may be arranged such that the belt clamping pressure, which was once increased for correction, is then reduced when a degree of deviation of the learned value is reduced.

Figure 30:
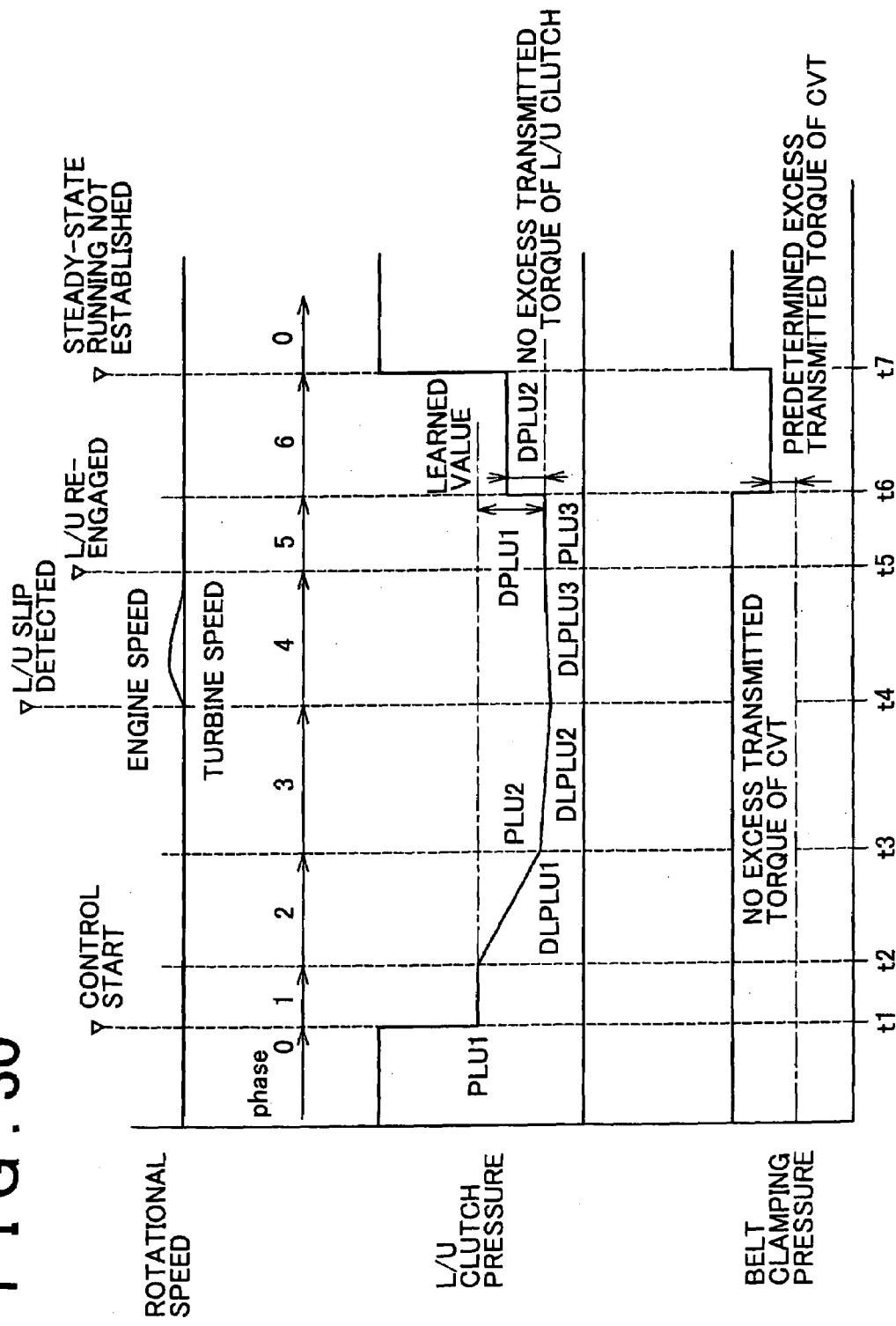
FIG. 30 is a time chart showing changes in the input and output rotational speeds of a lockup clutch, changes in the engaging pressure of the lockup clutch, and changes in the belt clamping pressure, when the control according to the flowchart of FIG. 24 through FIG. 29 is executed.

A control apparatus according to another embodiment of the invention will be now described. The control apparatus is adapted to control the power train including the above-described continuously variable transmission (CVT) 1 as shown in FIG. 23. FIG. 24 through FIG. 29 show a flowchart that represents an example of a control routine executed by the control apparatus, and FIG. 30 is a time chart showing changes in the engine speed, the engaging pressure (hydraulic pressure) of the lockup clutch 11, and the belt clamping pressure that determines the transmitted torque of the CVT 1, when the control routine of FIGS. 24–29 is executed.

The control apparatus of the present embodiment of the invention performs control so as to set an excess transmitted torque (torque capacity) of a clutch arranged in series with the CVT to be smaller than an excess transmitted torque (torque capacity) of the CVT. The "excess" mentioned herein is a magnitude of transmitted torque that exceeds the minimum transmitted torque at which no slip occurs to the clutch or CVT in a steady or normal operating state. Thus, even if a positive torque or a negative torque applied to the clutch or CVT changes within the range defined by the excess transmitted torque, no slip occurs to the lockup clutch 11 or the CVT 1. If the positive or negative torque changes to be outside of this range, the clutch slips before the CVT does, and thus functions as a torque fuse.

Figure 24:
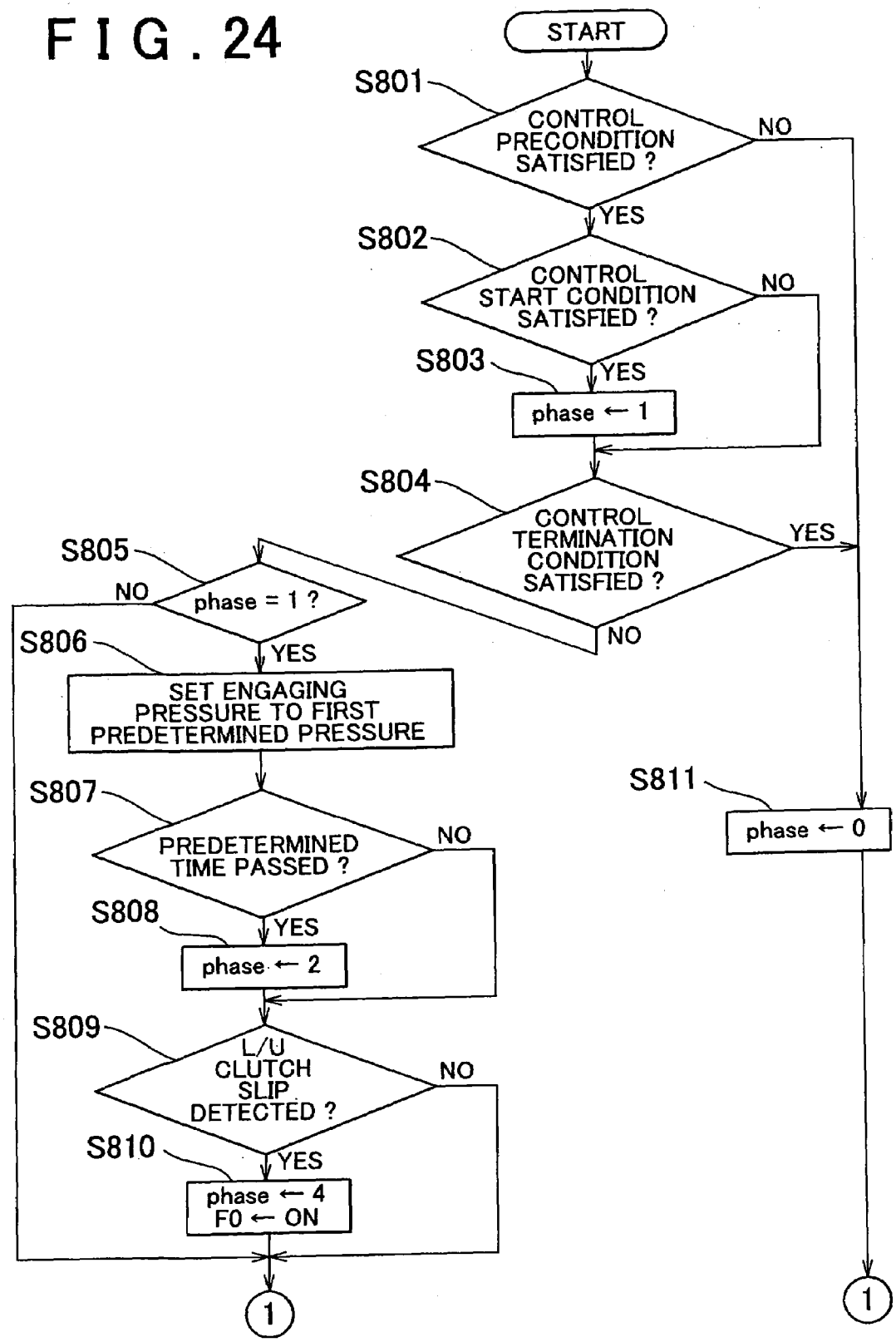
FIG. 24 is a view showing a part of a flowchart useful for explaining one example of control executed by a control apparatus according to another embodiment of the invention.

In order to set the engaging pressure (hydraulic pressure) of the lockup clutch 11 so as to provide an excess torque to the transmitted torque of the clutch 11, control is initiated under a condition that the lockup clutch 11 is stably held in the ON state. This is a precondition for the control as described above. As shown in FIG. 24, step S801 is initially executed to determine whether the precondition is satisfied.

The precondition that the lockup clutch 11 is stably held ON is satisfied when an engaging pressure is established which keeps the lockup clutch 11 in the engaged state without causing a slip in the current normal running state, and the engaging pressure thus established is not a transitional one but is maintained with high stability. This precondition needs to be satisfied because the engaging pressure is reduced down to a level at which the lockup clutch 11 is about to slip or starts slipping, namely, until the clutch 11 shifts from the engaged state to a state immediately before a slip occurs or a state in which the clutch 11 starts slipping, as described later.

Referring to FIG. 30, the precondition for the control is satisfied if the power train including the engine 4, torque converter 3 and the CVT 1 is in an operating state prior to a point of time t1. Up to this point t1, the engine speed Ne and the turbine speed Nt are held substantially constant with high stability, and the hydraulic pressure of the lockup clutch (L/U clutch) 11 is held at a sufficiently high level at which no slip occurs. Furthermore, the belt clamping pressure is held at a sufficiently high level at which no slip occurs. The power train is controlled in this manner in the normal running state. In FIG. 30, the period of control up to point t1 is denoted by "phase 0". The "phase" in FIG. 30 is a symbol assigned to each content of control to be executed, and also serves to indicate the flow of control steps in the flowchart of FIG. 24 through FIG. 29.

When an affirmative determination is made in step S801, it is determined in step S802 whether a control start condition is satisfied. If it is determined that the control start condition is satisfied, the phase is set to "1", namely, "phase 1" is established in step S803. If the control start condition has already been established, a negative determination is made in step S802, and the control skip step S803 and proceeds to step S804.

The control for causing the lockup clutch 11 to function as a torque fuse can be implemented when a driving torque (or positive torque) applied from the engine 4 or a negative torque applied from the drive wheels 26 is stable. Thus, the control is performed under a condition that the vehicle is in a steady or quasi-steady running state. This is the above-indicated control start condition. The steady or quasi-steady running state is established when variations in the accelerator position (i.e., the amount of depression of an accelerator pedal that is not illustrated) or the torque on the output side of the CVT 1 (e.g., the axial torque of the drive pulley 20) in a predetermined period of time are within a predetermined range. The predetermined range may vary with the vehicle speed.

In step S804, it is determined whether a control termination condition is satisfied. The control termination condition is satisfied when any of the operating states that constitute the above-indicated control start condition ceases to be established. For example, the control termination condition is satisfied when the vehicle ceases to be in a steady running state, or when the lockup clutch 11 slips and ceases to be in an engaged state.

If the control termination condition is not satisfied, and a negative determination is made in step S804, it is determined in step S805 whether "phase 1" is established. Since the "phase 1" is established when the control start condition is satisfied as described above, an affirmative determination is made in step S805. As a result, the engaging pressure (hydraulic pressure) of the lockup clutch 11 is set to the first predetermined pressure PLU1 at point t1 in FIG. 30.

The above control for reducing the engaging pressure of the lockup clutch 11 is intended for improving the response of control for causing slippage of the lockup clutch 11. In this control, the rate of reduction of the engaging pressure is not particularly restricted, namely, the engaging pressure is controlled to be immediately reduced. In other words, the slope of reduction of the engaging pressure is controlled to the maximum.

The first predetermined pressure PLU1 is an engaging pressure which does not cause slippage even in the presence of variations in the characteristics of the lockup clutch 11. The predetermined pressure PLU1 may be determined in view of the coefficient of friction μ obtained based on the input torque to the lockup clutch 11 and/or variations in the characteristics in terms of the mechanism of the clutch 11. Alternatively, the predetermined pressure PLU1 may be calculated based on the input torque of the CVT 1, which is determined from the target belt clamping pressure of the CVT 1.

Subsequently, it is determined in step S807 whether a predetermined period of time has passed. The predetermined time is set to a time required for the engaging pressure to be stably held at the first predetermined pressure PLU1 as measured from the time when a command signal for reducing the engaging pressure to the first predetermined pressure PLU1 is generated. The predetermined time may be a fixed value or a map value set in accordance with the vehicle conditions. In FIG. 30, the predetermined period of time is between point t1 and point t2.

If an affirmative determination is made in step S807, the control of "phase 1" is finished, and the phase is set to 2, namely, "phase 2" is established in step S808. This step S808 starts at point t2 in FIG. 30. It is then determined in step S809 whether a slip of the lockup clutch 11 has occurred. If the predetermined period of time has not passed and a negative determination is made in step S807, the control skips step S808 and proceeds to step S809.

Step S809 is executed in order to check the current state of the lockup clutch 11. This step is provided because the control for providing a certain excess transmitted torque of the lockup clutch 11 cannot be normally executed if an unintended or unexpected slip occurs to the lockup clutch 11 in the process of the control. A slip of the lockup clutch 11 can be detected by comparing the speed of rotation of the input side of the lockup clutch 11 (e.g., the engine speed Ne) with the speed of rotation of the output side of the lockup clutch 11 (e.g., the turbine speed Nt). More specifically, a slip of the lockup clutch 11 can be detected by determining that the difference between these input and output speeds exceeds a threshold value.

If the control proceeds as expected, no slip of the lockup clutch 11 occurs, and a negative determination is made in step S809. If an unintended slip occurs to the lockup clutch 11 for some reason, on the other hand, an affirmative determination is made in step S809. In this case, "phase 4" is established, and flag F0 is set to "ON" in step S810. The control then proceeds to step S812. If no slip occurs to the lockup clutch 11, and a negative determination is made in step S809, the control skips step S810 and proceeds to step S812.

Figure 25:
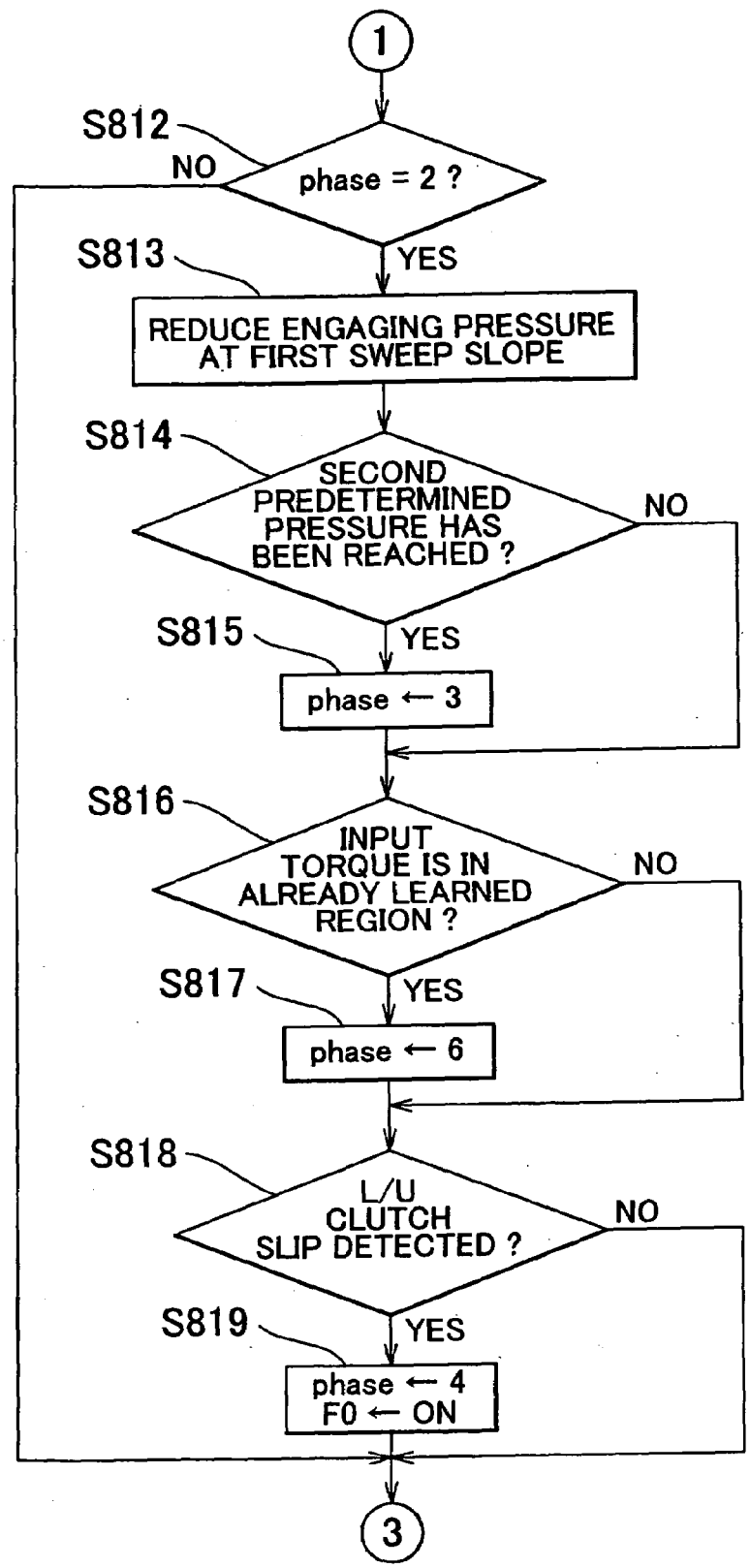
FIG. 25 is a view showing a part of the flowchart following that of FIG. 24, for explaining the example of control executed by the control apparatus.

Referring next to FIG. 25, it is determined in step S812 whether "phase 2" has been established. As described above, "phase 2" is established when the control for reducing the engaging pressure of the lockup clutch 11 to the first predetermined pressure PLU1 is executed. Namely, where the control proceeds to step S812 skipping step S810 when the phase is set to 2 upon a lapse of the predetermined time and no unintended slip occurs to the lockup clutch 11, "phase 2" is established in step S250, and an affirmative determination is made in step S812. In this case, the engaging pressure (hydraulic pressure) of the lockup clutch 11 is reduced toward a second predetermined pressure PLU2 at a certain rate of reduction (which will be called "first sweep slope") DLPLU1 in step S813. This control is performed between point t2 and point t3 in FIG. 30.

The first sweep slip DLPLU1 is a rate of reduction that is smaller than the rate of reduction at which the engaging pressure of the lockup clutch 11 is reduced to the first predetermined pressure, but is set to a value that allows the engaging pressure of the lockup clutch 11 to be reduced rather quickly from the first predetermined pressure PLU1. In this connection, if the engaging pressure is suddenly reduced to a level at which a slip occurs to the lockup clutch 11, in the same manner in which the engaging pressure is set to the first predetermined pressure PLU1, the lockup clutch 11 undergoes an excessive slip due to undershoot, which may result in release or disengagement of the lockup clutch 11. If the engaging pressure is gradually reduced from the stable engaged state so as to avoid this situation, the response of the control may deteriorate. In view of these situations, the engaging pressure is initially reduced to the first predetermined pressure PLU1 in one step, and is then reduced to the second predetermined pressure PLU2 at a relatively large rate or slope.

Subsequently, it is determined in step S814 whether the engaging pressure has reached the second predetermined pressure PLU2. This determination may be made by determining whether a predetermined time has passed, or may be made based on a measurement value of a hydraulic pressure sensor that is not illustrated.

The second predetermined pressure PLU2 is higher by a predetermined value a than the engaging pressure at which no excess torque is given to the transmitted torque of the lockup clutch 11. With the engaging pressure set to the second predetermined pressure PLU2, no slip occurs in the lockup clutch 11. For example, the second predetermined pressure PLU2 may be set to a pressure level to which the engaging pressure is set when the lockup clutch 11 switches from the released (OFF) state to the engaged (ON) state during normal running of the vehicle. This pressure may be obtained by adding a difference between a lockup pressure produced for switching the lockup clutch 11 from the OFF state to the ON state and a required engaging pressure determined based on the input torque at the time of switching, to a required engaging pressure determined based on the input torque at the current point of time.

If the engaging pressure of the lockup clutch 1 reaches the second predetermined pressure PLU2, and an affirmative determination is made in step S814, "phase 3" is established in step S815 so that the control proceeds to the next stage. It is then determined in step S816 whether the input torque received by the lockup clutch 11 at this point of time belongs to a region for which a learned value as described later has been obtained. If the engaging pressure has not reached the second predetermined pressure PLU2, and a negative determination is made in step S814, the control skips step S815 and proceeds to step S816 so that the control does not proceed to the next stage.

In the control explained herein, the engaging pressure of the lockup clutch 11 is controlled to a hydraulic pressure that gives a certain excess to the transmitted torque (i.e., provides a certain excess torque capacity), and thus there is a need to determine a state of the lockup clutch 11 having no excess transmitted torque. It is, however, to be noted that the engaging pressure corresponding to the clutch state with no excess transmitted torque differs depending upon the input torque applied to the lockup clutch 11. When the engaging pressure which gives a certain excess to the transmitted torque is obtained, therefore, the obtained engaging pressure is stored in a memory in association with the input torque at that point of time, so that learning of the engaging pressure is effected. The learning will be described in more detail later. If the learned value with respect to the current input torque has been obtained, unnecessary control can be dispensed with by using the learned value. For this reason, it is determined in step S816 whether the input torque at this point of time belongs to a torque region for which the learned value has been obtained.

If the input torque at the current time is within a torque region for which the learned value has been obtained, and an affirmative determination is made in step S816, "phase 6" is established in step S817 so that the control proceeds to an appropriate stage, i.e., proceeds to step S818. If the input torque at the current time does not belong to a torque region for which the learned value has been obtained, and a negative determination is made in step S816, the control cannot proceed to a stage using the learned value, and therefore the control skips step S817 and proceeds to step S818.

Step S818 and subsequent step S819 are similar to step S809 and subsequent step S810 (FIG. 24) as described above. Namely, since the engaging pressure of the lockup clutch 11 is reduced and the input torque may change in the process up to the above-indicated step S816 or step S817, it is determined in step S818 whether a slip occurs to the lockup clutch 11.

If a slip, which is an unintended or unexpected slip, occurs to the lockup clutch 11, and an affirmative determination is made in step S818, "phase 4" is established so as to perform control in response to the slip, and flag F0 is set to "ON" in step S819. Subsequently, the control proceeds to step S820. If no slip occurs to the lockup clutch 11 and a negative determination is made in step S818, the control skips step S819 and proceeds to step S820.

It is then determined in step S820 (in FIG. 26) whether the "phase 3" has been established. As described above, the phase is set to 3 when the control for reducing the engaging pressure of the lockup clutch 11 to the second predetermined pressure PLU2 is executed. In this condition, if the input torque belongs to a region for which a learned value has not been obtained, the shift of the phase to "phase 6", which would otherwise occur in step S817, does not take place. Also, if no unintended slip occurs, the shift of the phase to "phase 4", which would otherwise occur in step S819, does not take place, and "phase 3" is maintained. With "phase 3" thus maintained, an affirmative determination is obtained in step S820. In this case, the engaging pressure (hydraulic pressure) of the lockup clutch 1 is reduced at a certain rate of reduction (which will be called "second sweep slope") DLPLU2 in step S821, during a period between point t3 and point t4 in FIG. 30.

The second sweep slope DLPLU2 is a rate of reduction that is smaller than the first sweep slope DLPLU1 as described above. Since the engaging pressure of the lockup clutch 11 has been reduced to a relatively low level (at point t3 in FIG. 30), a slip is likely to occur to the lockup clutch 11 in response to a slight change in the hydraulic pressure. Therefore, the rate of reduction of the engaging pressure is set to a small value so as to avoid an excessively large slip of the lockup clutch 11, in other words, to avoid undershoot of the hydraulic pressure and excessively large slip or release of the lockup clutch 11 resulting from the undershoot.

It is determined in step S822 whether the input torque to the lockup clutch 11 at this point of time is within a range for which the learned value as described has been obtained. This step S822, which is similar to the above-described step S816, is intended for utilizing the learned value associated with the engaging pressure if it has already been obtained in the previous control.

If an affirmative determination is made in step S822, "phase 6" is established in step S823 so that the control proceeds to the stage where the learned value is utilized. The step S823 is followed by step S824. To the contrary, if the input torque to the lockup clutch 11 is within a range for which the learned value has not been obtained, the phase remains the same, and the control proceeds to step S824.

The hydraulic pressure reduction control in the above step S820 is the last stage of the pressure reduction control for causing a slip in the lockup clutch 11 held in the engaged state. It is thus determined in step S824 whether a slip of the lockup clutch 11 is detected. As in the above-described step S809 or step S818, this determination can be made by comparing the input rotational speed with the output rotational speed, or comparing a difference between the input and output rotational speeds with a threshold value. More specifically, a slip of the lockup clutch 11 to be detected in step S824 is a slight slip that would occur while the engaging pressure is being reduced little by little. Such a slip of the lockup clutch 11 can be detected when a difference between the input rotational speed and the output rotational speed of the lockup clutch is kept equal to or larger than a predetermined value (for example, 50 rpm) for a predetermined period of time (for example, 50 ms).

If a slight slip occurs to the lockup clutch 11 and an affirmative determination is made in step S824, "phase 4" is established in step S825 so that the control proceeds to the next stage. Step S825 is followed by step S826 (in FIG. 27). To the contrary, if no slip has occurred to the lockup clutch 11 and a negative determination is made in step S824, the control cannot proceed to the next stage, and therefore the phase remains the same. In this case, the control skips step S825 and proceeds to step S826.

Figure 27:
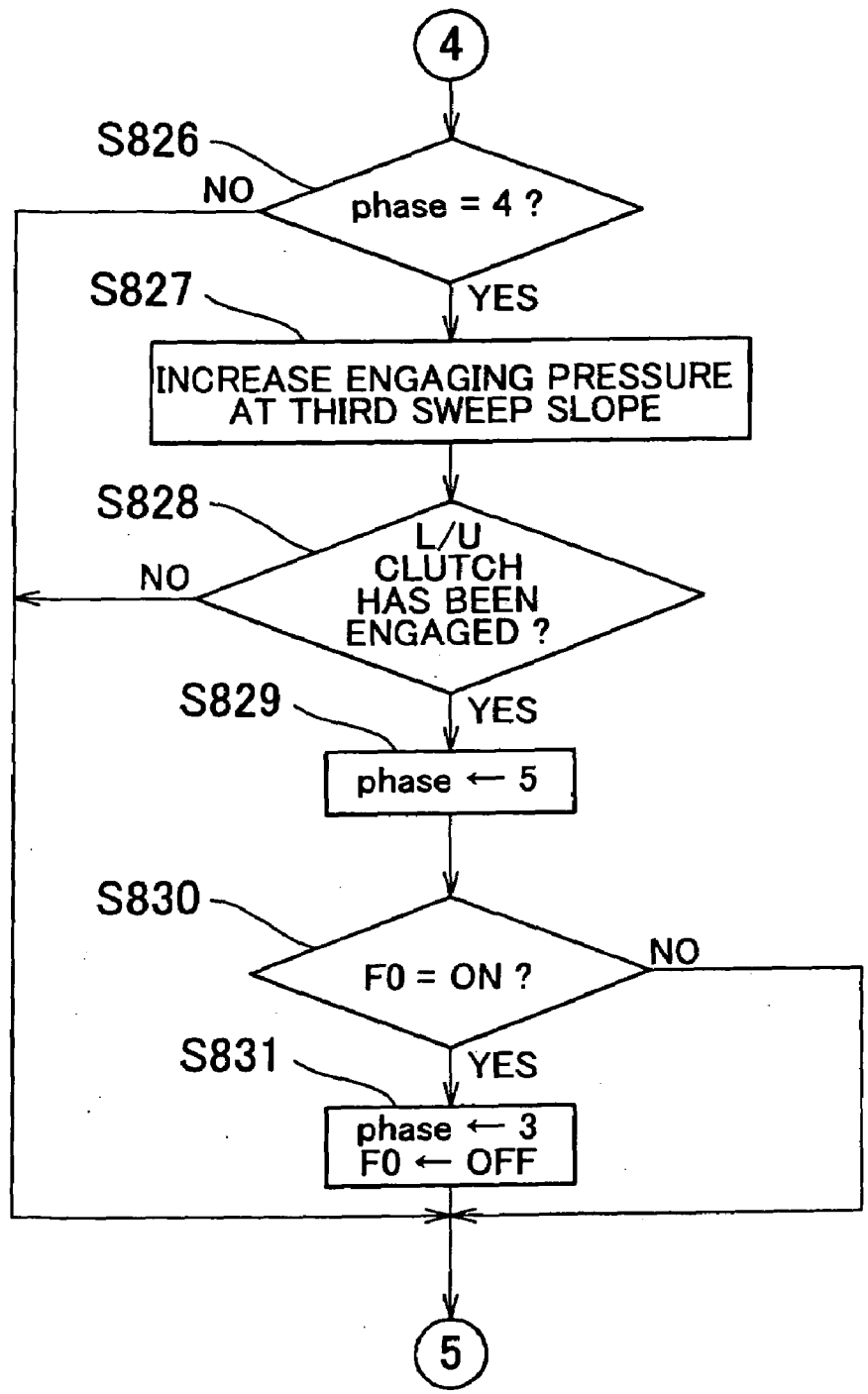
FIG. 27 is a view showing a part of the flowchart following that of FIG. 26, for explaining the example of control executed by the control apparatus.

In step S826, it is determined whether "phase 4" has been established. In the case where the engaging pressure of the lockup clutch 11 is reduced at the second sweep slope DLPLU2, and a slip occurs to the lockup clutch 11 as expected, "phase 4" is established in step S825, and an affirmative determination is made in step S826 (FIG. 27).

In this condition, the engaging pressure of the lockup clutch 11 is slightly lower than the engaging pressure that provides no excess transmitted torque. After the slip of the lockup clutch 11 is detected, therefore, the engaging pressure is increased at a third sweep slope (i.e., a rate of increase of the hydraulic pressure) DLPLU3 in step S827. This control is intended for re-engaging the lockup clutch 11 which is currently placed in a slightly slipping state, and the third sweep slope DLPLU3 is set to the minimum so that the lockup clutch 11 is re-engaged with no excess torque given to the transmitted torque. With this control, the hydraulic pressure for engaging the lockup clutch 11 is increased at a considerably small rate between point t4 and point t5 in FIG. 30.

Subsequently, it is determined in step S828 whether a determination as to engagement of the lockup clutch 11 has been made affirmative, namely, whether the lockup clutch 11 has been engaged. While a difference between the input rotational speed and the output rotational speed is eliminated if an excess of the transmitted torque is equal to zero, this phenomenon also occurs when the excess of the transmitted torque is excessively large. Thus, re-engagement of the lockup clutch 11 in the clutch state with no excess transmitted torque cannot be necessarily accurately detected. Accordingly, re-engagement of the lockup clutch 11 is determined to be established when the difference between the input rotational speed and the output rotational speed of the lockup clutch 11 is kept smaller than a predetermined value (for example, 50 rpm) for a predetermined time (for example, 100 ms) while the engaging pressure is being increased at the third sweep slope DLPL3. In FIG. 30, this determination is made at point t5. It is to be noted that the engaging pressure of the lockup clutch 11 at this point of time is set according to the input torque.

The "phase 4" is finished at point t5, and "phase 5" is established in step S829 so that the control proceeds to the next stage. Following step S829, it is determined in step S830 whether flag F0 is set at "ON". As described above, flag F0 is set to "ON" (in step S810 or step S819) when an unintended or unexpected slip of the lockup clutch 11 is detected in the process of control of the engaging pressure. Thus, step S830 is provided for determining whether the lockup clutch 11 was re-engaged after the unintentional slip.

If an affirmative decision is made in step S830, "phase 3" is established so that the control of "phase 3" with respect to the unintended slip of the lockup clutch 11 is performed, and flag F0 is set to "OFF" in step S831. Subsequently, the control proceeds to step S832 (in FIG. 28). If the lockup clutch 11 is re-engaged after an intended or expected slip occurs, and a negative determination is made in step S830, the control skips step S831 and proceeds to step S832. Namely, "phase 5" is maintained.

Figure 28:
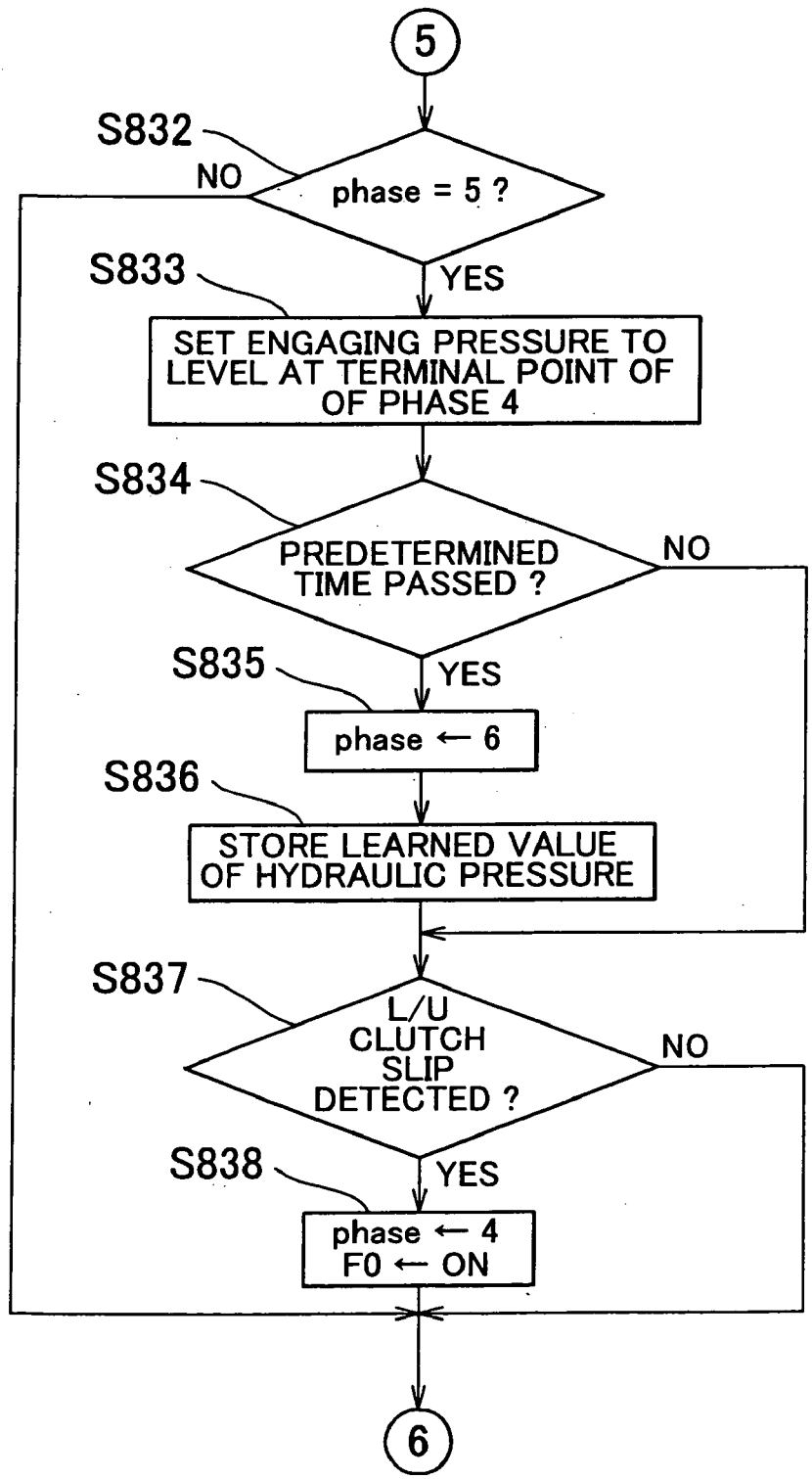
FIG. 28 is a view showing a part of the flowchart following that of FIG. 27, for explaining the example of control executed by the control apparatus.
Figure 29:
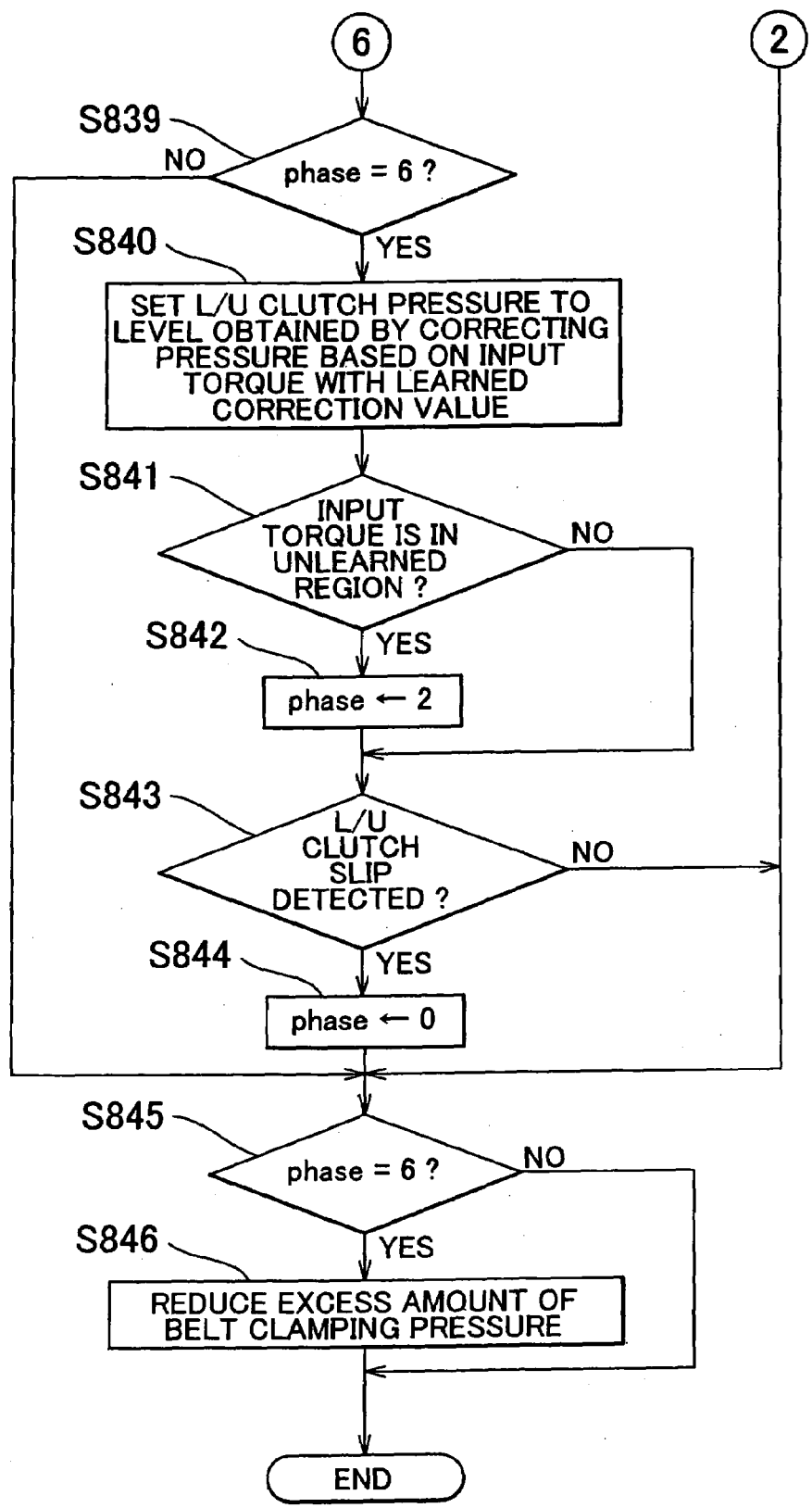
FIG. 29 is a view showing a part of the flowchart following that of FIG. 28, for explaining the example of control executed by the control apparatus.

In step S832 as shown in FIG. 28, it is determined whether "phase 5" has been established. Where the engaging pressure is slowly reduced until a slight slip occurs in the lockup clutch 11, and thereafter the engaging pressure is increased at the minimum slope until re-engagement of the lockup clutch 11 is determined, "phase 5" is established, and an affirmative determination is made in step S832. Namely, if the behavior of the lockup clutch 11 changes as expected or plotted in accordance with changes in the engaging pressure, the control proceeds to "phase 5".

If an affirmative determination is made in step S832, step S833 is executed to set the engaging pressure of the lockup clutch 11 to a pressure level achieved at the terminal point (t5 in FIG. 30) of "phase 4", namely, a hydraulic pressure (corresponding to the input torque) established at the time when re-engagement of the lockup clutch 11 is determined. In the following step S834, it is determined whether a predetermined period of time has passed. This period of time, which ranges from point t5 to point t6 in FIG. 30, is a predetermined time required for the engaging pressure of the lockup clutch 11 to be stably held at the pressure level achieved at point t5.

If the predetermined time has passed, and an affirmative determination is made in step S834, "phase 6" is established in step S835 so that the control proceeds to the next stage. Then, the learned value of the hydraulic pressure is stored in a memory in step S836. The control then proceeds to step S837.

More specifically, the learned value represents a difference DPLU1 between the first predetermined pressure PLU1 to which the hydraulic pressure is reduced in one step from a level at which the lockup clutch 11 is held in the engaged state, and the third predetermined pressure PLU3 at which the lockup clutch 11 is re-engaged. This difference is stored as a hydraulic pressure (engaging pressure) that gives no excess torque to the transmitted torque. In other words, the learned value DPLU1 that gives the engaging pressure of the lockup clutch 11 that provides no excess transmitted torque is stored in step S836.

It is to be understood that the learned value DPLU1 is stored for each of a plurality of regions into which the input torque is divided, and the relationship between the thus obtained learned values and respective torque regions is stored in the form of a map. The determinations in the above-described step S816 and step S822 are made based on the presence or absence of the thus obtained learned value with respect to the input torque at the point of time when step S816 or step S822.

If the predetermined time has not passed, and a negative determination is made in step S834, the control immediately proceeds to step S837 skipping step S835 and step S836. In this case, "phase 5" is maintained without proceeding to "phase 6".

In step S837, it is determined whether an unintended slip occurs to the lockup clutch 11 at this point. This step S837 is similar to step S809 or step S818. If an affirmative determination is made in step S837, "phase 4" is established in step S838 so as to carry out control in response to the slip, and flag F0 is set to "ON" in step S838. Subsequently, the control proceeds to step S839. If no slip occurs to the lockup clutch 11, and a negative determination is made in step S837, the control skips step S838 and proceeds to step S839.

In step S839, it is determined whether "phase 6" is established. As described above, in the case where the learned value is stored while the engaging pressure of the lockup clutch 11 is maintained at the hydraulic pressure PLU3 that provides no excess transmitted torque, and no unintended slip occurs to the lockup clutch 11, "phase 6" is established, and an affirmative determination is made in step S839.

In this case, step S840 is executed to set the engaging pressure of the lockup clutch 11 by correcting the hydraulic pressure calculated based on the input torque by learning using the above-described learned value. More specifically, the first predetermined pressure PLU1 to which the engaging pressure is reduced in one step in "phase 1" is calculated based on the input torque measured at the current time, and the calculated pressure is determined as a hydraulic pressure based on the input torque of the lockup clutch 11. Then, a hydraulic pressure (with no excess pressure) that provides no excess transmitted torque of the lockup clutch 11 is obtained by subtracting the above-indicated learned value DPLU1 from the hydraulic pressure PLU1. Then, the hydraulic pressure of the lockup clutch 11 is set by adding a predetermined excess pressure DPLU2 to the thus obtained hydraulic pressure that provides no excess transmitted torque. This control is performed at point t6 in FIG. 30. The excess pressure DPLU2 is determined such that the resulting pressure (i.e., sum of the pressure having no excess pressure and the excess pressure) does not cause a slip in the lockup clutch 11 in a steady or quasi-steady running state, but causes a slip in the lockup clutch 11 when a torque that exceeds the toque applied in the steady or quasi-steady running state is applied to the clutch 11.

The input torque applied to the lockup clutch 11 may change while the engaging pressure of the lockup clutch 11 is being set as described above. In view of this situation, it is determined in step S841 following step S840 whether the input torque has entered a non-learned region, namely, whether the input torque has changed into a different region for which the learned value has not been obtained. At this time, the lockup clutch 11 is engaged without slipping, and the engaging pressure of the clutch 11 is set to a pressure level that provides only a small transmitted torque.

If an affirmative determination is made in step S841, the control of "phase 2" is executed so as to effect learning by causing a slight slip again. Namely, "phase 2" is established in step S842, which is followed by step S843. If the input torque is within a region for which the learned value has been obtained, and a negative determination is made in step S841, the control immediately proceeds to step S843 without changing the phase".

In step S843, it is determined whether a slip occurs has occurred to the lockup clutch 11. While the vehicle is running in a steady state or a quasi-steady state, the driving torque or the negative torque on the output side does not change significantly, and no slip occurs to the lockup clutch 11 owing to the excess transmitted torque. If a torque applied to the lockup clutch 11 exceeds the transmitted torque provided with the excess transmitted torque, however, a slip occurs to the lockup clutch 11. Thus, if a slip of the lockup clutch 11 is detected, and an affirmative determination is made in step S843, it means that the vehicle has shifted from a steady running state into a non-steady running state.

If an affirmative determination is made in step S843, "phase 0" is established in step S844. Then, the control proceeds to step S845. If no slip of the lockup clutch 11 is detected, and a negative determination is made in step S843, the control skips step S844 and proceeds to step S845, without changing the phase.

In the time chart of FIG. 30, the "phase 0" is established before point t1 and after point t7. In the "phase 0", the engaging pressure of the lockup clutch 11 and the belt clamping pressure of the CVT 1 are subjected to normal control. More specifically, the engaging pressure of the lockup clutch 11 and the belt clamping pressure of the CVT 1 are raised to high levels, so that no slip occurs to the lockup clutch 11 and the CVT 1 upon a change of the engine torque or the negative torque on the output side.

It is then determined in step S845 whether "phase 6" is established. As described above, "phase 6" is established between point t6 and point t7 in FIG. 30, during which the engaging pressure that provides a certain excess transmitted torque of the lockup clutch 11 is stably established.

If "phase 6" is established, and an affirmative determination is made in step S845, the belt clamping pressure of the CVT 1 is reduced to a pressure level at which a certain excess torque is given to the transmitted torque of the CVT 1 in step S846. The resulting belt clamping pressure is equal to a pressure obtained by adding a predetermined value to the pressure that provides no excess transmitted torque, as shown in FIG. 30. The excess transmitted torque of the CVT 1 thus determined is set larger than the excess transmitted torque of the lockup clutch 11. If a driving torque or a negative torque changes, therefore, the lockup clutch 11 slips before the CVT 1 does.

With the control apparatus of the present embodiment of the invention that performs the above-described control, an engaging pressure that provides no excess transmitted torque of the lockup clutch 11 is determined, and the engaging pressure of the lockup clutch 11 is set to a level obtained by adding an excess pressure that provides a certain excess transmitted torque to the thus determined engaging pressure. Once the engaging pressure is thus determined, the engaging pressure of the lockup clutch 11 is not controlled to be reduced until a slip of the lockup clutch 11 occurs after setting of the engaging pressure. This control is able to avoid in advance a situation where the lockup clutch 11 slips repeatedly, resulting in deterioration of the power transmitting efficiency of the power train and the fuel economy.

Furthermore, since the engaging pressure of the lockup clutch 11 that provides no excess transmitted torque of the clutch 11 is detected or determined, and an excess pressure is added to the detected or determined pressure, the engaging pressure of the lockup clutch 11 is prevented from being excessively large, and, consequently, the excess transmitted torque of the lockup clutch 11 can be surely set to a smaller value than the excess transmitted torque of the CVT 1. In addition, since the engaging pressure that provides no excess transmitted torque is determined by learning control, it is possible to stably set an engaging pressure that provides a certain excess transmitted torque, without being influenced by individual differences or chronological changes in the lockup clutch 11 and/or its hydraulic control devices.

Moreover, since the lockup clutch 11 slips before the CVT 1 does when the engine torque or the negative torque applied from the drive wheels suddenly changes in a steady or quasi-steady running state, slippage of the CVT 1 can be prevented with improved reliability. It is thus possible to reduce the belt clamping pressure of the CVT 1 to the minimum while preventing slippage of the CVT 1, thus assuring improved power transmitting efficiency of the CVT 1 and improved fuel economy.

The control routine of FIG. 24 through FIG. 29 as described above is performed when the input torque for which the above-described learned value has not been obtained is applied to the lockup clutch 11. Thus, various controls as described above are performed so as to reduce the engaging pressure in a plurality of stages or steps until a slight slip occurs to the lockup clutch 11, and then increase the engaging pressure and thereby re-engage the lockup clutch 11. If the learned value has been already obtained with respect to the current input torque, on the other hand, the engaging pressure is controlled in the following manner.

If the input torque is within a region for which the learned value has already been obtained, an affirmative determination is made in step S816 shown in FIG. 25, and "phase 6" is established in step S817. This determination is made while the engaging pressure is being reduced at the first sweep slope DLPLU1 after it is reduced down to the first predetermined pressure PLU1 in one step.

When "phase 6" is established in step S817, negative determinations are made in all of steps S820, S826 and S832 for determining the phase. As a result, the control immediately proceeds to step S839 where an affirmative determination is made. The control following step S839 has been described above.

When the learned value for the current input torque has been obtained, the engaging pressure is reduced in step S840 to the pressure level corrected with the learned value DPLU1 immediately after the control of "phase 1" for setting the first predetermined pressure PLU1 based on the input torque is executed. In this case, since the engaging pressure to be set is close to an engaging pressure at which a slip of the lockup clutch 11 occurs, smoothing control is preferably employed in the control of reducing the engaging pressure, so as to prevent release or excessive slippage of the lockup clutch 11 due to undershoot of the hydraulic pressure.

When the learned value has already been obtained as described above, the engaging pressure of the lockup clutch 11 can be reduced by utilizing the learned value, thus eliminating a need to execute controls of the "phase 2" through "phase 5" as described above, and permitting quick control.

In the case where input torque changes in the process of the series of control steps as described above, the input torque may shift from a region for which the learned value has been obtained to a region for which the learned value has not been obtained, or may shift from a region for which the learned value has not been obtained to a region for which the learned value has been obtained. In the former case, control using the learned value cannot be performed, and therefore learning needs to be effected. In the latter case, control for obtaining a learned value is not needed, and control using the learned value can be performed.

More specifically described, when the input torque of the lockup clutch 11 changes from a torque region for which the learned value has been obtained to a torque region for which the learned value has not been obtained, a negative determination is made in step S816 or step S822 as described above. Thus, when the input torque is changed into a torque region for which the learned value has not been obtained before setting the engaging pressure by adding a certain excess pressure to the engaging pressure that provides no excess transmitted torque, the series of controls from "phase 1" through "phase 6" are executed in the order as described above.

If the input torque is changed into a torque region for which the learned value has not been obtained after setting of the engaging pressure that provides a certain excess transmitted torque of the lockup clutch 11, an affirmative determination is made in step S841 as described above. As a result, "phase 2" is established, and the control of "phase 2" is executed, as in the case where an affirmative determination is made in step S812 shown in FIG. 25. More specifically, the engaging pressure is reduced at the first sweep slope DLPLU1, and is then reduced at the second sweep slope DLPLU2 after reaching the second predetermined pressure PLU2 so that a slight slip occurs to the lockup clutch 11. After a slight slip of the lockup clutch 11 is detected, the engaging pressure is increased at the third sweep slope DLPLU3 until the lockup clutch 11 is re-engaged. After detection of re-engagement, an engaging pressure obtained by adding a certain pressure to the pressure at the time of the re-engagement is established. This control is performed in step S812 and the following steps.

An example of the case where the input torque changes from a torque region for which a learned value has not been obtained, to a torque region for which a learned value has been obtained, if the input torque of the lockup clutch 11 enters a torque region for which the learned value has been obtained after the engaging pressure is stepped down to the first predetermined pressure PLU1 (after the control of "phase 1" is completed), an affirmative determination is made in the above-described step S816 shown in FIG. 24. The control in this case is similar to that in the case where the learned value has already been obtained. Namely, the control immediately proceeds to step S839, and the engaging pressure of the lockup clutch 11 is set in step S840 based on the learned value that provides a certain excess transmitted torque of the lockup clutch 11.

Figure 26:
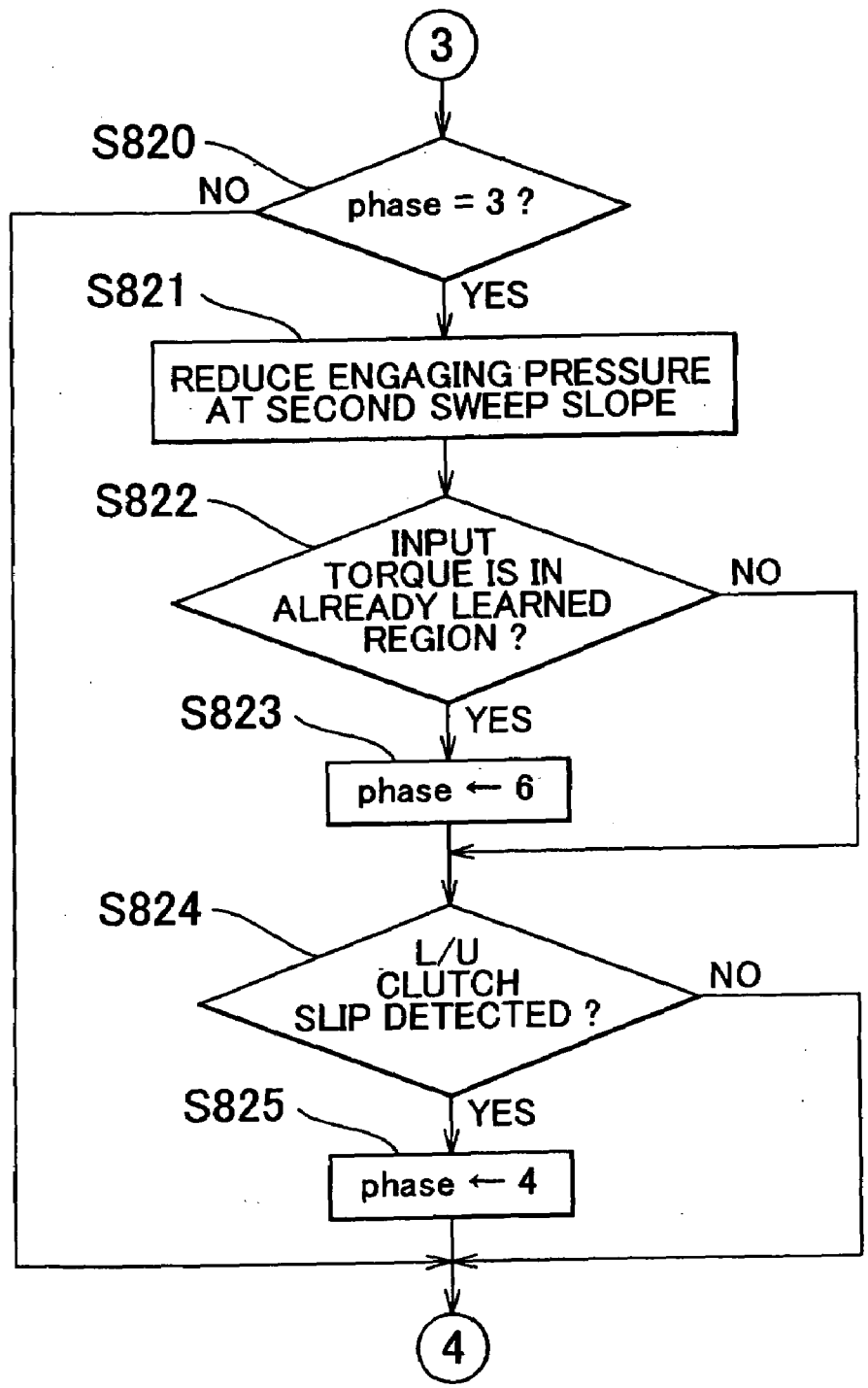
FIG. 26 is a view showing a part of the flowchart following that of FIG. 25, for explaining the example of control executed by the control apparatus.

If the input torque changes into a torque region for which the learned value has been obtained after the engaging pressure is reduced down to the second predetermined pressure PLU2, an affirmative determination is made in step S822 shown in FIG. 26. As a result, "phase 6" is established, and the control immediately proceeds to step S839 so that the engaging pressure that provides an excess transmitted torque is set based on the learned value.

If the input torque changes into a torque region for which the learned value has been obtained after a slight slip of the lockup clutch 11 is detected, each control step is executed in the order of the series of controls as described above. Namely, there is no difference from the series of controls as described above even when the input torque changes into a different torque region.

Thus, in the control apparatus as described above, when the input torque shifts between a learned region for which the learned value has already been obtained and an unlearned region for which the learned value has not been obtained, the subsequent control is selected depending upon how far the control of the engaging pressure proceeds (i.e., depending upon the current stage of the control of the engaging pressure). Accordingly, learning of the engaging pressure can be performed as described above, and at the same time unnecessary, wasteful control can be omitted.

In the process of the above-described series of controls for controlling the engaging pressure of the lockup clutch 11 so as to provide a certain excess transmitted torque, a slip of the lockup clutch 11 may occur due to a reduction in the engaging pressure or a change in the input torque. Such a slip of the lockup clutch 11 is detected in, for example, step S809, step S818, step S824, step S837 and step S843.

If a slip occurs to the lockup clutch 11 in the course of reducing the engaging pressure to the second predetermined pressure PLU2 or when the engaging pressure is equal to the second predetermined pressure PLU2, an affirmative determination is made in step S809 or step S818. In either of the cases, "phase 4" is established and flag F0 is set to "ON" in step S810 or step S819. As a result, the control proceeds to step S826 shown in FIG. 27, and the following steps are sequentially executed, so that the engaging pressure is slowly increased.

With the engaging pressure thus increased, the lockup clutch 11, which has once slipped, is re-engaged in step S828. In this case, however, flag F0 is set to "ON", and therefore "phase 3" is established (in step S830 and step S831), and the control returns to "phase 3". Thus, the control does not proceed straight to step S835 shown in FIG. 28, and learning is not effected. This operation corresponds to inhibition of learning.

As described above, when an unintentional slip of the lockup clutch 11 occurs in the process of control, the lockup clutch 11 is brought back into an engaged state, and the above-described series of controls, including reduction of the engaging pressure, detection of a slip, and increase of the pressure, are carried out. At the same time, learning of the engaging pressure that provides no excess transmitted torque, and learning of the engaging pressure that gives an excess torque to the transmitted torque are inhibited upon detection of an unintentional slip.

When a slip of the lockup clutch 11 occurs while the engaging pressure is being reduced from the second predetermined pressure PLU2, an affirmative determination is made in step S824 shown in FIG. 26. Since this is an intended or expected slip, "phase 4" is established in step S825. Subsequently, the series of controls as described above are executed. Thus, there is no difference from the above-described series of controls upon occurrence of a slip at this stage.

If an unintended slip occurs after the lockup clutch 11 is re-engaged, an affirmative determination is made in step S837. In this case, "phase 4" is established, and the flag F0 is set to "ON" in step S838. Then, the control returns to step S826 shown in FIG. 27, and the subsequent steps are sequentially executed, so that the engaging pressure is slowly increased. This is similar to the example as described above.

If a slip of the lockup clutch 11 occurs after the engaging pressure that provides a certain excess transmitted torque is established, an affirmative determination is made in step S843, and "phase 0" is established in step S844. Namely, it is determined that the vehicle has been brought into a non-steady running state, and the control is terminated. In this case, the control starts again from step S801.

In the control as described above, when an unintended or unexpected slip occurs to the lockup clutch 11, control to be executed next is selected depending upon the present stage or state of control at the time of detection of the slip. It is thus possible to prevent the lockup clutch 11 from excessively slipping, or avoid problems, such as repetition of unnecessary controls.

When the control pre-condition is not satisfied and a negative determination is made in step S801, and when the control termination condition is satisfied and an affirmative determination is made in step S804, "phase 0" is established in step S811. In this step, which is the same as step S844 shown in FIG. 29, the engaging pressure of the lockup clutch 11 and the belt clamping pressure of the CVT 1 are controlled to relatively high pressures that are established in the normal running condition. Although the control proceeds to step S845 after execution of step S844, a negative determination is made in step S845 since the phase is set at 0, and the control is terminated.

In the flowchart of FIG. 24 through FIG. 29, when negative determinations are made in steps S805, S812, S820, S826, S832 and S839 for determining the phase, the control proceeds to the next phase determination step that follows the step in which the negative determination is made. When a negative determination is made in step S845, which is the last step for determining the phase, the control goes out of (i.e., finishes) the control routine as shown in FIG. 24 through FIG. 29.

Here, the relationship between the above-described embodiment and the invention will be briefly explained. The functional means of steps S806, S813 and S821 corresponds to the engaging pressure reducing unit, and the functional means of step S827 corresponds to the re-engaging unit, while the function means of step S840 corresponds to the engaging pressure setting unit. Also, the functional means of steps S833 and S836 corresponds to the learning unit, and the functional means of step S840 for executing control of the engaging pressure using the learned value through a smoothing process corresponds to the unit that reduces the engaging pressure through the smoothing process.

Hereinafter, some features and modified examples of the above-described embodiment of the invention will be described.

In the control apparatus of the above-described embodiment that executes the control routine of FIG. 24 through FIG. 29, the clamping pressure of the CVT is maintained at a high pressure at which no slip occurs before the engaging pressure is set to a pressure level that provides a certain excess transmitted torque of the clutch, and is then reduced to a pressure level that provides a certain excess transmitted torque of the CVT after setting of the engaging pressure of the clutch. According to this feature, the belt clamping pressure is maintained at a high level up to a point of time t6 shown in FIG. 30.

In the control apparatus of the same embodiment, when a slip of the clutch occurs while the clutch engaging pressure is set to a pressure level that provides a certain excess transmitted torque of the clutch, the engaging pressure is increased to a pressure level at which no slip occurs in the clutch, and also the clamping pressure of the CVT is increased to a pressure level at which no slip occurs in the CVT. This feature corresponds to control of step S844 as described above.

In the control apparatus of the same embodiment, the first engaging pressure to which the clutch pressure is reduced at the initial stage may be set to a pressure level at which no slip occurs in the clutch even in view of variations in the characteristics of the clutch calculated from the input torque of the clutch. This feature corresponds to step S806.

In the control apparatus of the same embodiment, the second engaging pressure to which the clutch pressure is reduced at the second stage in the process of reducing the engaging pressure through a plurality of stages may be set to an engaging pressure to be set when the clutch is switched from the OFF state to the ON state during normal running of the vehicle.

In the process of reducing the engaging pressure according to the same embodiment, the engaging pressure is maintained at the first predetermined value for a predetermined period of time, and is then reduced at a suitable sweep slope. These features correspond to the controls of "phase 1" and "phase 3". With this arrangement, the response of the hydraulic pressure is improved, and undershoot of the hydraulic pressure can be avoided.

The control apparatus of the same embodiment determines that the clutch is re-engaged when the state in which a difference between the input and output rotational speeds is equal to or smaller than a predetermined value continues for a predetermined period of time. This feature corresponds to control of step S828. In this manner, the state of the clutch with no excess transmitted torque can be detected or determined with high reliability.

In the control apparatus of the same embodiment, the engaging pressure that provides a certain excess transmitted torque of the clutch may be obtained based on the input torque of the clutch.

In the control apparatus of the same embodiment, the engaging pressure that provides a certain excess transmitted torque of the clutch may be obtained based on the hydraulic pressure at which the clutch is re-engaged. In this case, the engaging pressure may be reduced for an amount of the hydraulic pressure corresponding to the inertia torque at the time of re-engagement.

In the control apparatus of the same embodiment, a control start condition may be that the vehicle is in a steady running state. In this case, the vehicle may be judged as being in a steady running state when the amount of depression of the accelerator pedal is kept equal to or smaller than a predetermined value for a predetermined period of time. As another example, the vehicle may be judged as being in a steady running state when the torque on the output side of the CVT calculated from the input torque is kept equal to or smaller than a predetermined value for a predetermined period of time. This feature corresponds to step S802.

The control apparatus of the invention may determine that the vehicle is in a steady running state, by determining that the basic acceleration of the vehicle is within a predetermined range, or that a slope of the road surface on which the vehicle runs is within a predetermined range. If the input torque is large because of a large slope or gradient of the road surface, control for setting the engaging pressure that provides a certain excess transmitted torque is inhibited, so that a slip of the clutch can be prevented with improved reliability.

While the clutch to be controlled by the control apparatus of the invention takes the form of a lockup clutch that is arranged in series with the continuously variable transmission on the input side thereof, the clutch may be any clutch arranged in series with the continuously variable transmission in the direction of transmission of torque. Thus, the clutch may be disposed on the output side of the continuously variable transmission, or may be of any type other than the lockup clutch.

Also, the continuously variable transmission is not limited to the belt-and-pulley type continuously variable transmission but may be a toroidal type (or traction type) CVT. Furthermore, while the engaging pressure is reduced in three steps in the illustrated embodiment, the engaging pressure may be reduced in two steps, or in any number of steps.

What is claimed is:

1. A control apparatus for a power train including a continuously variable transmission and a clutch that is arranged in series with the continuously variable transmission, comprising:
   an engaging pressure reducing unit that reduces an engaging pressure of the clutch that is in a fully engaged state until a slip of the clutch occurs;
   a re-engaging unit that increases the engaging pressure of the clutch after detection of the slip so as to re-engage the clutch;
   a pressure calculating unit that calculates the engaging pressure of the clutch by giving a predetermined excess pressure to the engaging pressure at which the clutch is re-engaged, such that an excess amount of a transmitted torque of the clutch over a transmitted torque with which a slip occurs in the clutch is set smaller than an excess amount of a transmitted torque of the continuously variable transmission over a transmitted torque with which a slip occurs in the transmission;
   a judder history determining unit that determines whether the clutch has experienced judder; and
   an engaging pressure change rate setting unit that sets a first rate of change of the engaging pressure of the clutch in a case where the judder history determining unit determines that the clutch has experienced the judder, to be larger than a second rate of change of the engaging pressure in a case where the judder history determining unit determines that the clutch has experienced no judder.

2. A method of controlling a power train including a continuously variable transmission and a clutch that is arranged in series with the continuously variable transmission, comprising the steps of:
   reducing an engaging pressure of the clutch that is in a fully engaged state until a slip of the clutch occurs;
   re-engaging the clutch by increasing the engaging pressure of the clutch after detection of the slip;
   calculating the engaging pressure of the clutch by giving a predetermined excess pressure to the engaging pressure at which the clutch is re-engaged, such that an excess amount of a transmitted torque of the clutch over a transmitted torque with which a slip occurs in the clutch is set smaller than an excess amount of a transmitted torque of the continuously variable transmission over a transmitted torque with which a slip occurs in the transmission;
   determining whether the clutch has experienced judder; and
   setting a first rate of change of the engaging pressure of the clutch in a case where it is determined that the clutch has experienced the judder, to be larger than a second rate of change of the engaging pressure in a case where it is determined that the clutch has experienced no judder.

3. A control apparatus for a power train including a continuously variable transmission and a clutch that is arranged in series with the continuously variable transmission, comprising:
   an engaging pressure reducing unit that reduces an engaging pressure of the clutch that is in a fully engaged state until a slip of the clutch occurs;
   a re-engaging unit that increases the engaging pressure of the clutch after detection of the slip so as to re-engage the clutch;
   a pressure calculating unit that calculates the engaging pressure of the clutch by giving a predetermined excess pressure to the engaging pressure at which the clutch is re-engaged, such that an excess amount of a transmitted torque of the clutch over a transmitted torque with which a slip occurs in the clutch is set smaller than an excess amount of a transmitted torque of the continuously variable transmission over a transmitted torque with which a slip occurs in the transmission;
   a judder history determining unit that determines whether the clutch has experienced judder; and
   a control unit that inhibits control for learning the engaging pressure of the clutch when the judder history determining unit determines that the clutch has experienced judder.

4. The control apparatus according to claim 3, wherein the control unit comprises a clutch engaging pressure control inhibiting unit that inhibits control for setting the engaging pressure of the clutch to a pressure level calculated by giving the predetermined excess pressure to the engaging pressure at which the clutch is re-engaged, when the judder history determining unit determines that the clutch has experienced judder.

5. The control apparatus according to claim 3, wherein the control unit comprises an engaging pressure control unit that inhibits control for calculating the engaging pressure of the clutch by giving the predetermined excess pressure to the engaging pressure at which the clutch is re-engaged when the judder history determining unit determines that the clutch has experienced judder,
   wherein when the engaging pressure calculated by giving the predetermined excess pressure to the engaging pressure at which the clutch is re-engaged has already been obtained, the engaging pressure control unit executes control for engaging the clutch with the engaging pressure that has already been obtained.

6. A method of controlling a power train including a continuously variable transmission and a clutch that is arranged in series with the continuously variable transmission, comprising the steps of:
   reducing an engaging pressure of the clutch that is in a fully engaged state until a slip of the clutch occurs;
   re-engaging the clutch by increasing the engaging pressure of the clutch after detection of the slip;
   calculating the engaging pressure of the clutch by giving a predetermined excess pressure to the engaging pressure at which the clutch is re-engaged, such that an excess amount of a transmitted torque of the clutch over a transmitted torque with which a slip occurs in the clutch is set smaller than an excess amount of a transmitted torque of the continuously variable transmission over a transmitted torque with which a slip occurs in the transmission;
   determining whether the clutch has experienced judder; and inhibiting control for learning the engaging pressure of the clutch when it is determined that the clutch has experienced judder.

7. The method according to claim 6, wherein said step of inhibiting control comprises inhibiting control for setting the engaging pressure of the clutch to a pressure level calculated by giving the predetermined excess pressure to the engaging pressure at which the clutch is re-engaged, when it is determined that the clutch has experienced judder.

8. The method according to claim 6, wherein said step of inhibiting control comprises inhibiting control for calculating the engaging pressure of the clutch by giving the predetermined excess pressure to the engaging pressure at which the clutch is re-engaged when it is determined that the clutch has experienced judder, wherein when the engaging pressure calculated by giving the predetermined excess pressure to the engaging pressure at which the clutch is re-engaged has already been obtained, control for engaging the clutch with the engaging pressure that has already been obtained is executed.

* * * * *